(12) United States Patent
Kim et al.

(10) Patent No.: US 9,807,755 B2
(45) Date of Patent: Oct. 31, 2017

(54) METHOD FOR ALLOCATING RESOURCES IN A WIRELESS COMMUNICATION SYSTEM AND A DEVICE FOR THE SAME

(71) Applicant: LG ELECTRONICS INC., Seoul (KR)

(72) Inventors: Hakseong Kim, Anyang-si (KR); Hanbyul Seo, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/218,373

(22) Filed: Jul. 25, 2016

(65) Prior Publication Data

US 2017/0026943 A1    Jan. 26, 2017

Related U.S. Application Data

(63) Continuation of application No. 14/575,711, filed on Dec. 18, 2014, now Pat. No. 9,420,577, which is a (Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04L 27/2602* (2013.01);
(Continued)

(58) Field of Classification Search
None
See application file for complete search history.

(56) References Cited

U.S. PATENT DOCUMENTS 7,684,476 B2    3/2010 Fujii et al.
7,894,389 B2    2/2011 Hyon et al.
(Continued)

FOREIGN PATENT DOCUMENTS

CN              1697361 A      11/2005
KR    10-2007-0081940 A        8/2007
(Continued)

OTHER PUBLICATIONS catt, "Multiplexing of R-PDCCH and R-PDSCH", R1-101776, 3GPP TSG RAN WG1 Meeting #60bis, Beijing, China, Apr. 12-16, 2010, pp. 1-4.
(Continued)

*Primary Examiner* — Jenee Williams
(74) *Attorney, Agent, or Firm* — Birch, Stewart, Kolasch & Birch, LLP

(57) ABSTRACT

A method is provided for transmitting downlink control information (DCI) at a base station in a wireless communication system. The base station assigns a set of Virtual Resource Blocks (VRBs) for the DCI on a downlink subframe, wherein the DCI is related with a specific device. The base station transmits, to the specific device, the DCI via a specific downlink control channel configured for the specific device by using the downlink subframe. The set of VRBs is configured to be a same VRB set in a first slot and a second slot of the downlink subframe. If the set of VRBs is assigned in the first slot of the downlink subframe, the DCI is configured for a downlink transmission for the specific device. If the set of VRBs is assigned in the second slot of the downlink subframe, the DCI is configured for an uplink transmission for the specific device.

7 Claims, 45 Drawing Sheets

Related U.S. Application Data continuation of application No. 13/640,706, filed as application No. PCT/KR2011/003596 on May 16, 2011, now Pat. No. 9,414,370.

(60) Provisional application No. 61/373,270, filed on Aug. 12, 2010, provisional application No. 61/366,527, filed on Jul. 21, 2010, provisional application No. 61/356,024, filed on Jun. 17, 2010, provisional application No. 61/350,030, filed on Jun. 1, 2010, provisional application No. 61/349,210, filed on May 28, 2010, provisional application No. 61/346,010, filed on May 18, 2010, provisional application No. 61/334,974, filed on May 14, 2010.

(51) Int. Cl.
  *H04L 27/26* (2006.01)
  *H04W 84/04* (2009.01)
  *H04B 7/155* (2006.01)

(52) U.S. Cl.
  CPC ... *H04W 72/0426* (2013.01); *H04W 72/0446* (2013.01); *H04B 7/15507* (2013.01); *H04W 84/047* (2013.01)

(56) References Cited

U.S. PATENT DOCUMENTS

| | | | |
|---|---|---|---|
| 8,477,633 | B2 | 7/2013 | Park et al. |
| 2008/0075094 | A1 | 3/2008 | Ahn et al. |
| 2009/0073929 | A1 | 3/2009 | Malladi et al. |
| 2009/0097433 | A1 | 4/2009 | Shen et al. |
| 2009/0175231 | A1 | 7/2009 | Seo et al. |
| 2009/0268624 | A1 | 10/2009 | Imamura et al. |
| 2010/0118807 | A1 | 5/2010 | Seo et al. |
| 2010/0120442 | A1 | 5/2010 | Zhuang et al. |
| 2011/0069637 | A1 | 3/2011 | Liu et al. |
| 2011/0085457 | A1 | 4/2011 | Chen et al. |
| 2011/0170496 | A1 | 7/2011 | Fong et al. |
| 2011/0249640 | A1 | 10/2011 | Soong et al. |
| 2011/0255485 | A1 | 10/2011 | Chen et al. |
| 2011/0317615 | A1 | 12/2011 | Soong et al. |
| 2012/0014330 | A1 | 1/2012 | Damnjanovic et al. |
| 2012/0039283 | A1 | 2/2012 | Chen et al. |
| 2012/0054258 | A1 | 3/2012 | Li et al. |
| 2012/0063386 | A1 | 3/2012 | Park et al. |
| 2012/0069764 | A1 | 3/2012 | Classon et al. |
| 2012/0113884 | A1 | 5/2012 | Park et al. |
| 2012/0120868 | A1 | 5/2012 | Park et al. |
| 2012/0218964 | A1 | 8/2012 | Park et al. |
| 2012/0236816 | A1 | 9/2012 | Park et al. |
| 2012/0275400 | A1 | 11/2012 | Chen et al. |
| 2012/0320782 | A1 | 12/2012 | Seo et al. |
| 2012/0320819 | A1 | 12/2012 | Kim et al. |
| 2012/0320840 | A1 | 12/2012 | Kim et al. |
| 2013/0010685 | A1 | 1/2013 | Kim et al. |
| 2013/0034072 | A1 | 2/2013 | Kim et al. |

FOREIGN PATENT DOCUMENTS

| | | |
|---|---|---|
| KR | 10-2008-0028264 A | 3/2008 |
| WO | WO 2008/041819 A2 | 4/2008 |
| WO | WO 2010/039003 A2 | 4/2010 |
| WO | WO 2011/019916 A1 | 2/2011 |
| WO | WO 2011/032510 A1 | 3/2011 |
| WO | WO 2011/124028 A1 | 10/2011 |

OTHER PUBLICATIONS

Huawei, "Frequency diversity techniques and rate-matching for R-PDCCH", 3GPP TSG RAN WG1 Meeting #61, R1-103123, Montreal, Canada, May 10-14, 2010, 6 pages.
Huawei, "R-PDCCH Design", 3GPP TSG RAN WG1 Meeting #58, R1-093042, Shenzhen, China, Aug. 24-28, 2009, 6 pages.
LG Electronics, "Resource Allocation and Downlink Control Channel Structure for Relay Backhaul Link", 3GPP TSG RAN WG1 Meeting #56bis, Mar. 23-27, 2009, R1-091194, <URL=http://ftp.3gpp.org/tsg_ran/WG1_RL1/TSGR1_56b/Docs/>.
Panasonic, "Relay Control Issues", 3GPP TSG-RAN WG1 Meeting 58, R1-093462, Shenzhen, China, Aug. 24-28, 2009, pp. 1-5.
Samsung, "R-PDCCH multiplexing", 3GPP TSG RAN WG1 Meeting #61, R1-103041, Montreal, Canada, May 10-14, 2010, 6 pages.
ZTE, "The mapping schemes of R-PDCCH", R1-102915, TSG-RAN WG1 #61, Montreal, Canada, May 10-14, 2010, pp. 1-5.
CMCC, "Un R-PDCCH Design," 3GPP TSG-RAN WG1 #61bis, R1-104118, Dresden, Germany, Jun. 28-Jul. 2, 2010 (EPO Server date Jun. 24, 2010), pp. 1-7, XP-50449522A.
NEC Group, "Supporting Frequency Diversity and Frequency Selective R-PDCCH Transmissions," TSG-RAN WG1#60Bis, R1-102267, Beijing, P.R. China, Apr. 12-16, 2010 (EPO Server date Apr. 6, 2010), pp. 1-5, XP-50419526A.
NEC Group, "Supporting Frequency Diversity and Frequency Selective R-PDCCH Transmissions," TSG-RAN WG1#61, R1-103062, Montreal, Canada, May 10-14, 2010 (EPO Server date May 4, 2010), pp. 1-6, XP-50420151A.
Panasonic, "R-PDCCH Placement," 3GPP TSG RAN WG1 Meeting #60bis, R1-102042, Beijing, China, Apr. 12-16, 2010 (EPO Server date Apr. 6, 2010), pp. 1-5, XP-50419373A.

FIG. 26

Case 1

RA for RN1=0

| No Data for RN 1 | No Data for RN 1 |
|---|---|
| No Data for RN 1 | No Data for RN 1 |
| No Data for RN 1 | No Data for RN 1 |
| DL Grant for RN 1 or RN 2 | Protected SS for UL Grant |

RA for RN1=1

| No Data for RN 1 | No Data for RN 1 |
|---|---|
| No Data for RN 1 | No Data for RN 1 |
| No Data for RN 1 | No Data for RN 1 |
| DL Grant for RN 1 or RN 2 | Protected SS for UL Grant |

Case 2

| No Data for RN 1 | No Data for RN 1 |
|---|---|
| No Data for RN 1 | No Data for RN 1 |
| No Data for RN 1 | No Data for RN 1 |
| DL Grant for RN 1 or RN 2 | No Data for RN 1 |

| No Data for RN 1 | No Data for RN 1 |
|---|---|
| No Data for RN 1 | No Data for RN 1 |
| No Data for RN 1 | No Data for RN 1 |
| DL Grant for RN 1 or RN 2 | Data for RN 1 |

FIG. 29

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | |
|---|---|---|---|---|---|---|---|---|---|---|---|---|---|---|---|---|---|---|---|---|---|---|---|---|---|---|---|---|---|---|
| subset# | 0 | 0 | 0 | 0 | 0 | 0 | 0 | 0 | 2 | 2 | 2 | 2 | 2 | 2 | 2 | 2 | 3 | 3 | 3 | 3 | 3 | 3 | 3 | 3 | 2 | 2 | 2 | 2 | 3 | |
| 1st Slot | 0 | 4 | 8 | 12 | 16 | 20 | 24 | 28 | 32 | 36 | 40 | 44 | 48 | 52 | 56 | 60 | 64 | 68 | 72 | 76 | 80 | 84 | 88 | 92 | 1 | 5 | 9 | 13 | 17 | PRB Index |
| 2nd Slot | 2 | 6 | 10 | 14 | 18 | 22 | 26 | 30 | 34 | 38 | 42 | 46 | 50 | 54 | 58 | 62 | 66 | 70 | 74 | 78 | 82 | 86 | 90 | 94 | 3 | 7 | 11 | 15 | 19 | VRB Index |

FIG. 30

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | |
|---|---|---|---|---|---|---|---|---|---|---|---|---|---|---|---|---|---|---|---|---|---|---|---|---|---|---|---|---|---|---|---|---|
| subset# | 0 | 0 | 0 | 0 | 0 | 0 | -2 | -2 | -2 | 0 | 0 | 0 | 0 | -1 | -1 | -1 | -2 | -1 | 0 | 0 | 0 | 0 | 0 | 0 | -2 | -2 | -2 | 0 | 0 | 0 | 0 | PRB Index |
| 1st Slot | 0 | 4 | 8 | 12 | 16 | 20 | 24 | 28 | 32 | 1 | 5 | 9 | 13 | 17 | -1 | -1 | -1 | -1 | 2 | 6 | 10 | 14 | 18 | 21 | 23 | 25 | 27 | 3 | 7 | 11 | 15 | VRB Index |
| 2nd Slot | 2 | 6 | 10 | 14 | 18 | 21 | 23 | 25 | 27 | 3 | 7 | 11 | 15 | 19 | -1 | -1 | -1 | 0 | 4 | 8 | 12 | 16 | 20 | 22 | 24 | 26 | 1 | 5 | 9 | 13 | |

FIG. 43

| PRB Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| subset# | 0 | 0 | -1 | -1 | -1 | -1 | -2 | -2 | 0 | 0 | 0 | -1 | -1 | -1 | -1 | -2 | -2 | -1 | -1 | 0 | 0 | -1 | -1 | -2 | -2 | -2 | 0 | 0 | 0 | -1 | -1 | -1 |
| 1st Slot | 0 | 4 | 8 | 12 | 14 | 20 | 22 | 24 | 26 | 0 | 5 | 9 | 13 | 17 | -1 | -1 | -1 | -1 | 2 | 6 | 10 | 14 | 18 | 21 | 23 | 25 | 27 | 0 | 7 | 11 | 15 | 19 |
| 2nd slot | 2 | 6 | 10 | 14 | 18 | 21 | 23 | 25 | 27 | 1 | 7 | 11 | 15 | 19 | -1 | -1 | -1 | -1 | 0 | 4 | 8 | 12 | 16 | 20 | 22 | 24 | 26 | 1 | 5 | 9 | 13 | 17 |

FIG. 44

| subset# | 0 | 0 | 0 | 0 | -1 | -1 | +2 | +2 | -2 | 0 | 0 | 0 | 0 | -1 | -1 | +2 | +2 | -2 | -2 | -2 | +2 | +2 | -1 | -1 | 0 | 0 | 0 | 0 | -1 | -1 | -2 | +2 | +2 | -2 | -1 | -1 | 0 | 0 | 0 | 0 | -1 | -1 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1st Slot | 0 | 4 | 8 | 12 | 14 | 20 | 22 | 24 | 26 | 1 | 5 | 9 | 13 | 15 | 17 | -1 | -1 | -1 | -1 | -1 | -1 | -1 | -1 | -1 | 2 | 6 | 10 | 14 | 18 | 21 | 23 | 25 | 27 | 3 | 7 | 11 | 15 | 19 |
| 2nd Slot | 2 | 6 | 10 | 14 | 18 | 21 | 23 | 25 | 27 | 3 | 7 | 11 | 15 | 19 | -1 | -1 | -1 | -1 | -1 | -1 | -1 | 0 | 4 | 8 | 12 | 16 | 20 | 22 | 24 | 26 | 1 | 5 | 9 | 13 | 17 |

FIG. 45

METHOD FOR ALLOCATING RESOURCES IN A WIRELESS COMMUNICATION SYSTEM AND A DEVICE FOR THE SAME

CROSS-REFERENCE TO RELATED APPLICATIONS

This application is a Continuation of U.S. patent application Ser. No. 14/575,711 filed on Dec. 18, 2014, which is a Continuation of U.S. patent application Ser. No. 13/640,706 filed on Oct. 11, 2012 (now U.S. Pat. No. 9,414,370), which is filed as the National Phase of PCT/KR2011/003596 filed on May 16, 2011, which claims the benefit under 35 U.S.C. §119(e) to U.S. Provisional Application Nos. 61/373,270 filed on Aug. 12, 2010, 61/366,527 filed on Jul. 21, 2010, 61/356,024 filed on Jun. 17, 2010, 61/350,030 filed on Jun. 1, 2010, 61/349,210 filed on May 28, 2010, 61/346,010 filed on May 18, 2010, and 61/334,974 filed on May 14, 2010, all of which are hereby expressly incorporated by reference into the present application.

BACKGROUND OF THE INVENTION

The present invention relates to a wireless communication system, and more particularly, to a method and apparatus for allocating resources for a physical channel to a relay node.

Wireless communication systems have been extensively developed to provide various types of communication services such as a voice or data service. Generally, a wireless communication system refers to a multiple access system capable of supporting communication with multiple users by sharing available system resources (bandwidth, transmit power, etc.). The multiple access system includes, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system, etc.

SUMMARY OF THE INVENTION

It is an object of the present invention to provide a method and apparatus for efficiently allocating resources for a physical channel in a wireless communication system, preferably, in a relay system. It is another object of the present invention to provide a method and apparatus for efficiently processing a downlink signal.

It will be appreciated by persons skilled in the art that that the technical objects that can be achieved through the present invention are not limited to what has been particularly described hereinabove and other technical objects of the present invention will be more clearly understood from the following detailed description.

According to an aspect of the present invention, A method for handling downlink signal by relay in a wireless communication system, the method comprising of: receiving a first physical control channel includes resource allocation information for resource block group (RBG); and performing a process for receiving a physical shared channel from one or more RBGs indicated by the resource allocation information, wherein the one or more allocated RBGs include a resource block (RB) pair received the first physical control channel, wherein the resource block pair is excluded from the process for receiving a physical shared channel when the second slot of the RB pair is set to a searching space for a second physical control channel.

According to other aspect of the present invention, A relay is used in a wireless communication system, the apparatus comprising of: a radio frequency unit; and a processor, wherein the processor is configured to receive a first physical control channel includes resource allocation information for resource block group (RBG), and to perform a process for receiving a physical shared channel from one or more RBG is indicated by the resource allocation information, wherein the one or more allocated RBGs include an RB pair received the first physical control channel, wherein the RB pair is excluded from the process for receiving a physical shared channel when the second slot of the RB pair is set to a searching space for a second physical control channel.

Preferably, the searching space for the second physical control channel is set by radio resource control (RRC) signaling.

Preferably, the first and the second physical control channel have been interleaved by a plurality of resource blocks.

Preferably, the first physical channel is used to carry downlink grant, and the second physical channel is used to carry uplink grant.

Preferably, the first and the second physical control channel include Relay Physical Downlink Control Channel (R-PDCCH), and the physical shared channel includes Relay Physical Downlink Shared Channel (R-PDSCH).

According to embodiments of the present invention, resources for a physical channel can be efficiently allocated in a wireless communication system, preferably, in a relay system. In addition, a downlink signal can be efficiently processed.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included as a part of detailed description to provide a further understanding of the invention, illustrate embodiments of the invention and together with the description serve to explain the technical principle of the invention.

In the drawings:

FIG. 26 illustrates exemplary R-PDCCH/R-PDSCH RA;

FIGS. 29 to 32 illustrate exemplary R-PDCCH SS configurations according to RA types;

FIGS. 43 to 45 illustrate a rule of mapping R-PDCCHs to PRBs;

DETAILED DESCRIPTION OF THE INVENTION

Configurations, functions, and other features of the present invention will be readily understood by the embodiments of the present invention described below with reference to the attached drawings. The embodiments of the present invention can be used for a variety of radio access techniques, for example, CDMA, FDMA, TDMA, OFDMA, SC-FDMA, and MC-FDMA. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as IEEE 802.11 (Wi-Fi), IEEE 802.16 (WiMax), IEEE 802-20, and Evolved UTRA (E-UTRA). UTRA is a part of the Universal Mobile Telecommunications System (UMTS). 3rd Generation Partnership Project (3GPP) Long Term Evolution (LTE) is a part of Evolved UMTS (E-UMTS) which uses E-UTRA. LTE-Advanced (LTE-A) is an evolved version of 3GPP LTE.

Although the following embodiments are described focusing on the case in which technical features of the present invention are applied to a 3GPP system, this is purely exemplary and the present invention is not limited thereto.

Figure 1:
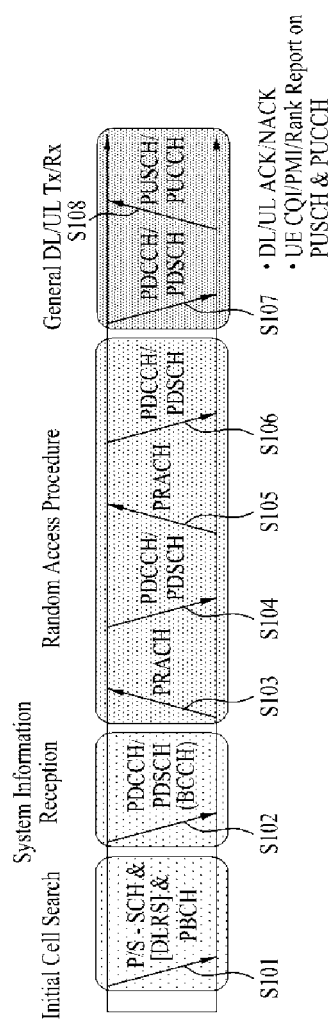
FIG. 1 illustrates physical channels and signal transmission on the physical channels in a 3rd Generation Partnership Project (3GPP) system.

FIG. 1 illustrates physical channels and signal transmission on the physical channels in an LTE system.

When a User Equipment (UE) is powered on or enters a new cell, the UE performs initial cell search such as synchronization adjustment with a Base Station (BS) (S101). To this end, the UE may receive a Primary Synchronization Channel (P-SCH) and a Secondary Synchronization Channel (S-SCH) from the BS to establish synchronization with the BS and acquire information such as a cell identity (ID). Thereafter, the UE may receive a physical broadcast channel from the BS to thus acquire broadcast information within the cell.

Upon completion of the initial cell search, the UE may receive a Physical Downlink Control Channel (PDCCH) and receive a Physical Downlink Shared Channel (PDSCH) according to information included in the PDCCH to acquire more detailed system information (S102).

Meanwhile, if the UE initially accesses the BS or has no radio resources for signal transmission, the UE may perform a random access procedure with respect to the BS (steps S103 to S106). To this end, the UE may transmit a specific sequence through a Physical Random Access Channel (PRACH) as a preamble (S103 and S105), and receive a response message to the preamble through the PDCCH and the PDSCH corresponding to the PDCCH (S104 and S106). If the random access procedure is contention-based, the UE may additionally perform a contention resolution procedure.

The UE which has performed the above procedures may then receive a PDCCH/PDSCH (S107) and transmit a Physical Uplink Shared Channel (PUSCH)/Physical Uplink Control Channel (PUCCH) (S108) as a general uplink/downlink (UL/DL) signal transmission procedure. Control information that the UE transmits to the BS on UL or receives from the BS includes a DL/UL Acknowledgement/Negative Acknowledgement (ACK/NACK) signal, a Channel Quality Indicator (CQI), Scheduling Request (SR), a Precoding Matrix Index (PMI), a Rank Indicator (RI), and the like. In the 3GPP LTE system, the UE may transmit the control information such as CQI/PMI/RI through the PUSCH and/or the PUCCH.

Figure 2:
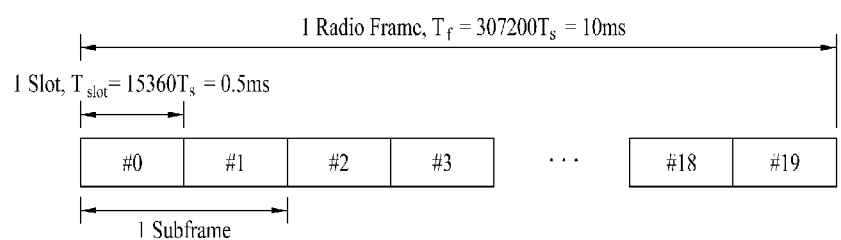
FIG. 2 illustrates the structure of a radio frame in a 3GPP system.

FIG. 2 illustrates the structure of a radio frame used in a 3GPP system.

Referring to FIG. 2, a radio frame has a length of 10 ms (307200 $T_s$) and includes 10 equally-sized subframes. Each of the subframes has a length of 1 ms and includes two slots. Each of the slots has a length of 0.5 ms (15360 $T_s$). Here, $T_s$ denotes a sampling time and is represented as $T_s=1/(15 \text{ kHz} \times 2048)=3.2552 \times 10^{-8}$ (about 33 ns). Each slot includes a plurality of Orthogonal Frequency Division Multiplexing (OFDM) symbols in the time domain and includes a plurality of Resource Blocks (RBs) in the frequency domain. In the LTE system, one RB includes 12 subcarriers×7 (or 6) OFDM symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots, or the number of OFDM symbols.

Figure 3:
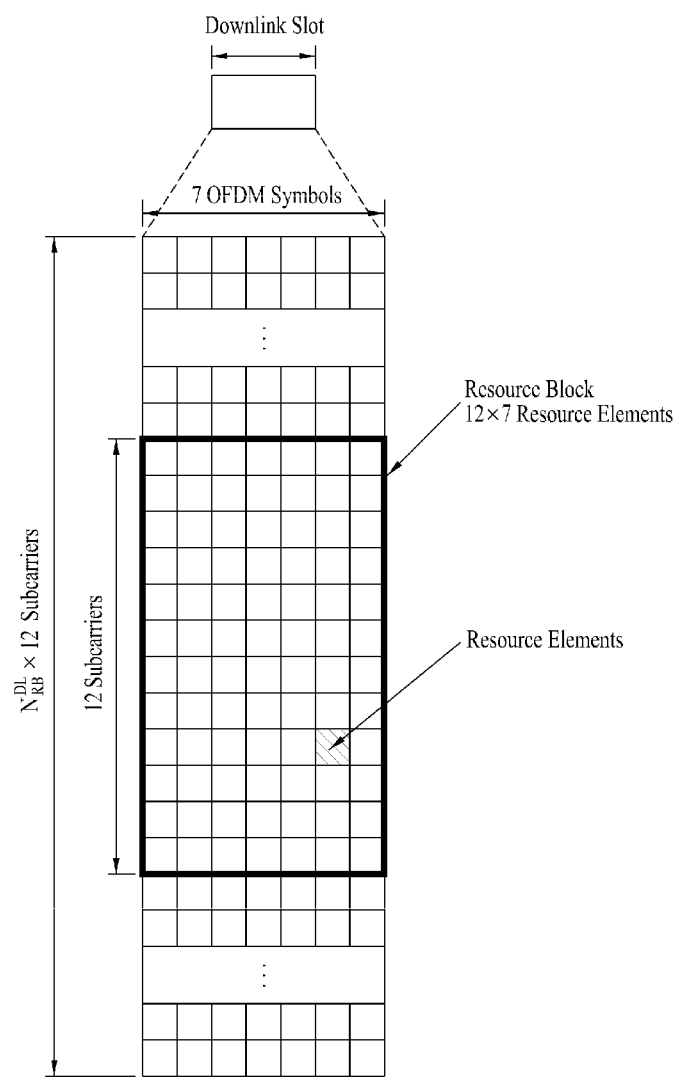
FIG. 3 illustrates a resource grid for a downlink slot.

FIG. 3 illustrates a resource grid for a DL slot.

Referring to FIG. 3, a DL slot includes 7(or 6) OFDM symbols in the time domain and $N^{DL}_{RB}$ RBs in the frequency domain. Since each RB includes 12 subcarriers, the DL slot includes $N^{DL}_{RB} \times 12$ subcarriers in the frequency domain.

Although FIG. 3 illustrates the case in which a DL slot includes 7 OFDM symbols and an RB includes 12 subcarriers, the present invention is not limited thereto. For example, the number of OFDM symbols included in the DL slot may vary according to the length of a Cyclic Prefix (CP). Each element on the resource grid is referred to as a Resource Element (RE). An RE is a minimum time/frequency resource defined in a physical channel and is indicated by one OFDM symbol index and one subcarrier index. One RB includes $N_{symb}^{DL} \times N_{sc}^{RB}$ REs where $N_{symb}^{DL}$ denotes the number of OFDM symbols included in a DL slot and $N_{sc}^{RB}$ denotes the number of subcarriers included in an RB. The number of RBs included in a DL slot, $N^{DL}_{RB}$, is determined based on a DL transmission bandwidth configured in a cell.

Figure 4:
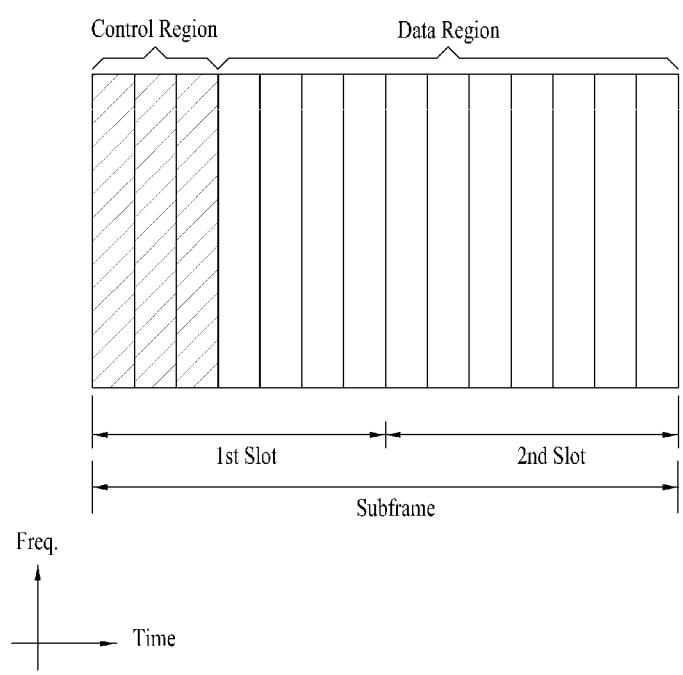
FIG. 4 illustrates the structure of a downlink subframe.

FIG. 4 illustrates the structure of a DL subframe used in a 3GPP system.

Referring to FIG. 4, a DL subframe includes plural (e.g. 12 or 14) OFDM symbols. A plurality of OFDM symbols starting from a front portion of the subframe is used as a control region and the remaining OFDM symbols are used as a data region. The size of the control region may be independently determined according to each subframe. The control region is used to transmit scheduling information and layer 1/layer 2(L1/L2) control information, whereas the data region is used to transmit traffic. Control channels include a Physical Control Format Indicator Channel (PCFICH), a Physical Hybrid automatic repeat request Indicator Channel (PHICH), and a Physical Downlink Control Channel (PDCCH). A traffic channel includes a Physical Downlink Shared Channel (PDSCH).

The PDCCH informs each UE or UE group of information related to resource allocation of a Paging Channel (PCH) and a Downlink-Shared Channel (DL-SCH), a UL scheduling grant, HARQ information, etc. The PCH and the DL-SCH are transmitted through the PDSCH. Accordingly, a BS and a UE generally transmit and receive, respectively, data through the PDSCH, except for specific control information or specific service data. Control information transmitted through the PDCCH is referred to as Downlink Control Information (DCI). The DCI indicates UL resource allocation information, DL resource allocation information, and a UL transmit power control command for certain UE groups. Table 1 shows DCI according to DCI formats.

TABLE 1

| DCI format | Description |
|---|---|
| DCI format 0 | Used for scheduling of PUSCH |
| DCI format 1 | Used for scheduling of one PDSCH codeword |
| DCI format 1A | Used for compact scheduling of one codeword and random access procedure initiated by PDCCH order |
| DCI format 1B | Used for compact scheduling of one PDSCH codeword with precoding information |
| DCI format 1C | Used for very compact scheduling of one PDSCH codeword |
| DCI format 1D | Used for compact scheduling of one PDSCH codeword with precoding and power offset information |
| DCI format 2 | Used for scheduling of PDSCH to UEs configured in closed- loop spatial multiplexing mode |
| DCI format 2A | Used for scheduling of PDSCH to UEs configured in open- loop spatial multiplexing mode |
| DCI format 3 | Used for transmission of TPC commands for PUCCH and PUSCH with 2-bit power adjustments |
| DCI format 3A | Used for transmission of TPC commands for PUCCH and PUSCH with 1-bit power adjustments |

DCI format 0 indicates UL resource allocation information, DCI formats 1 to 2 indicate DL resource allocation information, and DCI formats 3 and 3A indicate UL Transmit Power Control (TPC) commands for UE groups. A BS determines a PDCCH format according to DCI to be transmitted to a UE and attaches Cyclic Redundancy Check (CRC) to control information. A unique identifier (e.g. Radio Network Temporary Identifier (RNTI)) is masked to the CRC according to the owner or usage of the PDCCH.

Figure 5:
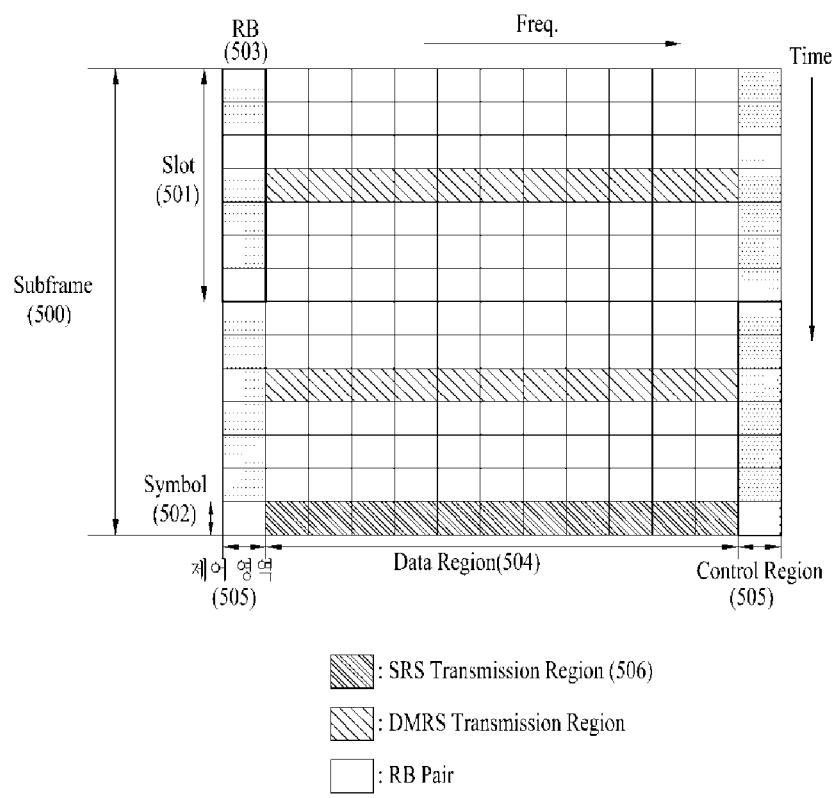
FIG. 5 illustrates the structure of an uplink subframe used in a 3GPP system.

FIG. 5 illustrates the structure of a UL subframe used in a 3GPP system.

Referring to FIG. 5, a 1 ms subframe 500, which is a basic unit for LTE UL transmission, includes two 0.5 ms slots. In a normal CP, each slot includes 7 symbols 502 each corresponding to one SC-FDMA symbol. An RB 503 is a resource allocation unit corresponding to 12 subcarriers in the frequency domain and one slot in the time domain. An LTE UL subframe is broadly divided into a data region 504 and a control region 505. The data region refers to communication resources used for transmitting data such as voice and packets to each UE and includes a PUSCH. The control region refers to communication resources used for transmitting a DL channel quality report received from each UE, an ACK/NACK for a received DL signal, and a UL SR and includes a PUCCH. A Sounding Reference Signal (SRS) is transmitted on an SC-FDMA symbol, which is located at the last portion in one subframe in the time domain, through a data transmission band in the frequency domain. SRSs of multiple UEs transmitted on the last SC-FDMA symbol in the same subframe are distinguishable according to frequency positions/sequences.

RB mapping will be described below. Physical Resource Blocks (PRBs) and Virtual Resource Blocks (VRBs) are defined. The PRBs are configured as illustrated in FIG. 3. That is, a PRB is defined as $N_{symb}^{DL}$ contiguous OFDM symbols in the time domain and $N_{sc}^{RB}$ contiguous subcarriers in the frequency domain. PRBs are numbered from 0 to $N_{RB}^{DL}-1$ in the frequency domain. The relationship between a PRB number $n_{PRB}$ and an RE (k,l) in a slot is given by Equation 1:

$$n_{PRB} = \left\lfloor \frac{k}{N_{sc}^{RB}} \right\rfloor \quad \text{[Equation 1]}$$

where k denotes a subcarrier index and $N_{sc}^{RB}$ denotes the number of subcarriers included in one RB.

The VRB is equal to the PRB in size. A Localized VRB (LVRB) of a localized type and a Distributed VRB (DVRB) of a distributed type are defined. Regardless of VRB type, a pair of RBs is allocated by a single VRB number $n_{VRB}$ throughout two slots of a subframe.

Figure 6:
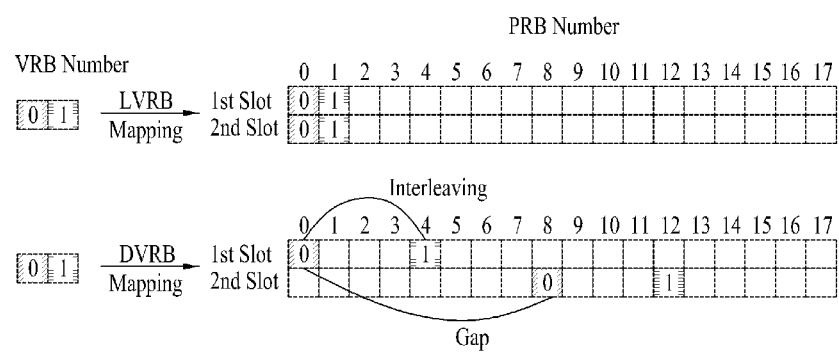
FIG. 6 illustrates mapping of Virtual Resource Blocks (VRBs) to Physical Resource Blocks (PRBs)

FIG. 6 illustrates a method of mapping VRBs to PRBs.

Referring to FIG. 6, since LVRBs are directly mapped to PRBs, a VRB number $n_{VRB}$ corresponds identically to a PRB number $n_{PRB}$ ($n_{PRB}=n_{VRB}$). VRBs are numbered from 0 to $N_{VRB}^{DL}-1$ where $N_{VRB}^{DL}=N_{RB}^{DL}$. Meanwhile, DVRBs are mapped to PRBs after interleaving. More specifically, the DVRBs may be mapped as shown in Table 2. Table 2 lists RB gap values.

TABLE 2

| | Gap ($N_{gap}$) | |
|---|---|---|
| System BW ($N_{RB}^{DL}$) | 1st gap ($N_{gap,1}$) | 2nd gap ($N_{gap,2}$) |
| 6-10 | $\lfloor N_{RB}^{DL}/2 \rfloor$ | N/A |

TABLE 2-continued

| System BW ($N_{RB}^{DL}$) | Gap ($N_{gap}$) | |
|---|---|---|
| | 1st gap ($N_{gap,1}$) | 2nd gap ($N_{gap,2}$) |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. in PRBs) when VRBs of the same number are mapped to PRBs in the first and second slots of a subframe. If $6 \leq N_{RB}^{DL} \leq 49$, only one gap value is defined ($N_{gap}=N_{gap,1}$). If $50 \leq N_{RB}^{DL} \leq 110$, two gap values $N_{gap,1}$ and $N_{gap,2}$ are defined. $N_{gap}=N_{gap,1}$ or $N_{gap}=N_{gap,2}$ is signaled through DL scheduling. DVRBs are numbered from 0 to $N_{VRB}^{DL}-1$. If $N_{gap}=N_{gap,1}$, then $N_{VRB}^{DL}=N_{VRBgap1}^{DL}=2 \cdot \min(N_{gap}, N_{RB}^{DL}-N_{gap})$, and if $N_{gap}=N_{gap,2}$, the $N_{VRB}^{DL}=N_{VRBgap2}^{DL}=\lfloor N_{RB}^{DL}/2N_{gap} \rfloor \cdot 2N_{gap}$ where min(A,B) denotes a smaller of A or B.

Consecutive $\tilde{N}_{VRB}^{DL}$ VRB numbers form a VRB number interleaving unit. If $N_{gap}=N_{gap,1}$, then $\tilde{N}_{VRB}^{DL}=N_{VRB}^{DL}$, and if $N_{gap}=N_{gap,2}$, then $\tilde{N}_{VRB}^{DL}=2N_{gap}$. VRB number interleaving of each interleaving unit may be performed using 4 columns and $N_{row}$ rows. $N_{row}=\lceil \tilde{N}_{VRB}^{DL}/(4P) \rceil \cdot P$ where P denotes the size of a Resource Block Group (RBG). An RBG is defined as P consecutive RBs. A VRB number is recorded in a matrix row by row and read from the matrix column by column. $N_{null}$ nulls are inserted into the last $N_{null}/2$ rows of the second and fourth columns and $N_{null}=4N_{row}-\tilde{N}_{VRB}^{DL}$. A null value is disregarded during reading.

Figure 7:
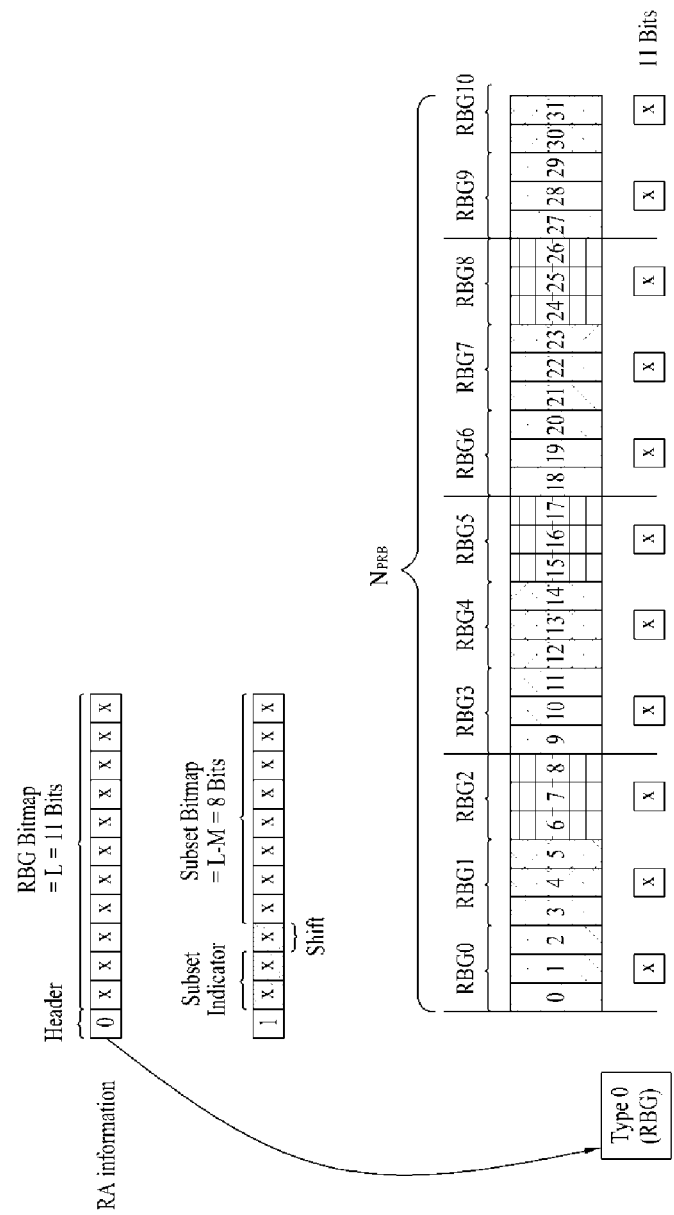
FIGS. 7 to 9 illustrate type 0 Resource Allocation (RA), type 1 RA, and type 2 RA, respectively.
Figure 8:
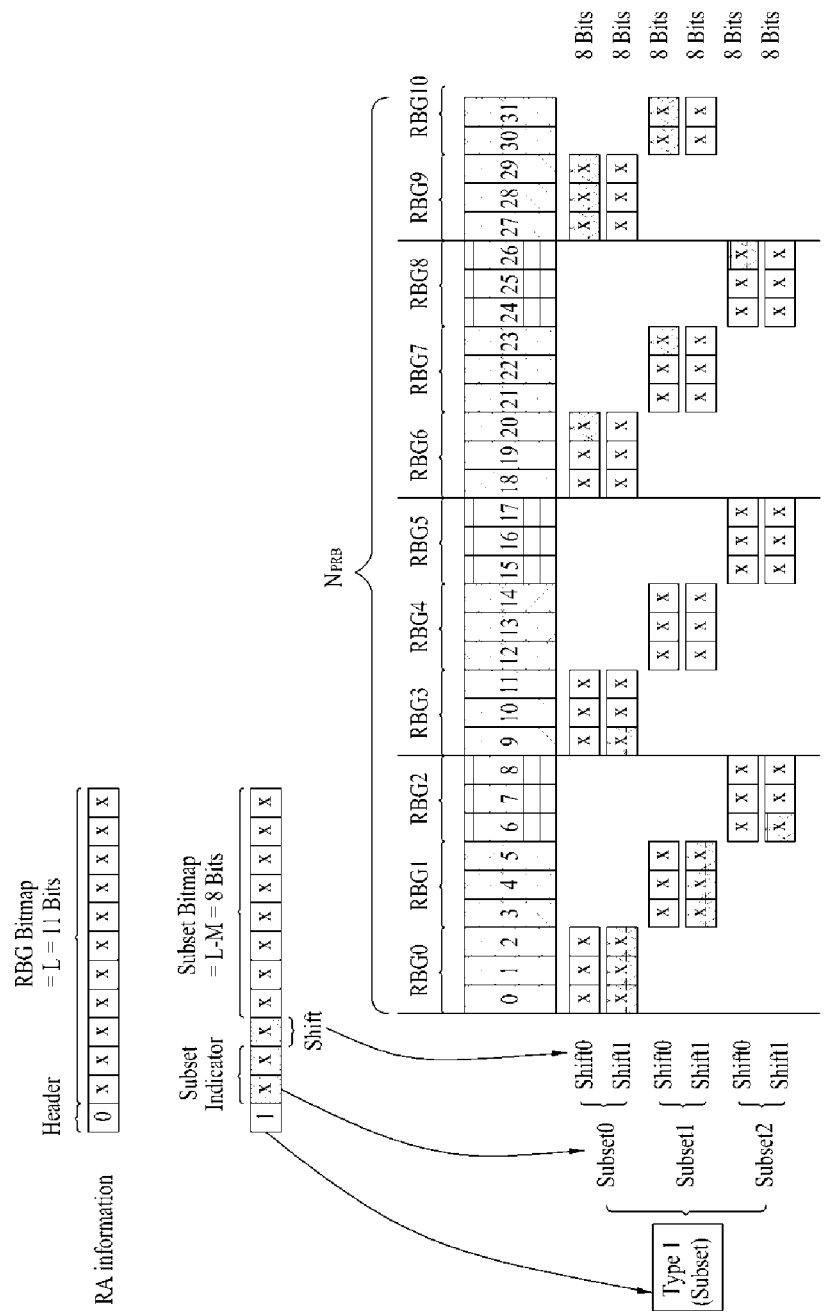
Figure 9:
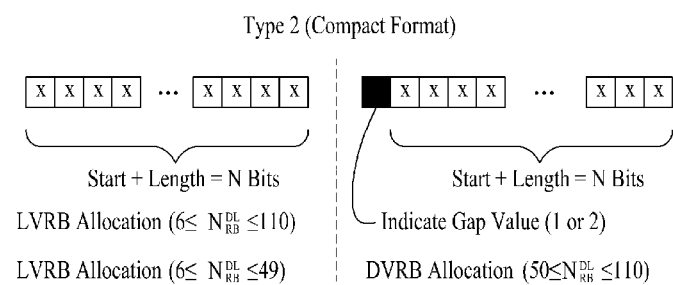

Hereinbelow, resource allocation defined in legacy LTE will be described with reference to the drawings. FIGS. 7, 8, and 9 illustrate control information formats for type 0 Resource Allocation (RA), type 1 RA, and type 2 RA, respectively, and examples of RA corresponding thereto.

A UE interprets an RA field based on a detected PDCCH DCI format. An RA field within each PDCCH includes two parts of an RA header field and actual RB allocation information. PDCCH DCI formats 1, 2 and 2A for type 0 and type 1 RA have the same format and are distinguished through a one-bit RA header field according to DL system band. More specifically, type 0 RA is indicated by 0 and type 1 RA is indicated by 1. PDCCH DCI formats 1, 2, and 2A are used for type 0 or type 1 RA, whereas PDCCH DCI format 1A, 1B, 1C, and 1D are used for type 2 RA. A PDCCH DCI format having type 2 RA does not contain an RA header field.

Referring to FIG. 7, RB allocation information in type 0 RA includes a bitmap indicating an RBG allocated to a UE. An RBG is a set of consecutive PRBs. An RBG size P depends on system bandwidth as shown in Table 3.

TABLE 3

| System BW $N_{RB}^{DL}$ | RBG size (P) |
|---|---|
| ≤10 | 1 |
| 11-26 | 2 |
| 27-63 | 3 |
| 64-110 | 4 |

The total number $N_{RBG}$ of RBGs in a DL system bandwidth having $N_{RB}^{DL}$ PRBs is given by $N_{RBG}=\lceil N_{RB}^{DL}/P \rceil$ and the size of $\lfloor N_{RB}^{DL}/P \rfloor$ RBGs is P. If $N_{RB}^{DL}$ modP>0, the size of one of RBGs is given by $N_{RB}^{DL}-P \cdot \lfloor N_{RB}^{DL}/P \rfloor$ where mod denotes a modulo operation, $\lceil \ \rceil$ denotes the ceiling function, and $\lfloor \ \rfloor$ denotes the flooring function. The size of a bitmap is $N_{RBG}$ and each bit of the bitmap corresponds to one RBG. The RBGs are indexed from 0 to $N_{RBG}-1$ in ascending order of frequency. RBG 0 to RBG $N_{RBG}-1$ are mapped to bits starting from the Most Significant Bit (MSB) to the Least Significant Bit (LSB) of the bitmap.

Referring to FIG. 8, in type 1 RA, RB allocation information of size $N_{RBG}$ indicates resources within an RBG subset to a scheduled UE on a PRB basis. An RBG subset p (0≤p<P) includes every P-th RBG starting from RBG p. The RB allocation information includes three fields. The first field includes $\lceil \log_2(P) \rceil$ bits indicating an RBG subset selected from among P RBG subsets. The second field includes one bit indicating a shift of RA span within the subset. If a bit value is 1, this represents that the shift is triggered and, otherwise, this represents that the shift is not triggered. The third field includes a bitmap, each bit thereof indicates one PRB within the selected RBG subset. A bitmap part used to indicate a PRB within the selected RBG subset is $N_{RB}^{TYPE1}$ in size and is defined as Equation 2:

$$N_{RB}^{TYPE1}=\lceil N_{RB}^{DL}/P \rceil - \lceil \log_2(P) \rceil - 1 \qquad \text{[Equation 2]}$$

An addressable PRB number in the selected RBG subset starts from an offset $\Delta_{shift}(p)$ for the smallest PRB number within the selected RBG subset and may be mapped to the MSB of the bitmap. The offset is expressed as the number of PRBs and applied within the selected RBG subset. If a bit value in the second field for shift of an RA span is set to 0, the offset for the RBG p is given by $\Delta_{shift}(p)=0$. Otherwise, the offset for the RBG subset p is given by $\Delta_{shift}(p)=N_{RB}^{RBGsubset}(p)-N_{RB}^{TYPE1}$ where $N_{RB}^{RBGsubset}(p)$ denotes the number of PRBs in the RBG subset p, calculated by Equation 3.

$$N_{RB}^{RBGsubset}(p) = \qquad \text{[Equation 3]}$$

$$\begin{cases} \lfloor \frac{N_{RB}^{DL}-1}{P^2} \rfloor \cdot P + P, & p < \lfloor \frac{N_{RB}^{DL}-1}{P} \rfloor \bmod P \\ \lfloor \frac{N_{RB}^{DL}-1}{P^2} \rfloor \cdot P + (N_{RB}^{DL}-1) \bmod P + 1, & p = \lfloor \frac{N_{RB}^{DL}-1}{P} \rfloor \bmod P \\ \lfloor \frac{N_{RB}^{DL}-1}{P^2} \rfloor \cdot P, & p > \lfloor \frac{N_{RB}^{DL}-1}{P} \rfloor \bmod P \end{cases}$$

Referring to FIG. 9, RB allocation information in type 2 RA indicates a set of LVRBs or DVRBs which are consecutively allocated to a scheduled UE. If RA is signaled using the PDCCH DCI format 1A, 1B, or 1D, a 1-bit flag indicates whether LVRBs or DVRBs are allocated (e.g. 0 for LVRB allocation and 1 for DVRB allocation). Meanwhile, RA is signaled using the PDCCH DCI format 1C, only the DVRBs are allocated. A type 2 RA field includes a Resource Indication Value (RIV) corresponding to a start RB ($RB_{start}$) and a length. The length indicates the number of virtually consecutively allocated RBs.

Figure 10:
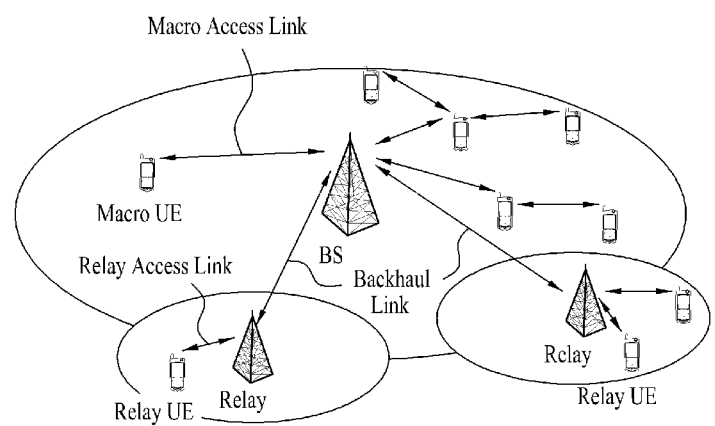
FIG. 10 illustrates a wireless communication system including relays.

FIG. 10 illustrates a wireless communication system including relays. A relay (or Relay Node (RN)) serves to expand a service area of a BS or is installed a shadow area to provide a smooth service. Referring to FIG. 10, a wireless communication system includes a BS, relays, and UEs. A UE communicates with a BS or a relay. For convenience, a UE communicating with a BS is referred to as a macro UE and a UE communicating with a relay is referred to as a relay UE. A communication link between a BS and a macro UE is referred to as a macro access link and a communication link between a relay and a relay UE is referred to as a relay access link. A communication link between a BS and a relay is referred to as a backhaul link.

The relay may be divided into a layer 1 (L1) relay, a layer 2 (L2) relay, and a layer 3 (L3) relay according to which function is performed in multi-hop transmission. Brief features of each relay are as follows. The L1 relay usually functions as a repeater and simply amplifies signals from the BS/UE to transmit the amplified signals to the UE/BS. Since decoding is not performed in the L1 relay, this relay has the advantage of shortening transmission delay but has the disadvantage of amplifying noise too because it cannot distinguish between signals and noise. To compensate for such a shortcoming, an advanced repeater or smart repeater having functions such as UL power control or self-interference cancellation may be used. The L2 relay may perform operation of decode-and-forward and transmit user plane traffic to L2. In this relay, although noise is not amplified, a delay increase occurs due to decoding. The L3 relay is referred to as self-backhauling and may transmit IP packets to L3. The L3 relay includes a Radio Resource Control (RRC) function to serve as a small BS.

The L1 and L2 relays may be explained as parts of a donor cell covered by a BS. If a relay is a part of a donor cell, since the relay cannot control the cell thereof and UEs of the corresponding cell, the relay cannot have a cell ID thereof but may have a relay ID instead. In this case, some functions of Radio Resource Management (RRM) are controlled by a BS of the donor cell and parts of the RRM may be positioned in the relay. The L3 relay can control a cell thereof. In this case, the L3 relay may manage one or more cells and each cell managed by the L3 relay may have a unique physical-layer cell ID. This relay may have the same RRM mechanism as a BS. In terms of the UE, there is no difference between access to a cell managed by the L3 relay and access to a cell managed by a normal BS.

In addition, relays are divided as follows according to mobility thereof:

Fixed RN: This is permanently fixed for use in a shadow area or for cell coverage extension. It is possible for the fixed RN to simply serve as a repeater.

Nomadic RN: This may be temporarily installed when the number of users is abruptly increased. The nomadic RN is movable within a building.

Mobile RN: This can be mounted in public transportation vehicles such as buses or subways and mobility thereof should be supported.

The following classifications may be made according to a link between a relay and a network.

In-band connection: A network-to-relay link and a network-to-UE link within a donor cell share the same frequency band.

Out-band connection: A network-to-relay link and a network-to-UE link within a donor cell share different frequency bands.

The following classifications may also be made according to whether a UE recognizes presence of a relay.

Transparent relay: a UE is not aware that communication with a network is performed through the relay.

Non-transparent relay: A UE is aware that communication with a network is performed through the relay.

Figure 11:
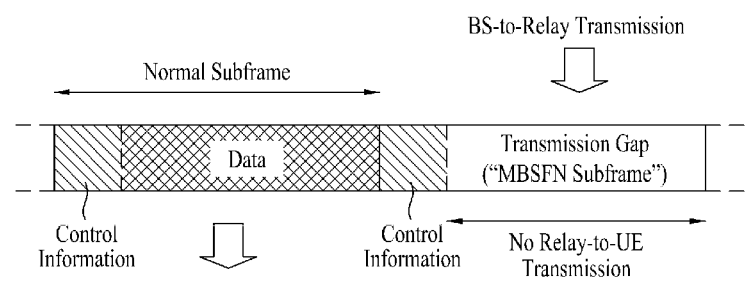
FIG. 11 illustrates exemplary backhaul transmission using a Multicast Broadcast Single Frequency Network (MBSFN) subframe.

FIG. 11 illustrates exemplary backhaul transmission using a Multicast Broadcast Single Frequency Network (MBSFN) subframe. In an in-band relay mode, a BS-to-relay link (i.e. a backhaul link) operates in the same frequency band as a relay-to-UE link (i.e. a relay access link). When a relay transmits signals to a UE while receiving signals from a BS, or vice versa, since a transmitter and a receiver of the relay create mutual interference, concurrent transmission and reception may be limited. To solve this problem, the backhaul link and the relay access link are partitioned by a TDM scheme. In an LTE-A system, a backhaul link is established in a subframe signaled as an MBSFN subframe (fake MBSFN method) in order to support a measurement operation of legacy LTE UEs present in a relay zone. If a certain subframe is signaled as an MBSFN subframe, since a UE receives only a control region of the subframe, the relay may configure the backhaul link using a data region of the subframe. Specifically, the MBSFN subframe is used for BS-relay transmission (e.g. R-PDCCH and R-PDSCH), starting from the third OFDM symbol of the MBSFN subframe.

Hereinafter, a method for allocating and managing resources for a relay-PDCCH (R-PDCCH) is proposed with reference to the drawings according to an embodiment of the present invention.

An R-PDCCH carries DCI for a relay. For details of DCI, reference is made to Table 1. For example, the R-PDCCH may carry DL scheduling information and UL scheduling information for the relay. DL data for the relay (e.g. backhaul data) is received through a relay-PDSCH (R-PDSCH). A communication process using the R-PDCCH/R-PDSCH is performed in the same or similar manner to step 102 in FIG. 1. That is, the relay receives an R-PDCCH and receives data/control information through an R-PDSCH indicated by the R-PDCCH. R-PDCCH transmission processing (e.g. channel coding, interleaving, multiplexing, etc.) may be performed in the same manner as processing defined in legacy LTE within an allowable range or in a simplified manner of processing defined in legacy LTE when necessary. For example, R-PDCCH transmission processing may omit an unnecessary process from processing defined in legacy LTE in consideration of relay properties.

The relay performs R-PDSCH demodulation etc. based on control information which is obtained from the R-PDCCH. Accordingly, it is very important to accurately acquire R-PDCCH information. A legacy LTE system uses a scheme for pre-reserving a PDCCH candidate region (PDCCH search space) in a control region and transmitting a PDCCH of a specific UE to a partial region of the pre-reserved region. Accordingly, the UE obtains a PDCCH thereof within the PDCCH search space through Blind Decoding (BD). Similarly, even in the case of the relay, a scheme for transmitting an R-PDCCH throughout a part or all of the pre-reserved resources may be used.

Figure 13:
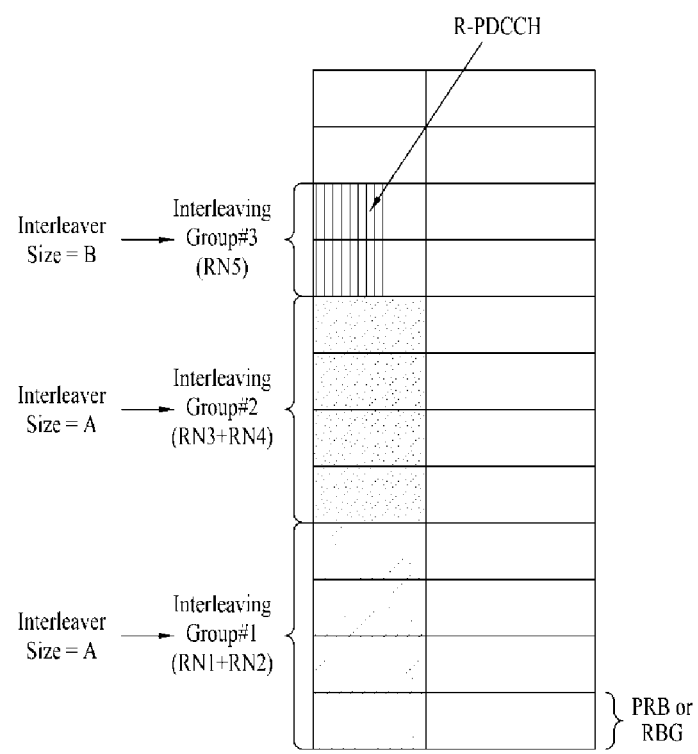
FIG. 13 illustrates exemplary R-PDCCH interleaving.

FIG. 13 illustrates a process of allocating resources for an R-PDCCH and receiving the R-PDCCH using the allocated resources according to an embodiment of the present invention.

Figure 12:
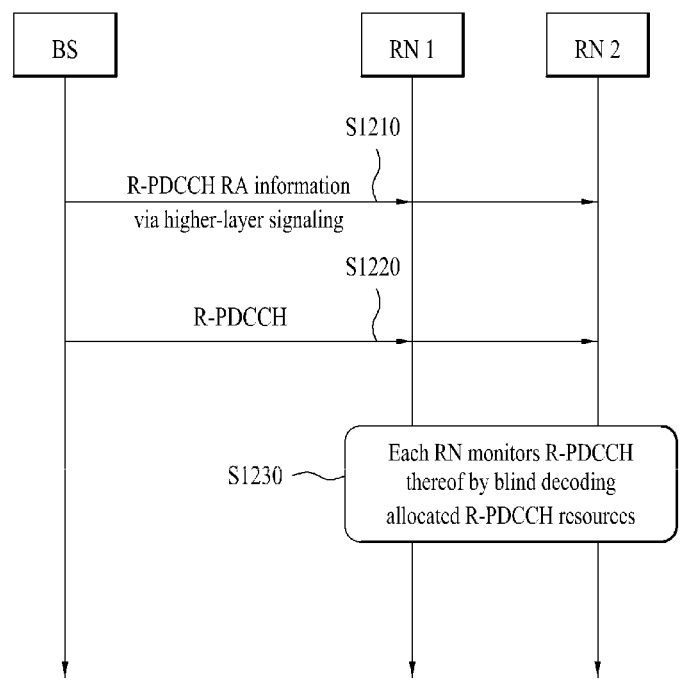
FIG. 12 illustrates a process of allocating resources for an R-PDCCH and receiving the R-PDCCH using the allocated resources according to an embodiment of the present invention.

Referring to FIG. 12, a BS transmits R-PDCCH RA information to RNs (S1210). The R-PDCCH RA information is used to pre-reserve an R-PDCCH resource area. Namely, through the R-PDCCH RA information of this step, the RNs identify, in advance, resource positions in which an R-PDCCH is likely to be transmitted (R-PDCCH search space configuration). For convenience, signaling for R-PDCCH resource reservation of step S1210 is referred to as signal#1. Signal#1 may use higher-layer signaling (e.g. RRC signaling, MAC signaling, etc.), desirably, RRC signaling. Signal#1 may be transmitted in a semi-static manner. Signal#1 may also performed cell-specifically, relay group-specifically, or relay-specifically.

The R-PDCCH search space refers to R-PDCCH resources (R-PDCCH resource area) that an RN should monitor for reception of the R-PDCCH assigned thereto. The R-PDCCH search space includes a relay-common (RN-common) search space and/or a relay-specific (RN-specific) search space. A basic unit of the R-PDCCH resources includes an RB (e.g. 12 consecutive subcarriers*7 (or 6) consecutive OFDM symbols), a Resource Element Group (REG) (e.g. 4 available subcarriers*one OFDM symbol), or a Control Channel Element (CCE) (e.g. plural (e.g. 9) REGs).

Some or all of R-PDCCH resources (R-PDCCH search space) pre-reserved by signal#1 are later used for actual transmission of the R-PDCCH. In most cases, only some of the reserved R-PDCCH resources are used for R-PDCCH transmission. Meanwhile, an RN should share resources with a macro UE in a data region of a backhaul subframe (e.g. MBSFN subframe). Accordingly, it is desirable to maximize multiplexing efficiency within a frame by applying a conventional LVRB/DVRB resource mapping scheme as identically as possible to an RN as well as to a macro UE. Accordingly, the present invention proposes that signal#1 be configured based on the same signaling information as LTE RA signal configuration in order to reserve R-PDDCH resources (e.g. R-PDCCH RBs). Specifically, signal#1 may indicate VRB mapping scheme/allocation information. For example, signal#1 may indicate various VRB mapping schemes/allocation information shown with reference to FIGS. 6 to 9. Desirably, signal#1 includes information about consecutive VRBs (e.g. start point and length) similar to a DVRB allocation scheme (refer to FIG. 9). The number of R-PDCCH RBs pre-reserved according to signal#1 is desirably, but is not limited thereto, a multiple of 4. Advantages that can be obtained when the number of R-PDCCH RBs is a multiple of 4 will be described later. A granularity for R-PDCCH RA includes one RB, an RBG, or a group of X RBs (e.g. a group 4 RBs) according to necessity of RB allocation increment. Desirably, the R-PDCCH resource allocation granularity is 4 RBs or a multiple of 4 RBs, which will be described later.

Meanwhile, in legacy LTE, VRB allocation information (e.g. DVRB RA mapping signaling information) is transmitted only to one LTE UE. However, according to an embodiment of the present invention, RA information (signal#1) configured identically/similarly to conventional VRB allocation information (e.g. DVRB RA mapping signaling information) may be transmitted to plural (e.g. all) RNs and the RNs may recognize the positions of R-PDCCH resources according to a conventional LTE RA rule (e.g. DVRB interleaving rule) (RN (group) common signaling). Although not shown, signal#1 may be transmitted only to one relay in the same manner as in legacy LTE (RN dedicated signaling).

If signal#1 is transmitted through higher-layer signaling (R-PDCCH), an RN is unable to recognize a resource area reserved for the R-PDCCH during initial access. Accordingly, the RN may be configured in a form of decoding the R-PDCCH under the assumption of the R-PDCCH is present in a specific RB index during initial access (UE mode). Next, the RN may recognize the resource area reserved for the R-PDCCH from signal#1 received through higher-layer (e.g. RRC) signaling in a semi-static manner (RN mode). However, if the reserved R-PDCCH area is changed, the RN may not accurately know from when the reserved R-PDCCH region has been changed. In this case, problems may occur in R-PDCCH decoding. Even if there are no problems in R-PDCCH decoding, the RN may have to attempt decoding to detect the R-PDCCH in many cases. To minimize such problems, the size of the reserved R-PDCCH area may be increased or decreased by a basic unit. Such information should be considered in determining the positions and number of R-PDCCH RBs included in semi-static RRC signaling. For example, the reserved R-PDCCH area may be increased or decreased by a multiple of 4 RBs. In this case, the RN performs a process of searching an R-PDCCH in an increased or decreased R-PDCCH area as well as in an existing R-PDCCH area in the vicinity of a subframe in which the reserved R-PDCCH area is changed (i.e. the subframe or before or after the subframe) (e.g. after receiving RRC signaling). By doing so, decoding complexity caused by arbitrary R-PDCCH RB configuration can be mitigated.

Meanwhile, if the RN can directly receive the PDCCH, signal#1 may be transmitted through DCI of the PDCCH unlike the illustrated example (e.g. in the case in which subframe boundaries are misaligned by a few symbols in the BS and RN so that the RN can directly receive the PDCCH). Then, the relay can determine a resource area reserved for the R-PDCCH in the unit of every subframe.

Referring back to FIG. 12, the BS transmits an R-PDCCH in a backhaul subframe (S1220). The R-PDCCH may be transmitted in some or all of the R-PDCCH resources (e.g. M PBs) reserved by signal#1. In most cases, only some of M reserved R-PDCCH RBs are used for R-PDCCH transmission. DCI (e.g. DL grant (scheduling information) and UL grant (scheduling information)) mapped to R-PDCCH resources (e.g. RBs) may not be cross-interleaved. At this time, only one R-PDCCH is transmitted in one or more RBs. Further, the DCI mapped to the R-PDCCH resources may be intra-RB interleaved. The DCI mapped to the R-PDCCH resources may also be inter-RB interleaved (cross-interleaved). In this case, a plurality of R-PDCCHs may be transmitted together in one or more RBs. Next, each RN monitors the R-PDCCH resources (R-PDCCH resource area) reserved by signal#1 of step S1210 in order to determine whether an R-PDCCH thereof is present. Monitoring the R-PDCCH resources includes blind decoding of R-PDCCH candidates. Each UE performs, upon detecting an R-PDCCH allocated thereto, an operation according to the DCI of the R-PDCCH (e.g. DL reception or UL transmission).

On the other hand, an R-PDCCH having a DL grant is supposed to be transmitted in the first slot and an R-PDCCH having a UL grant is supposed to be transmitted in the second slot. Accordingly, if the R-PDCCH is present only in the first slot (DL grant R-PDCCH), since the second slot may be wasted, it is desirable that an R-PDCCH be transmitted in the second slot. In this regard, an R-PDSCH resource area allocated to a specific RN may be overlapped with a resource area reserved for an R-PDCCH (e.g. a resource area reserved by RRC signaling). Then, an RN (procedure) may be configured so as to obtain an R-PDSCH only in the second slot for an overlapped RB. To raise resource utilization, an RN (procedure) may be configured such that an R-PDSCH is demodulated in the second slot only for an RB carrying an R-PDCCH and the R-PDSCH is also demodulated in the first slot for an RB that does not carry an R-PDCCH. This is a scheme which uses conventional LTE RA but enables the RN to determine the presence of a first R-PDCCH area and to obtain an R-PDSCH in the remaining area. This will be described again.

The present invention proposes a method for allocating resources for an R-PDCCH transmitted by a BS to an RN and managing the allocated resources (e.g. RA type 2). All RNs demodulate an R-PDSCH based on control information obtained from an R-PDCCH. Accordingly, it is very important to accurately obtain R-PDCCH information. In a legacy LTE system, a resource area for transmitting a PDCCH is pre-reserved and a PDCCH of a specific UE is transmitted to a part of the reserved resource area. The resource area reserved for PDCCH transmission is referred to as a Search Space (SS). A UE obtains a PDCCH thereof through blind decoding within the SS. The present invention uses a scheme for transmitting an R-PDCCH to a specific RN in some or all of M R-PDCCH RBs pre-reserved for transmitting information needed for R-PDSCH demodulation. Such reservation can be performed by RRC signaling. Information about reservation may be broadcast through a PBCH. An R-PDCCH SS may be cell-specifically or relay-specifically configured. The R-PDCCH SS may be semi-statically changed through RRC signaling after it is configured.

The whole area in which R-PDCCHs are likely to be positioned may be predetermined or may be indicated by RRC signaling. An area carrying an actual R-PDCCH or a partial area including the R-PDCCH area (e.g. RN-specific SS≤whole region) may be indicated by higher-layer signaling (e.g. RRC signaling). In this case, information about a limited SS transmitted to an RN may be used for determining an interleaver parameter, e.g. an interleaver size, for the R-PDCCH. That is, interleaver attributes may be determined according to which information is transmitted to the RN. Especially, the same information may be transmitted to a plurality of RNs (e.g. RNs belonging to the same interleaving group) and the RNs may be jointly interleaved in allocated RBs. Moreover, interleaver attributes may be determined according to the number of allocated RBs. In addition, information related to the limited SS may be used to restrict the number of joint interleaved RNs (i.e. the number of RNs belonging to the same interleaving group). The information related to the limited SS may also be used to restrict the number of mapped RBs after interleaving. That is, there is an advantage of using an interleaver of a predetermined size by interleaving and transmitting only the designated number of RNs to the restricted or designated RBs. For example, if it is supposed to allocate only two RNs to 4 RBs, only an interleaver suitable for 4 RBs may be designed. To increase a degree-of-freedom of interleaving, 8 RBs or 2 RBs rather than 4 RBs may be allocated. However, since complexity in interleaver design may be increased, it is desirable to permit interleaving only for a limited number of RBs. For example, 2 or 4 RBs may be interleaved for 4 or 8 RBs. In this case, since only two types of interleaver size are sufficient, it is unnecessary to support all types/sizes of interleavers and thus interleaver implementation is simplified.

A process of performing R-PDCCH interleaving using two sizes of interleavers according to the above-described method is illustrated in FIG. 13. Although R-PDCCHs are interleaved and then mapped to consecutive RBs in FIG. 13 by way of example, RBs to which the interleaved R-PDCCHs are actually mapped may not be consecutive.

Methods for multiplexing R-PDCCHs/R-PDSCHs in resources allocated by a DVRB scheme are illustrated with reference to FIGS. 14 to 18. For convenience, the case in which an R-PDCCH is transmitted in the first slot and an R-PDSCH is transmitted in the second slot is shown. However, this is exemplary and the R-PDCCH may be transmitted in units of slots and may be transmitted in the first slot and/or second slot. In LTE-A, an R-PDCCH having a DL grant is transmitted in the first slot and an R-PDCCH having a UL grant is transmitted in the second slot. Here, an RB may refer to a VRB or a PRB according to context unless otherwise mentioned.

Figure 14:
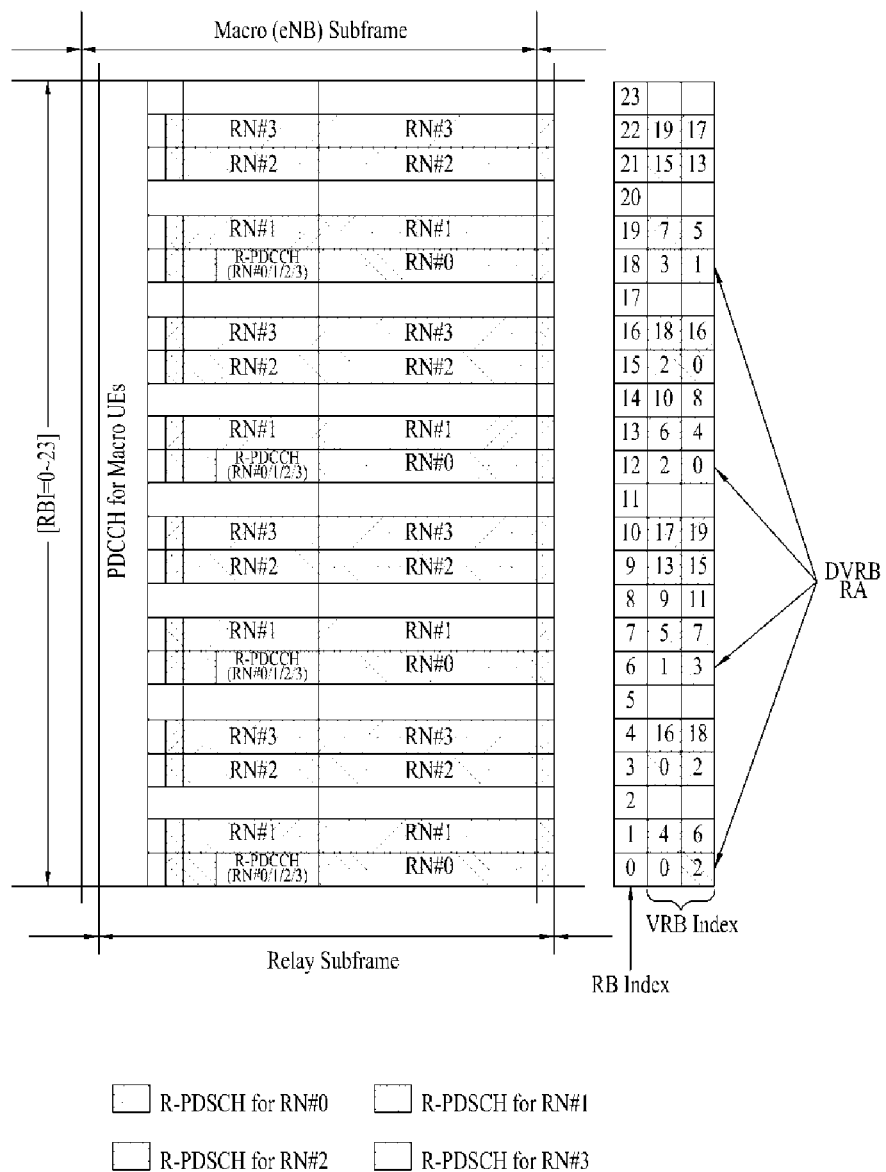
FIGS. 14 to 18 illustrate multiplexing methods of R-PDCCHs/R-PDSCHs in resources allocated by a DVRB scheme according to an embodiment of the present invention.

FIG. 14 illustrates a method for multiplexing R-PDCCHs/R-PDSCHs for 4 RNs in 24 DVRBs. The 4 RNs may mean an RN group preset to use 24 allocated R-PDCCH RBs. That is, the shown R-PDCCH RBs may be exclusively used by the RNs (RN group). According to the DVRB scheme, since slot basis cyclic shift (DVRB slot hopping) is applied, it is not guaranteed that one RN uses two slots of the same PRB. That is, an R-PDCCH (and an R-PDSCH) is not transmitted to an RN using two slots of the same PRB. In this case, when the R-PDCCH/R-PDSCH is demodulated using a Demodulation Reference Signal (DM-RS), channel estimation performance may be degraded and thus demodulation performance may also be deteriorated. When considering a good channel environment, in most cases, in which the R-PDCCH is transmitted, it is desirable to allocate two slots of the same PRB to the same RN (i.e. R-PDCCH (and R-PDSCH)). To this end, it is proposed not to apply cyclic shift between slots (i.e. (DVRB) slot hopping). In addition, resources for an RN are allocated to the same VRB set in the first and second slots. Slot hopping-off may be applied to all DVRB resources allocated by signal#1 or may be applied only to resources carrying the R-PDCCH.

Furthermore, it is proposed that a basic VRB pairing unit for DVRBs during RA to an RN be set to a multiple of 4 during RA (VRB#0 to 3, VRB#4 to 7, VRB#12 to 15, and VRB#16 to 19). Resources for an RN are allocated to the same VRB set in the first and second slots. According to this proposal, even if DVRB slot hopping is applied, two slots of the same PRB may be used by the same RN as shown. In other words, two slots of the same PRB may be used for R-PDCCH (and R-PDSCH) transmission of the same RN during DVRB RA irrespective of application of slot hopping.

Accordingly, a basic RA unit for an RN may be 4. For example, in a situation in which a distributed allocation or localized allocation are mixed for backhaul resources, 4 RBs may be used as a basic RA unit for an RN. Then, a multiple of 4 RBs may be allocated to an RN. In this case, the number of bits used for an RA field may be decreased by an RB step (e.g. step=4). Moreover, even though cyclic shift is applied to 4 RBs (e.g. VRB#0 to VRB#4) in the second slot, the cyclic-shifted RBs are contiguous to one of 4 RBs of the first slot as shown. Therefore, even if slot hopping (i.e. DVRB cyclic shift) is off only for M RBs (e.g. R-PDCCCH SS) pre-reserved for R-PDCCH transmission, the M RBs do not intrude other RBs to which slot hopping is not applied. Meanwhile, in the case of the last VRB index of a DVRB, a group may be formed in units of 2 RBs rather than in units of 4 RBs.

Figure 15:
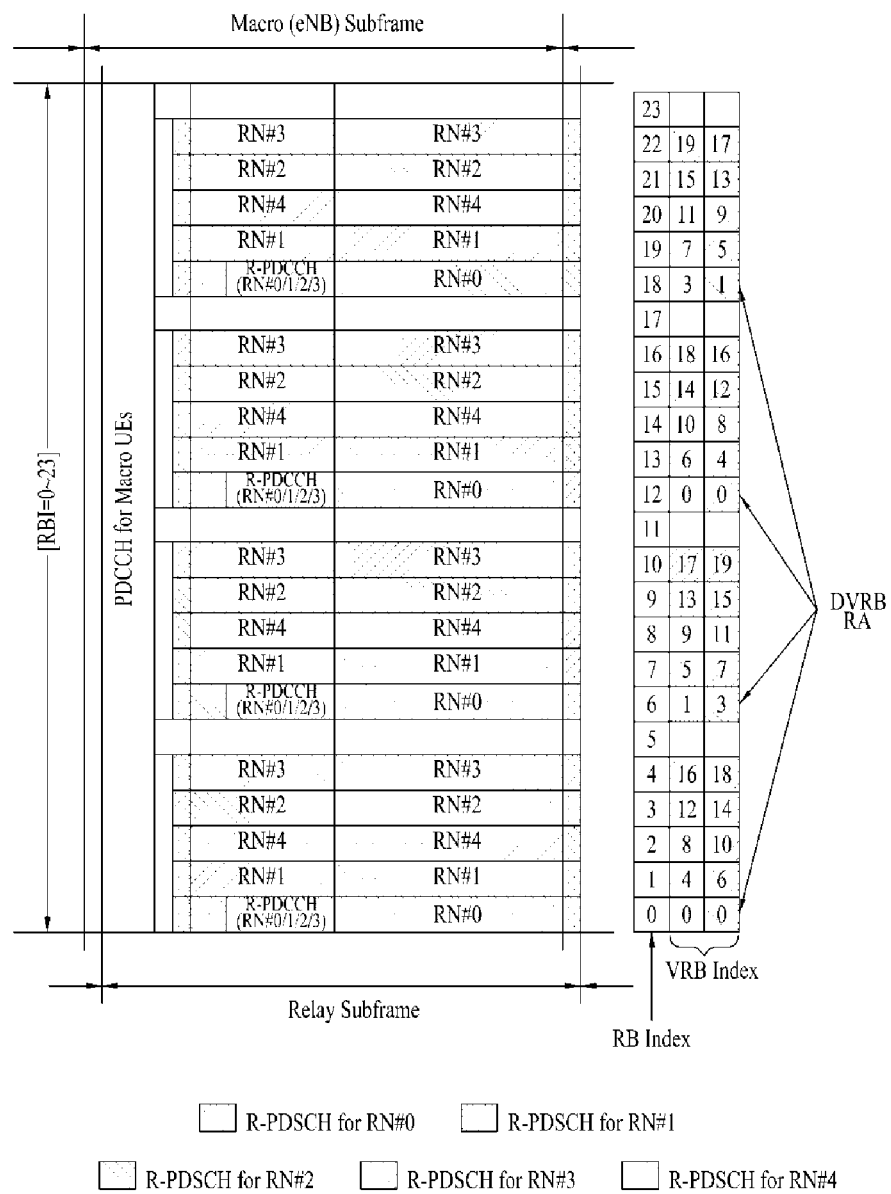

FIG. 15 illustrates another method for multiplexing R-PDCCHs/R-PDSCHs in resources allocated by the DVRB scheme. This method shows an example of allocating resources in a DVRB resource area assumed in FIG. 14 to an RN that does not belong to the RN group of FIG. 14. By doing so, resources allocated to the RN group can be efficiently utilized.

Referring back to FIG. 14, since an R-PDCCH for RN#4 is not interleaved in an R-PDCCH (RN#0/1/2/3) area, RN#4 is not present in the R-PDCCH region. That is, RN#4 is an RN of another group. For convenience, RN#0/1/2/3 of FIG.

14 are called RN Group#1 and resources (resource area) of FIG. 14 are called resources (resource area) for RN Group#1. In this example, even though RN#4 is an RN of another RN group, resources for RN#4 (e.g. resources for RN#4 R-PDCCH and/or R-PDSCH) may be allocated in the resources (resource area) for RN Group#1, thereby increasing resource use efficiency, as illustrated in FIG. 15. In this case, information indicating that the resources (resource area) are allocated to another RN (RN group) should be additionally transmitted together with or separately from RA signaling information. In an embodiment, a signal indicating an RN or an RN group (a Group Indication Signal (GIS)) may be used. That is, the GIS and a DVRB signal may be used to allocate resources. The GIS may be inserted into an RA field or added to a separate field. If the GIS does not change often, the GIS may be indicated by higher-layer signaling (e.g. RRC signaling or MAC signaling).

Figure 16:
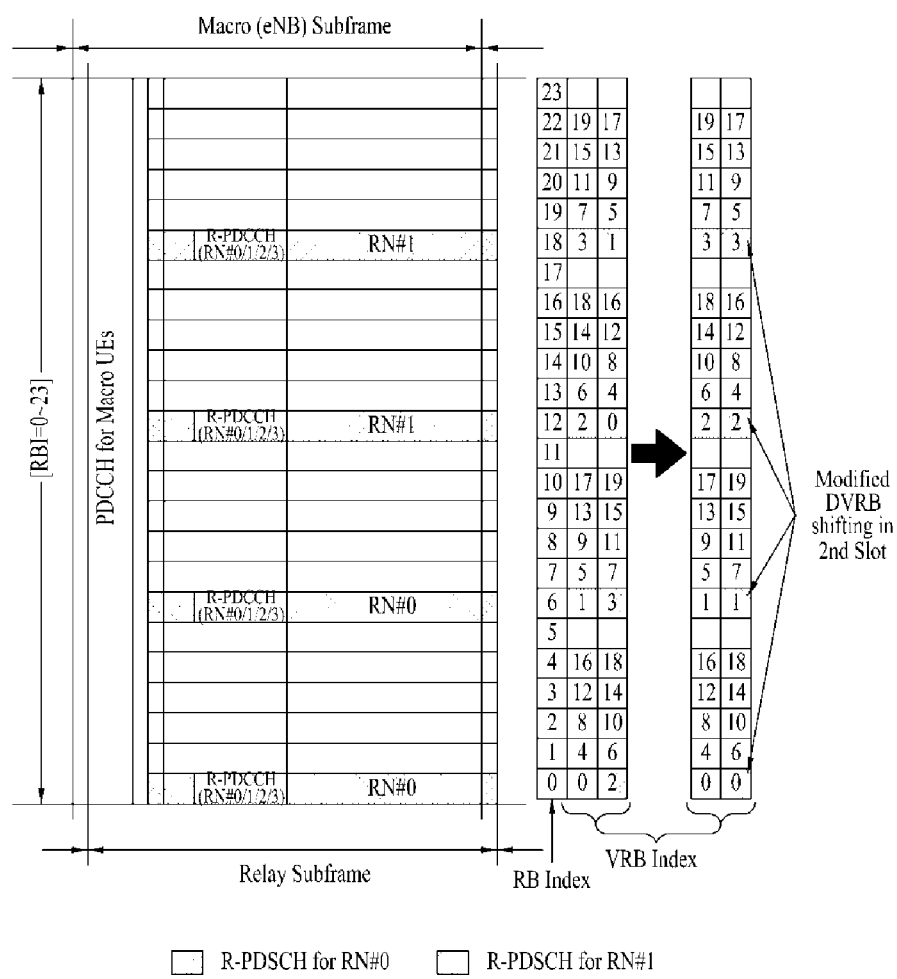

FIG. 16 illustrates still another method for multiplexing R-PDCCHs/R-PDSCHs in resources allocated by the DVRB scheme. This method maximizes resource use efficiency by modifying a conventional RA scheme.

As illustrated in FIG. 16, if RN#0 is paired with RN#1 to form 4 RBs, a common DVRB signal (PRB#0/6/12/18=VRB#0/1/2/3) may be transmitted to RN#0 and RN#1 to notify them of the allocated resource area but it is possible not follow LTE PDSCH DVRB mapping in the second slot. That is, a signal may be reconfigured so that the first and second slots of the same RB index are used without slot-based shifting. According to a conventional DVRB mapping rule, RB#0 in the first slot is supposed to be cyclically shifted to RB#12 in the second slot according to a gap value. However, when R-PDCCHs/R-PDSCHs are demodulated using DM-RSs, cyclic shift may degrade channel estimation performance and thus deteriorate demodulation performance.

Accordingly, a signal may be reconfigured such that an RN uses, in the second slot, the same RB as an RB of the first slot without shifting an RB in the second slot. For this operation, additional signaling may not be needed. A conventional operation mode and a proposed operation mode may be configured together. For example, shifting-off (i.e. slot hopping-off) is applicable only to RBs to which R-PDCCHs are actually allocated. Alternatively, shifting-off may be applied to all RBs of an R-PDCCH SS. For an R-PDSCH, shifting-off is applicable only when resources carrying an R-PDCCH are overlapped with resources indicated by the R-PDCCH. In addition, shifting-off may be applied only to RBs to which R-PDSCHs are actually allocated. Shifting-off may also be applicable to all RBs available to an RN in a backhaul subframe.

Figure 17:
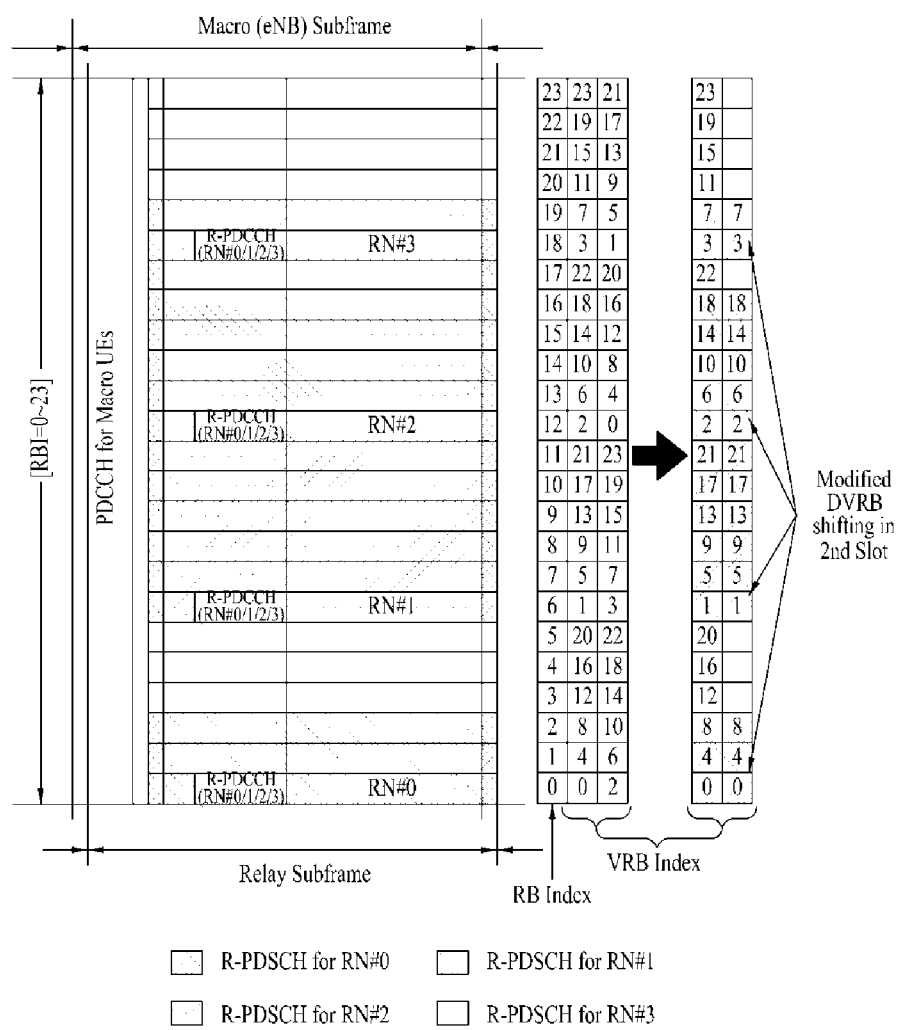

FIG. 17 illustrates another method for multiplexing R-PDCCHs/R-PDSCHs in resources allocated by the DVRB scheme.

Referring to FIG. 17, an R-PDCCH resource area is previously given and each RN monitors an R-PDCCH candidate area (i.e. an R-PDCCH SS) to detect an R-PDCCH thereof. In this method, it is proposed that determination as to who will use the second slot according to the index of a Relay CCE (R-CCE) to which an R-PDCCH of RN#k (k=0, 1, 2, 3) is allocated be made. For example, this method may be performed based on an R-CCE-index-to-RB-index mapping rule. The R-CCE-index-to-RB-index mapping rule is not restricted to a specific one. For instance, the second slot of an RB carrying an R-PDCCH may be mapped to an RN corresponding to the R-PDCCH. Specifically, if an R-CCE for RN#0 R-PDCCH is mapped to RB#0, an R-CCE for RN#1 R-PDCCH is mapped to RB#6, an R-CCE for RN#2 R-PDCCH is mapped to RB#12, and an R-CCE for RN#3 R-PDCCH is mapped to RB#18, then the second slots of RB#0, 6, 12, and 18 carrying the R-PDCCH may be mapped to RN#0, 1, 2, and 3, respectively, as shown. Thus, R-PDSCHs and R-PDCCHs can be allocated as illustrated in FIG. 17.

According to the above description, it is possible to allocate the resources of the second slot of an RB carrying an R-PDCCH to an RN (e.g. for an R-PDSCH) without additional signaling (implicit signaling). The remaining RBs carrying R-PDSCHs may be allocated to RNs by RA included in R-PDCCHs. In this case, an RN may be configured so as to demodulate an R-PDSCH by distinguishing RBs actually carrying R-PDCCHs from RBs that do not carry R-PDCCHs. For this purpose, a method may be considered through which the first slots of all RBs (an R-PDCCH SS) reserved for R-PDCCHs are not used for R-PDSCH transmission (or R-PDSCH demodulation). As another method, an RN may exclude only the first slot of an RB from which an R-PDCCH thereof (it may be restricted to an R-PDCCH for a DL grant) is detected from R-PDSCH transmission (or R-PDSCH demodulation). More specifically, when an RN detects at least part of a DL grant R-PDCCH in the first slot of a PRB, the RN may exclude the first slot of the PRB from R-PDSCH demodulation. As still another method, an RB carrying an R-PDCCH may be explicitly indicated.

Figure 18:
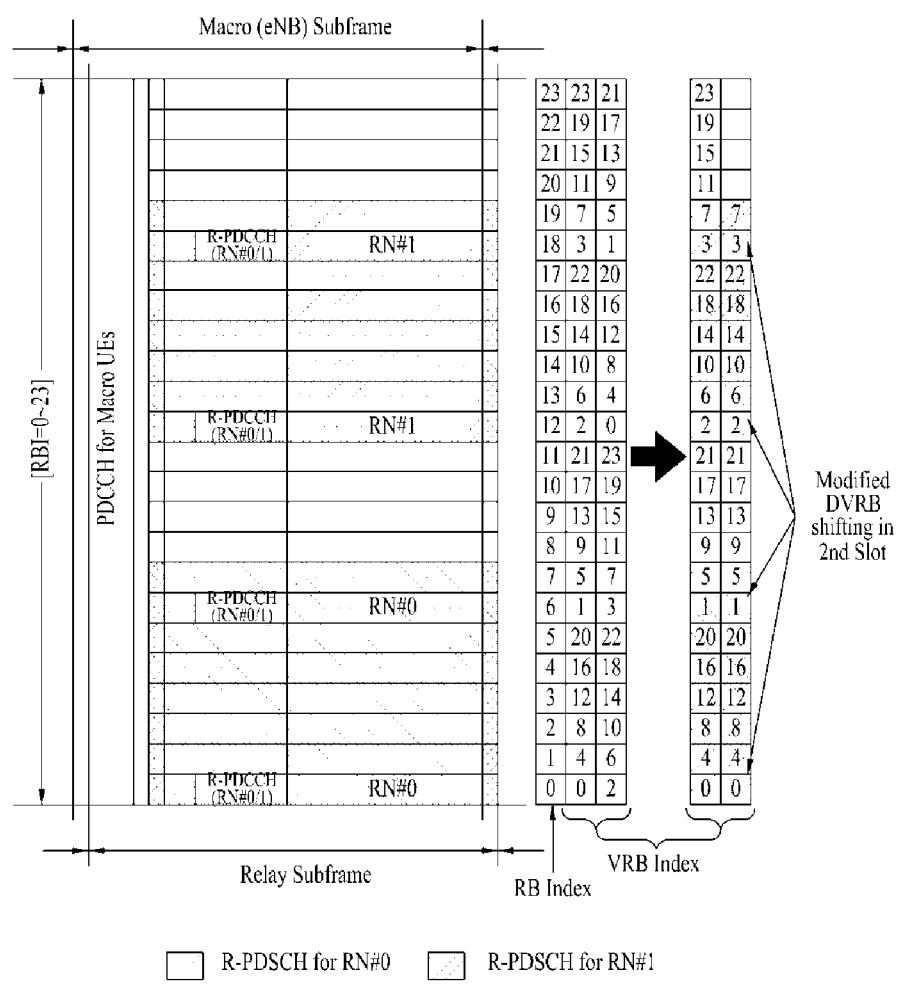

FIG. 18 illustrates an extension of FIG. 17. Therefore, it is assumed that the second slot of an RB carrying an R-PDCCH is implicitly mapped to an RN corresponding to the R-PDCCH as in FIG. 17. In this case, if there are a small number of RBs to which R-PDCCHs are mapped due to a small number of RNs, some RBs in the second slot may not be allocated, thereby wasting resources. This resource waste may be prevented by increasing a CCE aggregation level when there is a small of number of RNs.

Referring to FIG. 18, if only R-PDCCHs for two RNs are present in an R-PDCCH resource area (e.g. 4 RBs), R-PDCCHs of the two RNs may be transmitted over the 4 RBs by increasing an R-PDCCH R-CCE aggregation level. To this end, a CCE-to-RB mapping rule may be used. Although the CCE-to-RB mapping rule is not specifically limited, R-CCE index 0 may be mapped to RB index 0, R-CCE index 1 to RB index 6, R-CCE index 2 to RB index 12, and R-CCE index 3 to RB index 18 by way of example. As assumed above, if 4 R-CCEs are present in 4 RBs (i.e. one R-CCE per RB), R-CCE indexes 0 and 1 may be mapped to RN#0 and R-CCE indexes 2 and 3 may be mapped to RN#1 (a CCE aggregation level=2). Thus an R-PDSCH of an RN may be implicitly allocated so as to include one or more R-PDCCH transmission areas. In the case of FIG. 18, the second slots of RB#0/RB#6 are implicitly allocated to RN#0 (an R-PDSCH), and the second slots of RB#12/#18 are implicitly allocated to RN#1 (an R-PDSCH).

Additionally, a method is described for allocating and demodulating R-PDSCHs without using an implicit mapping relationship between R-CCE indexes and RB indexes shown in FIGS. 17 and 18. A BS may be scheduled to include an R-PDCCH of an RN during R-PDSCH allocation. In this case, the RN may appropriately demodulate/decode the R-PDSCH depending on a method for detecting whether an R-PDCCH is present in the first slot of an allocated R-PDSCH RB. As a conservative method, since the RN is able to determine the position of an RRC configured R-PDCCH resource which is semi-statically allocated for the R-PDCCH, the RN demodulates the R-PDSCH under the assumption that the R-PDSCH is not present in the first slot of an RB reserved for the R-PDCCH. In this case, the R-PDCCH is regarded as being transmitted even though it is not actually transmitted and thus resources are wasted without being used for R-PDSCH transmission.

As another method, the RN considers that an R-PDCCH is present during R-PDCCH decoding in the first slot of an RB carrying at least part of an R-PDCCH (e.g. a DL grant) transmitted thereto (as a result of interleaving) in a decoding/demodulation process. That is, the RN determines that the R-PDSCH is transmitted only in the second slot of the RB. The RN determines that the R-PDSCH is transmitted also in the first slots of other R-PDSCH scheduled RBs. Here, since each RN is not aware of which RBs R-PDCCHs of other RNs use, the RN is unable to know the resulting effects. However, this problem may be solved by imposing constraint on a scheduler. Specifically, the scheduler may restrict an RN to which an R-PDSCH is allocated in the second slot of a specific RB to one of RNs to which a part of an R-PDCCH is transmitted in the first slot of the specific RB. In addition, the scheduler may operate such that an R-PDCCH transmitted to another RN is not included in an R-PDSCH scheduled RB area other than an RB carrying a part of an R-PDCCH. This is a scheduler implementation issue. The RN has to know that the decoding/demodulation process should be performed according to the above description. Accordingly, associated functions should be contained in implementing an RN (method), which should be clarified by any means.

Figure 19:
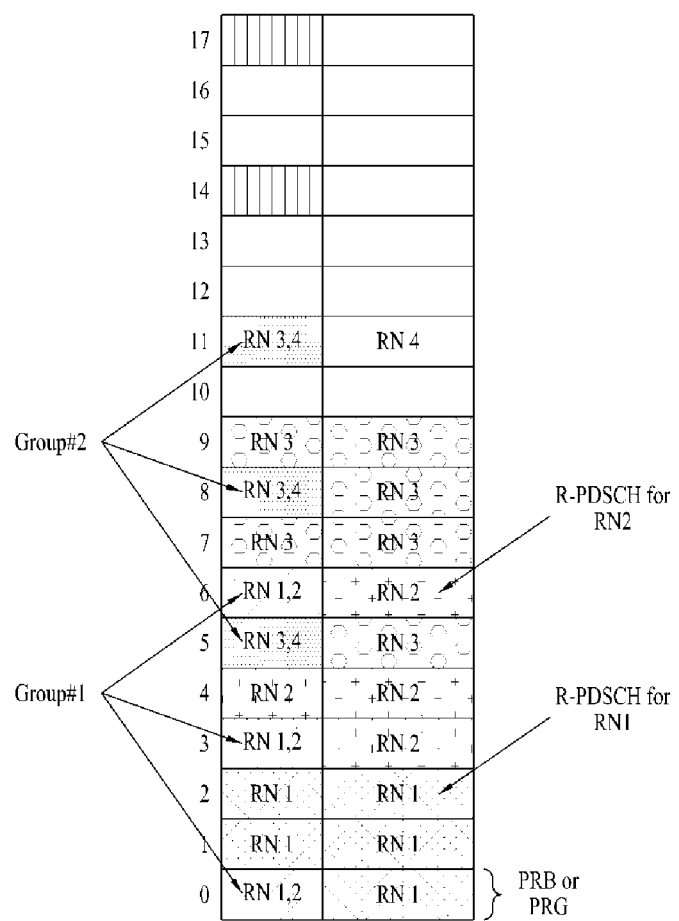
FIG. 19 illustrates exemplary R-PDCCH/R-PDSCH transmission.

FIG. 19 illustrates exemplary R-PDCCH/R-PDSCH transmission according to the above-described methods. In this example, it is assumed that a total of 18 RBs (or RBGs) is present and RBs (or RBGs) #0, #3, #5, #6, #8, #11, #14, and #17 out of the 18 RBs (or RBGs) are SSs. It is also assumed that R-PDCCHs are transmitted only in RBs (or RBGs) #0, #3, #5, #6, #8, and #11 in a specific subframe. For R-PDCCH reception, it is assumed that RN 1 and RN 2 decode RBs #0, #3, and #6, and RN 3 and RN 4 decode RBs #5, #8, and #11. The number of RBs that an RN should search may be indicated by RN-specific signaling.

Referring to FIG. 19, RN 1 and RN 2 assume that R-PDCCHs thereof may be present in RBs (RBGs) #0, #3, and #6 in the first slot of the subframe. Based on this assumption, RN 1 and RN 2 may successfully decode R-PDSCHs in the second slot of the subframe and other RBs (RBGs). Further, if RN 1 and RN 2 can also be aware of areas to which R-PDCCHs of RN 3 and RN 4 can be transmitted, i.e. RBs (or RBGs) #5, #8, and #11, RN 1 and RN 2 determine that R-PDCCHs may be present in the first slots of RBs (or RBGs) #5, #8, and #11 as well as in the first slots of RBs (or RBGs) #0, #3, and #6 in the subframe. Thus, a BS may2 the second slots of the RBs (or RBGs) or leave the second slots of the RBs (or RBGs) empty. It may also be assumed that the other RBs (or RBGs) #10, #12, #13, #14, #15, #16, and #17 can carry R-PDSCHs of RN 1 or RN 2, starting from first slots thereof (when the R-PDSCHs are scheduled).

Therefore, if an R-PDSCH is allocated to a PRB other than PRBs carrying R-PDCCHs, the R-PDSCH may be transmitted, starting from the first slot of the allocated PRB. On the contrary, in a PRB pair carrying an R-PDCCH, an R-PDSCH is allocated to the second slot of the PRB pair.

In order for RN 1 and RN 2 to identify PRBs, first slots of which are not available for R-PDSCH transmission, the BS may signal actual PRBs carrying R-PDCCHs of group#1 and group#2. In addition, the scheduler should cause RNs of group#1 not to allocate R-PDSCHs for the RNs of group#1 to PRBs carrying R-PDCCHs of group#2 (first slots) and, instead, to transmit R-PDSCHs, starting from the first slot, in PRBs other than PRBs carrying R-PDCCHs for the RNs of group#1 and group#2. A decoding process of an RN is based on this assumption. Accordingly, an RN performs R-PDSCH decoding starting from the first slot, if an R-PDCCH is not present. On the contrary, if a PRB pair carries an R-PDCCH, the RN does not attempt R-PDSCH decoding in the first slot of the PRB pair. For this operation, blind decoding may be used, instead of signaling. To facilitate blind decoding, a unit (e.g. the number of RBs) for attempting blind decoding may be limited. For instance, if the RN fails to detect an R-PDCCH even though blind decoding is performed in one (e.g. 25 RBs) of candidate units, it may attempt blind decoding in a blind decoding RB area of the next size (e.g. 50 RBs). If the RN succeeds in blind decoding, it is assumed that an R-PDCCH exists in the RBs. In this case, although the RN does not know whether any R-PDCCH exists in the other RBs, it may assume that at least an R-PDCCH thereof is not present in the other RBs. In addition, the RN assumes that an R-PDSCH thereof is present in an RB or RBG indicated by RA information. Accordingly, the RN may perform R-PDSCH decoding, determining that an R-PDCCH may exist in the first slot of an R-PDCCH-detected SS. Meanwhile, if an RA bit (an RB or RBG allocation indicator) indicates the presence of data in an SS in which an R-PDCCH has not been detected, the RN performs demodulation, determining that the first slot of the RB or the RBG does not include an R-PDCCH. The BS should allocate data to an appropriate RB in consideration of this case. In another method, an R-PDSCH for RN 1 of group#1 may be transmitted to an R-PDCCH area of group#2. It is a natural result on the part of RN 1 because RN 1 does not know the presence of group#2. However, since the BS can determine whether the R-PDSCH of RN 1 is overlapped with the R-PDCCH area of group#2, the BS may perform scheduling in such a manner that the R-PDSCH of RN 1 is not overlapped with R-PDCCHs of RN 3 and RN 4. Meanwhile, an RN determines whether an R-PDCCH is transmitted through blind decoding and performs R-PDSCH decoding according to the determination. In the meantime, the BS may inform each RN of RBs carrying an R-PDCCH. For example, the BS may inform each RN of which RBs participate in R-PDCCH transmission in first slots thereof among RBs carrying R-PDSCHs. However, since the number of RBs of which the BS should inform the RN is changed, a signaling format used to indicate the RBs is correspondingly changed.

SS Design Based on Multi-level Blind Decoding

Figure 20:
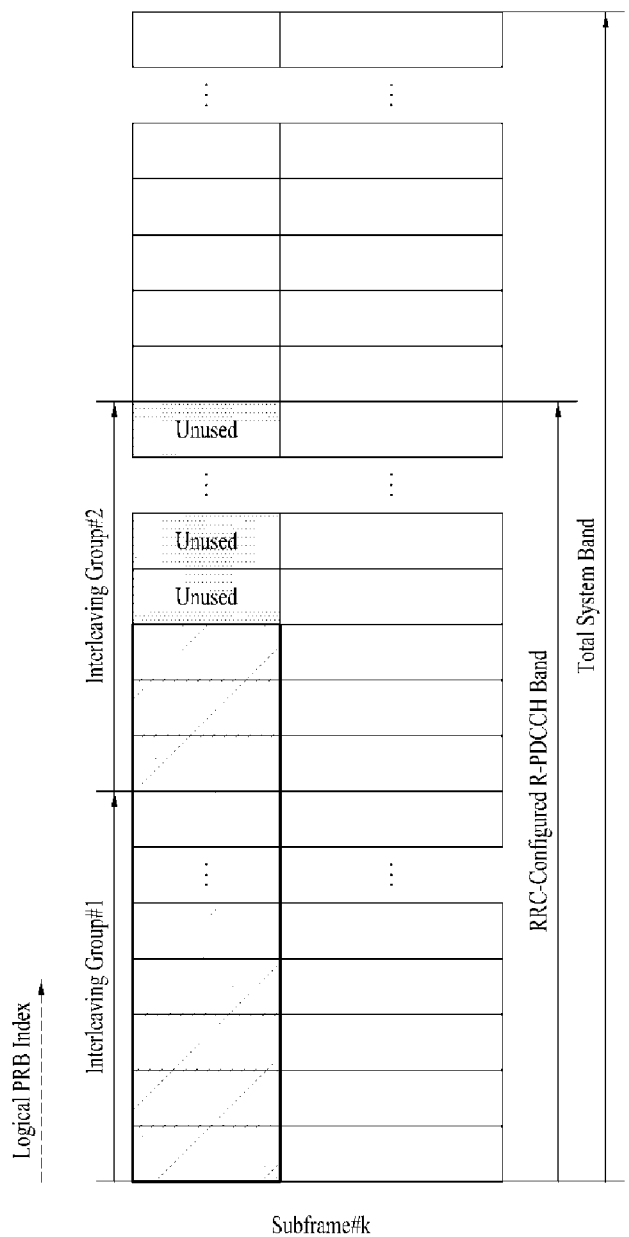
FIGS. 20 and 21 illustrate exemplary R-PDCCH RB configuration.
Figure 21:
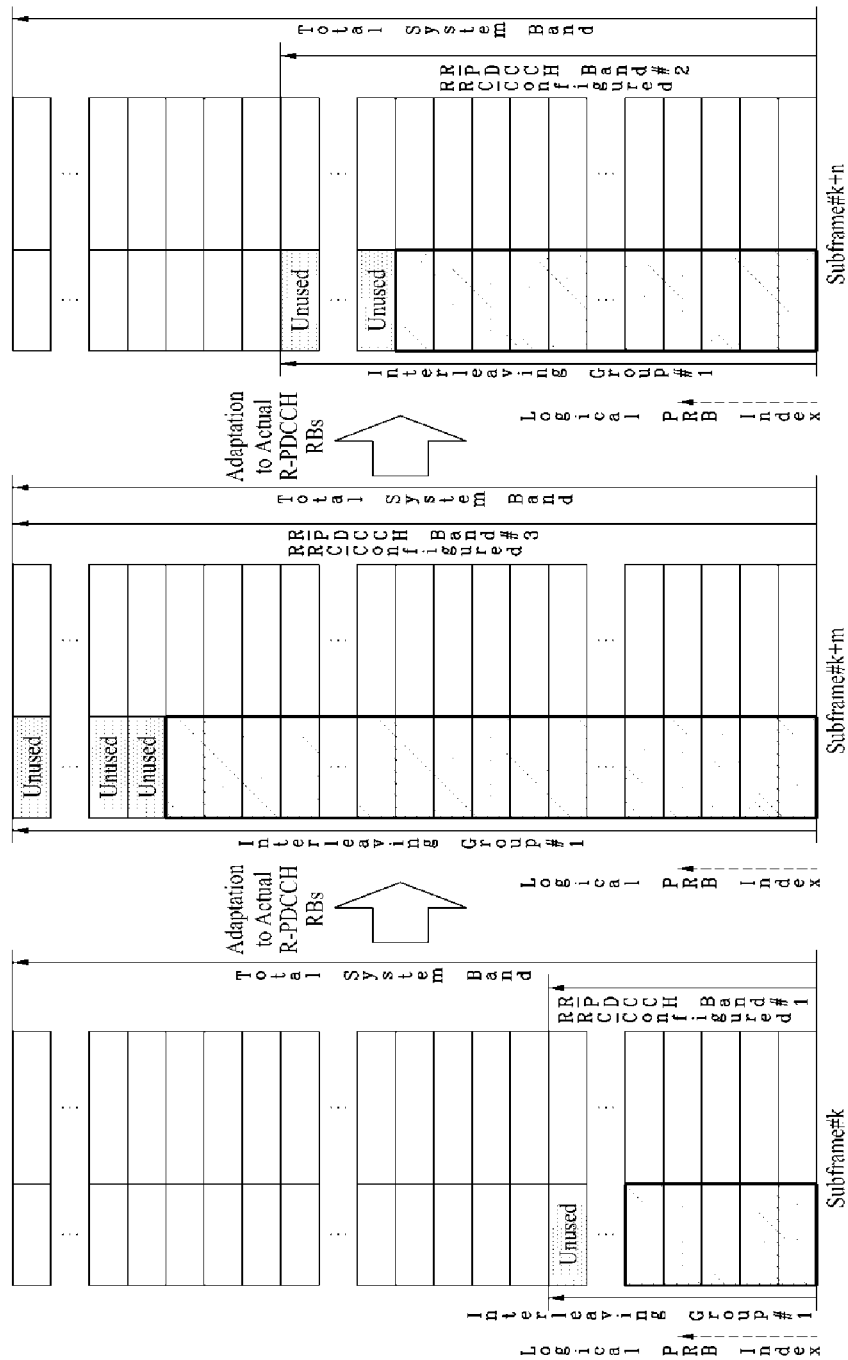

FIGS. 20 and 21 illustrate exemplary R-PDCCH RB configuration.

Referring to FIGS. 20 and 21, RBs carrying an R-PDCCH to a specific RN may be semi-statically designated by RRC signaling and the R-PDCCH may actually be transmitted through a part of the designated RBs. An actual resource area carrying an R-PDCCH may be identical to or different from an RRC-configured area (an interleaving unit in most cases). In the latter case, the actual resource area carrying the R-PDCCH may be determined by blind decoding. That is, M RBs are configured as a candidate R-PDCCH transmission set and the R-PDCCH is transmitted through a subset of N RBs (M≥N). Basically, different subsets may be designated for RNs (one RN may be distributed across a plurality of subsets). An RN performs blind decoding on an aggregation level basis within the subset in order to receive an R-PDCCH. The problem is that, because one RN does not know the positions of R-PDCCHs for other RNs, the BS transmits data in the remaining area except all positions at which R-PDCCHs are likely to be transmitted in the above-described candidate set or transmits data on the assumption that specific areas of RBs or RBGs performing RA are available or unavailable for data transmission. Here, full interleaving or partial interleaving is applicable. Full interleaving refers to interleaving R-PDCCHs of all RNs according to an interleaving unit and then mapping the interleaved R-PDCCHs to PRBs, whereas partial interleaving refers to interleaving only R-PDCCHs of some RNs. On the part of an RN, if one R-PDCCH interleaving area is to be monitored, the RN may determine full interleaving, and if a plurality of R-PDCCH interleaving areas is included in a monitoring set, the RN may determine partial interleaving. Therefore, the terms may have different meanings in terms of a BS and an RN.

However, it may often occur that, after interleaving, an R-PDCCH of a specific RN is not mapped uniformly to an R-PDCCH RB set of a total band (e.g. a system band) or a partial band. That is, if an interleaver unit is 4 REs (e.g. an REG), an R-PDCCH having 36 REs (e.g. one CCE) may be mapped uniformly to 9 RBs (4 REs per RB). However, if the R-PDCCH should be mapped to 9 or more RBs, some RBs of the R-PDCCH subset may not include even a part (e.g. 4 REs) of the R-PDCCH of the RN. In this case, the R-PDCCH area cannot be used to transmit an R-PDSCH even though it does not include the R-PDCCH, like an R-PDCCH RB. That is, none of the RNs of an RN group that are interleaved can use the RBs of an R-PDCCH subset for R-PDSCH transmission.

To avoid such resource waste, it is proposed that the interleaving range (e.g. a band or RBs) of an RN group be the same as the amount of resources (e.g. a band or RBs) that can be allocated or used for all RNs of the RN group after interleaving. Although the two sizes may not be perfectly equal, an unmatched band or RBs are desirably minimized. For example, if 4 R-PDCCHs each having one RB should be transmitted to 4 RNs, the 4 R-PDCCHs may be mapped to 4 RBs after interleaving. In this case, 4 consecutive logical indexes may be assigned to the R-PDCCHs. Meanwhile, 4 PRB indexes apart from one another by a predetermined interval (e.g. an RBG size unit of 3 or 4 RBs) may be used. Here, the predetermined interval is determined in consideration of an RBG. Thus, the R-PDCCH PRB indexes may be non-contiguously assigned (e.g. 0, 4, 8 . . . ). Then, the 4 R-PDCCHs are transmitted across 4 RBs. If 7 RNs are to transmit a total of 7 R-PDCCHs (one R-PDCCH per RN) but if the basic interleaving unit is a multiple of 4 RBs, a total of 8 RBs may be reserved for the 7 R-PDCCHs. In this case, resources corresponding to the REs of one RB may substantially be wasted. Nonetheless, the proposed method can remarkably reduce resource waste, compared to the afore-described method. Configuration of the basic interleaving unit such as 4 serves to reduce the number of blind decoding procedures, as described later. Blind decoding may be performed through a method for blind-decoding 4 RBs and then blind-decoding the next 4 RBs that do not overlap with the previous 4 RBs or a method for blind-decoding RBs #0 to #3 (4 RBs) and then blind-decoding RBs #0 to #8 (8 RBs).

It is assumed that 8 RNs transmit 8 R-PDCCHs each having a size of one CCE (e.g. the size of available REs in the first slot of one PRB pair), each RN transmitting one R-PDCCH. Then, a total of 8 RBs is required and interleaving is performed on an 8-RB basis. In this method, the BS does not inform the RNs of a (partial) interleaving band/depth. Instead, it is known to the BS and the RNs that the interleaving band/depth is defined as a multiple of 4 RBs when a minimum interleaving unit is 4 RBs. Under this setting, each RN performs blind decoding on 4 RBs that are the minimum unit (first-step blind decoding). If no R-PDCCHs are detected, the RN may double the interleaving band/depth and thus perform blind decoding on 8 RBs (second-step blind decoding). If the RN succeeds in blind decoding for the interleaving band/depth, the RN completes the band/depth search. On the contrary, if the RN fails in blind decoding for the interleaving band/depth, the RN proceeds to the next R-PDCCH aggregation level search step. In this way, R-PDCCHs are interleaved in units of a minimum required amount of RB resources and mapped to PRBs. Then the RN performs blind decoding on R-PDCCH resources with contiguous logical indexes within a basic blind decoding range B1 (e.g. 4 CCEs) after deinterleaving. If the RN fails in blind decoding, it performs blind decoding in an increased bandwidth, i.e. an increased blind decoding range B2 (e.g. 8 CCEs). Thus, the RN can successfully decode an R-PDCCH. The blind decoding of the blind decoding ranges B1 and B2 is performed to determine an interleaving depth rather than an aggregation level. The basic granularity B1 may be set to various values such as 1, 2, 3, 4, . . . and the blind decoding range B2 may be given as a multiple of B1 or the sum of B1 and a predetermined value.

An interleaver row size may vary with the size of an R-PDCCH to be transmitted/interleaved. While it is desirable to keep an interleaver column size unchanged, it is possible to change the interleaver column size within a given number of columns sizes (8, 16, and 32). The interleaver column size may be indicated by higher-layer signaling. Since the granularity with which the interleaver band/depth is changed is greater than 1, as many interleavers as the number of RBs in a system band are not required. For example, if an interleaving size granularity is 16 RBs in a 96-RB system, about 6 interleaver sizes may be designed.

To reduce the number of interleavers to be designed, the following method may be considered. For example, if an interleaver size is 4 and R-PDCCHs are to be transmitted with a band/depth of 8 RBs, two 4-RB interleavers may be concatenated. That is, since the R-PDCCH band is 8 RBs, two 4-RB interleavers can be used. In this manner, a system can be implemented only with a single interleaver. As stated before, it is possible to change an interleaver row size, while fixing an interleaver column size, or vice versa.

Once again, it is an important feature that the actual transmission band/depth (e.g. 7 RBs) of the R-PDCCH is determined according to the size of R-PDCCHs to be transmitted. In this case, the BS selects the smallest interleaving band/depth (e.g. B1×2=8 RBs) including 7 RBs and transmits the R-PDCCHs using the selected interleaving band/depth. Meanwhile, an RN performs blind decoding by increasing an interleaving band/depth or its index, starting from a basic interleaving band/depth, until an R-PDCCH is finally detected. Another feature is that a variable interleaver size is used. Alternatively, a basic interleaver size is defined and interleavers each having the basic interleaver size are concatenated, for interleaving.

Figure 22:
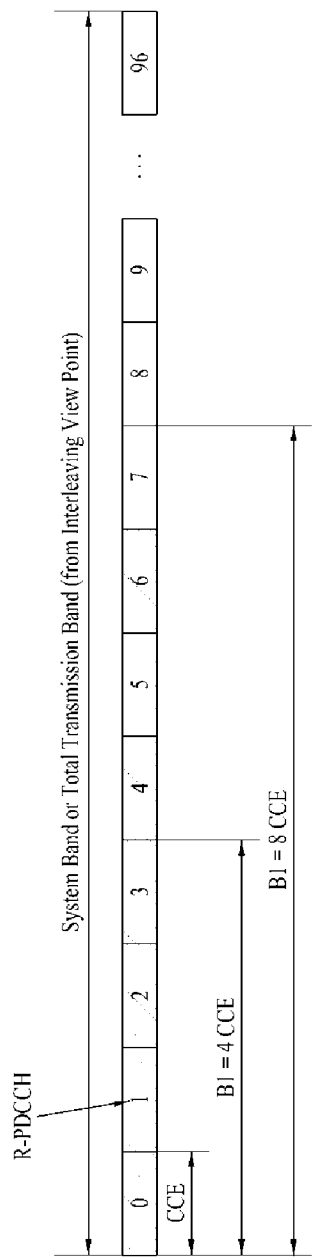
FIGS. 22 to 24 illustrate exemplary R-PDCCH transmission according to whether interleaving is applied and blind decoding processes corresponding thereto.

FIG. 22 illustrates the case in which an interleaving depth is not applied. Each box of FIG. 22 is a logical representation of a CCE resource in the first slot. A CCE may be defined as 9 REGs or available REs in the first slot of a PRB pair. Referring to FIG. 22, an R-PDCCH is mapped to one or plural CCEs according to a CCE aggregation level.

Figure 23:
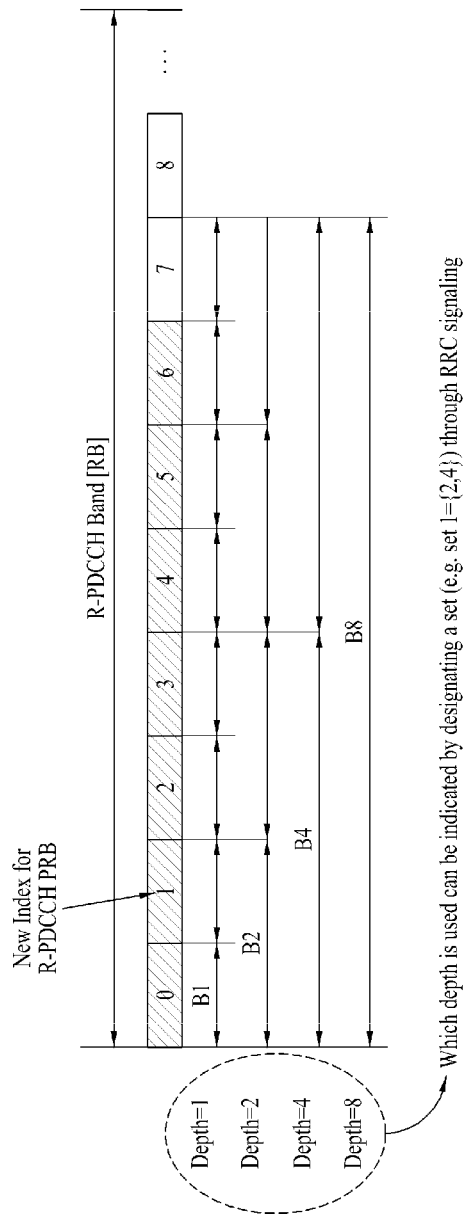

FIG. 23 illustrates the case in which an interleaving depth is applied according to the present invention. Referring to FIG. 23, an RN performs blind decoding to determine an interleaving depth. That is, the RN performs blind decoding with respect to blind decoding ranges B1, B2, B4, and B8 sequentially until an R-PDCCH is detected. If the RN fails in blind decoding in the ranges B1, B2, B4, and B8, the RN repeats the same operation with respect to the next aggregation level. For convenience, assuming that the RN succeeds in blind decoding of an R-PDCCH in the blind decoding range B2, the RN performs R-PDSCH demodulation on the assumption that an R-PDCCH exists in all RBs of B2. That is, the RN performs R-PDSCH demodulation under the assumption that no R-PDSCH exists in all slots of the blind decoding range B2 as well as the first slot of an RB in which the R-PDCCH has been detected. On the other hand, the RN does not assume that an R-PDCCH is present in the other area except for the blind decoding range B2. Therefore, the RN performs R-PDSCH demodulation in allocated RBs, assuming that RBs indicated by the BS (the remaining area) do not have an R-PDCCH. Obviously, an R-PDCCH may exist in the remaining area. However, since an R-PDSCH is allocated to an RB that does not carry an R-PDCCH, the RN can accurately demodulate the R-PDSCH while maintaining the assumption for RN R-PDSCH demodulation (i.e. the absence of an R-PDCCH in the first slot of the allocated RB).

Figure 24:
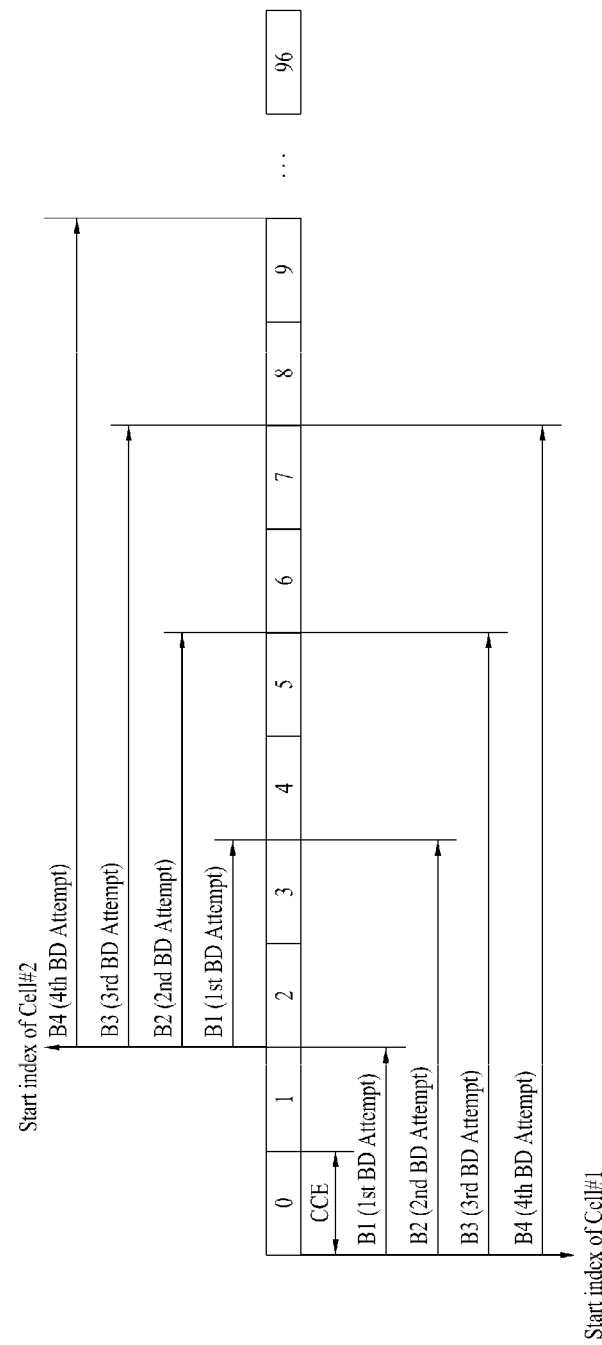

FIG. 24 illustrates multi-level blind decoding.

Referring to FIG. 24, an RN performs blind decoding for interleaving depth B1. If the RN fails to detect an R-PDCCH, the RN performs blind decoding for interleaving depth B2. Similarly, the RN increases the interleaving depth until it succeeds in blind decoding. Although interleaving randomizes inter-cell interference, different blind decoding start positions for cells may be used to additionally obtain an interference mitigation effect. In FIG. 24, a blind decoding start position and a blind decoding depth B1 (i=1, 2, 3, . . . ) for each cell are exemplary and various modifications thereof may be made. For example, there is no need to set the blind decoding start position for each cell in units of B1. A start offset may be determined according to a degree of interference. In case of a 3-cell structure, the offset may be set to a system band/3. While Bi values are shown in one direction from the start point, the range of Bi area may be extended in both directions from a start index. Especially, when interleaving is not performed, such an offset should be set to minimize interference. If the same start index is set for each cell, an offset may be applied to an interleaver for each cell. That is, an interleaver offset may be set according to a cell ID or a cell-specific value so as to achieve a different interleaving result for each cell.

Change of an interleaver size means change of a value of row×column when necessary. If the number of columns is fixed, the number of rows may be changed or vice versa. The interleaver size may be changed according to the total number of REGs in a PRB to which an R-PDCCH is mapped. For example, assuming that one RB includes 8 REGs in the first slot and a total frequency band is 20 MHz (i.e. 100 RBs), there are 800 REGs (=8 REGs×100 RBs). Typically, all of the REGs are not defined as an SS. In this case, interleaved REG indexes are obtained by inputting 800 REG indexes to a 32-column interleaver on a row basis, performing column permutation, and reading the permuted REG indexes column by column. If the number of REGs for an SS is reduced to 400, interleaving may be performed by reducing the number of rows, while the number of columns is maintained. In this sense, the interleaver may be referred to as a variable interleaver.

Meanwhile, if a UL grant SS is configured independently in the second slot of the subframe, the above-described proposed method may also be applied to the second slot.

Figure 25:
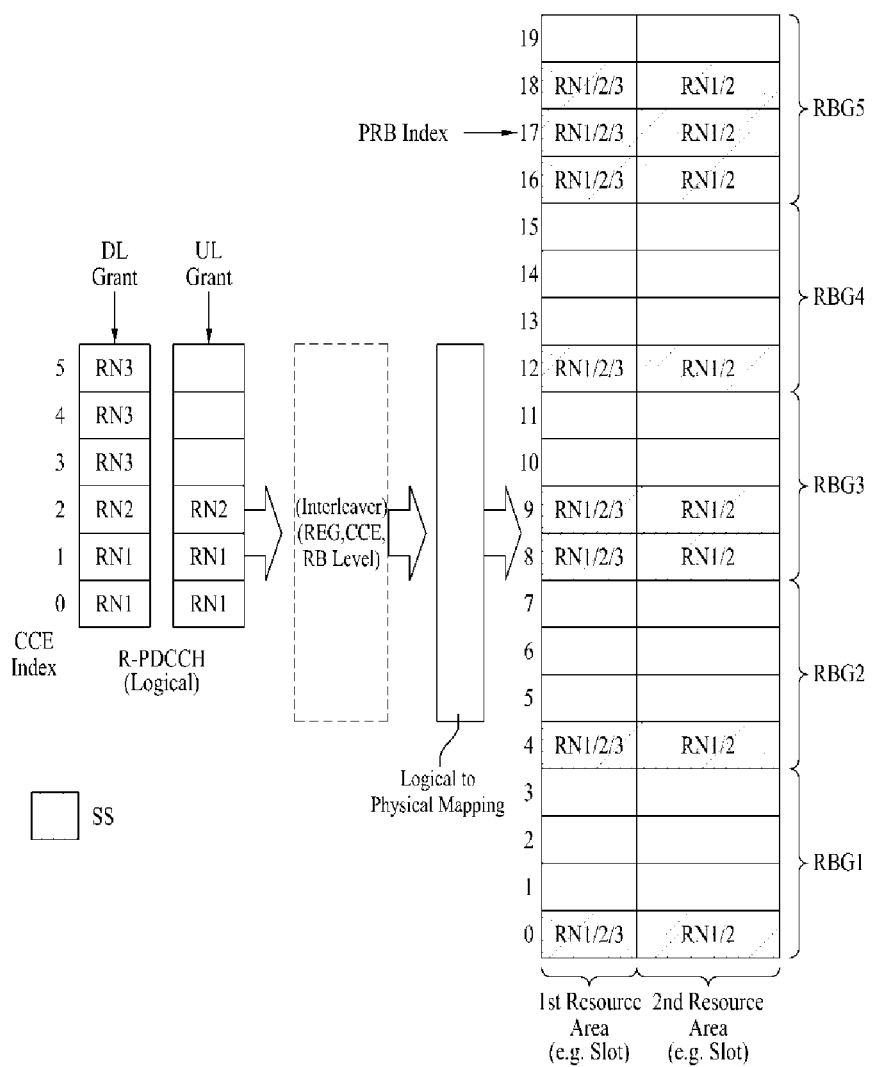
FIG. 25 illustrates a process of mapping R-PDCCHs to PRBs.

FIG. 25 illustrates an example of mapping R-PDCCHs to PRBs. More specifically, FIG. 25 illustrates a process for mapping logical R-PDCCH indexes (e.g. CCE indexes, REG indexes, or interleaving unit indexes) to PRBs through an interleaver. Interleaving may be performed only when needed. R-PDCCH-to-PRB mapping has the following features.

Interleaver size (the following attributes are applicable to every afore-described interleaver)

Only the column size is fixed, while the row size is variable.

Or the column size may be fixed at a few values.

The column size may be fixed according to bandwidth.

Column permutation may be performed.

Interleaver On/Off

Whether to use the interleaver is determined according to a transmission mode/configuration.

The interleaver is basically an off state. The interleaver may be on or off by higher-layer signaling.

The interleaver is off all the time when DM RSs are used. For CRSs, the interleaver is on all the time.

R-PDCCHs are mapped to PRBs at predetermined positions in an SS reserved for R-PDCCH transmission (i.e. an R-PDCCH SS). If interleaving is off, an R-PDCCH is mapped in units of a basic unit (e.g. a CCE) (in other words, an R-PDCCH unit). If interleaving is on, the R-PDCCH is mapped in units of REGs (in other words, an interleaving unit) and arranged at predetermined REG indexes. Therefore, if interleaving is on, one R-PDCCH (e.g. a DL grant) is distributed to a plurality of PRBs.

Referring to FIG. 25, DL grant interleaving/mapping and UL grant interleaving/mapping may be independently performed. For example, a DL grant may be mapped to the first slot of a PRB pair, while a UL grant may be mapped to the second slot of the PRB pair. In FIG. 25, while DL grants are transmitted to RN 1, RN 2 and RN 3, UL grants may be transmitted only to RN 1 and RN 2. In this case, the DL grants are interleaved and mapped to a plurality of PRBs, and the UL grants are also interleaved and mapped to a plurality of PRBs. As illustrated in FIG. 25, an R-PDCCH SS is desirably configured in PRB pairs irrespective of interleaving on/off. That is, it is desirable to identically configure an RB set for DL grants (simply, DL grant SS or DL SS) and an RB set for UL grants (i.e. UL grant SS or UL SS), irrespective of interleaving on/off.

Meanwhile, when a DL grant is present in the first slot of a PRB pair, it may be necessary to indicate the use state of the second slot of the PRB pair (e.g. a UL grant, an (R-)PDSCH, empty, etc.). To this end, when a DL grant is positioned in the first slot of a PRB pair, an RA bit is used to indicate whether an R-PDSCH is present in the second slot of the PRB pair. In this case, it is desirable that an R-PDCCH for only one RN be positioned in one RBG. However, when interleaving is applied, the R-PDCCH is distributed to a plurality of PRBs, thereby making it difficult to use an RA bit properly. Accordingly, even though only a UL grant for one of interleaved RNs is transmitted, the BS should inform the interleaved RNs whether a UL grant is present in all RBs to which interleaved UL grants are mapped.

For example, even though the BS does not transmit a UL grant to RN3, it should signal the state of the second slot to RN3 if a UL grant SS is present in a resource area allocated for an (R-)PDSCH of RN3, because the BS transmits jointly interleaved UL grants of RN 1 and RN 2 in the second slot. The use state of the second slot may be signaled by higher-layer signaling (e.g. RRC signaling) or physical-layer signaling. Because the BS is aware of the presence or absence of an interleaved R-PDCCH in an RB or RBG allocated for the (R-)PDSCH of RN3, the BS rate-matches the (R-)PDSCH, in consideration of an area having an R-PDCCH. However, when RN 3 decodes the R-PDCCH area, it should know the presence or absence of an R-PDCCH and thus the use state of the second slot needs to be signaled to RN3. As another example, it is possible to always empty all areas in which R-PDCCHs are interleaved in the second slot, for system simplification. Specifically, RN3 may empty the second slot of a DL SS on the assumption that the second slot of the DL SS is a UL SS or decode a downlink signal on the assumption that the second slot of the DL SS has no (R-)PDSCHs. The BS may perform scheduling based on the above assumption.

Multiplexing of Backhaul DL Data

If R-PDCCHs are interleaved, DL/UL grants of a plurality of RNs are interleaved. Thus, PRBs of an RBG carrying the DL grants need to be carefully allocated. In other words, collision between RN data (e.g. (R-)PDSCHs) should be considered for PRBs other than R-PDCCH PRB pairs and collision between data and UL grants should be considered for the second slots of the R-PDCCH PRB pairs.

First, the case where an RA bit for a specific RBG carrying a DL grant indicates 0 will be considered. In this case, it is preferred that the BS not use any of the remaining PRB(s) of the specific RBG in order to avoid collision between data transmitted to RNs. Although it is possible to allocate the PRB pairs of the RBG to another RN, each RN sharing the interleaved DL grant cannot determine whether the PRB pairs are used for other RNs.

Next, the case where an RA bit for a specific RBG carrying a DL grant indicates 1 will be considered. In this case, an RN expects that data transmission is performed in the RBG. The second slot of an R-PDCCH PRB pair may have two usages depending on whether the second slot is designated as a UL grant SS. If the second slot of a PRB pair carrying a DL grant in the first slot is designated as a UL grant SS by higher-layer signaling, data transmitted in the second slot of the PRB pair may be subjected to strong interference caused by a UL grant for another RN. That is, since an RN (RNs) is likely to receive a UL grant in the second slot of the R-PDCCH PRB pair, it is necessary not to allocate data for another RN to avoid collision between the data and the UL grant. On the other hand, if the second slot of the R-PDCCH PRB pair is not designated as a UL grant SS, data can be transmitted in the second slot of the R-PDCCH PRB pair.

Accordingly, the following RA methods may be considered. When an RA bit for a specific RBG carrying a DL grant is 0, a PRB (PRBs) other than a PRB carrying the DL grant is not used for RN data transmission. On the contrary, if an RA bit for an RBG carrying a DL grant is 1, a non-R-PDCCH PRB pair in the RBG is used for RN data transmission, whereas the second slot of an R-PDCCH PRB pair is not used for RN data transmission. In another method, if an RA bit for an RBG carrying a DL grant is 1 and the second slot of an R-PDCCH PRB pair is designated as a UL grant SS, the second slot of the R-PDCCH PRB pair is not used for data transmission. In the other cases, the second slot of the R-PDCCH PRB pair is used for data transmission.

FIG. 26 illustrates the above proposed RA. This example is based on the assumption that DL grants for two RNs RN 1 and RN 2 are interleaved and allocated to R-PDCCH PRBs of at least two RBGs. For convenience, RA bits for first and second RBGs are assumed to be 0 and 1, respectively. In Case 1 of FIG. 26, the RBGs include at least part of a UL grant SS, and in Case 2, the RBGs do not include a UL grant SS. The rule of allocating one RN per RBG and configuring an RBG in units of PRB pairs in an SS is also applicable even when interleaving is used.

Upon detecting a DL grant in the first slot, an RN can identify an RB or RBG allocated thereto using the relationship between the CCE index of an R-PDCCH and a PRB. In this case, the RN can determine whether data is present in the second slot by interpreting an RB or RBG RA bit associated with the PRB. For example, if CCEs are mapped to RBGs one to one or at the ratio of A:B, the RN may detect a CCE index and determine a PRB location thereof. Then, the RN can determine the presence or absence of data in the second slot using an RA bit indicating the PRB. For instance, if a UL grant is present in the second slot, the RA bit may indicate absence of data. The other PRB pairs except for the PRB in the RBG may be used for R-PDSCH transmission.

Figure 27:
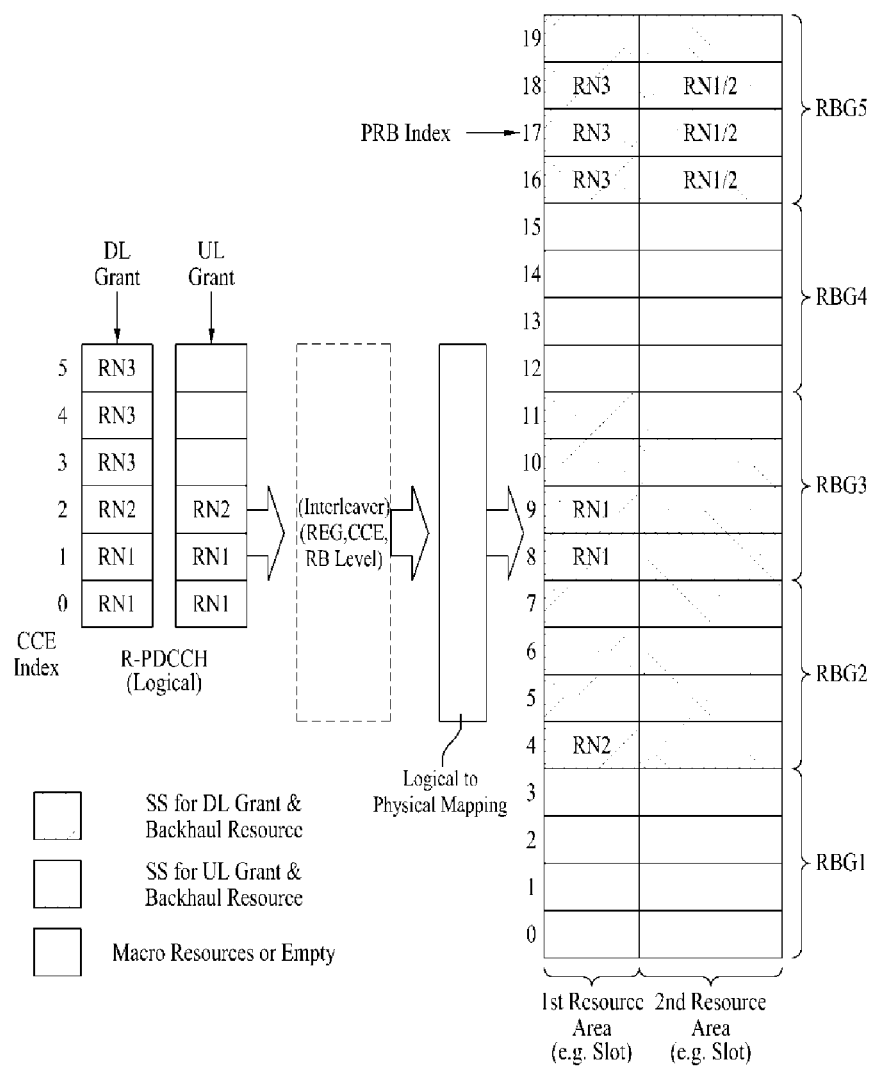
FIG. 27 illustrates R-PDCCH mapping when interleaving is off.

FIG. 27 illustrates exemplary R-PDCCH mapping in the case where interleaving is off. When interleaving is off, an R-PDCCH for each RN is mapped on a CCE or slot basis without interleaving. If an R-PDCCH aggregation level increases, the number of PRBs for an R-PDCCH increases within the same RBG. The aggregation levels of 2, 1 and 3 are set for RN1, RN2 and RN3, respectively in FIG. 27. If the aggregation level exceeds the number of RBs designated as an SS, it may be extended to another SS RBG. For instance, when one RB per RBG is designated as an SS, if the aggregation level is 4, the RN may obtain one R-PDCCH by performing blind decoding over 4 RBGs.

During SS configuration, the first RB may be basically used as the R-PDCCH SS within a backhaul RBG allocated for an R-PDCCH SS. Since different backhaul resources may be allocated according to a channel state over time, a change in an SS is indicated preferably by RRC signaling. For example, if an RBG includes 4 RBs, an R-PDCCH SS may be configured with up to 4 RBs per RBG. If an RBG includes 3 RBs, an R-PDCCH SS may be configured with up to 3 RBs per RBG. However, if only CCE aggregation levels of 1 and 2 excluding 3 are supported, only two RBs per RBG may be designated as part of an R-PDCCH SS. FIG. 27 illustrates an example in which 4 RBs of an RBG are all designated as R-PDCCH transmission candidates on the assumption that each RBG includes 4 RBs and a CCE aggregation level of 4 is supported. In FIG. 27, RN2 performs blind decoding in a designated R-PDCCH SS (RBG2/3/5) and detects a DL grant from the first PRB of RBG2 (PRB#4).

In fact, every RBG used as backhaul resources may correspond to an SS. Accordingly, RBGs designated as a backhaul resource area may be naturally designated as an SS. Alternatively, only some RBGs of the backhaul resources may be designated as an SS. Depending on an example of implementation, frequency resources (e.g. RBGs) may be allocated to an SS in various manners. For instance, if the indexes of resources allocated for backhaul transmission are uniformly distributed in order of odd numbers and even numbers, an SS may be configured with odd-numbered or even-numbered backhaul resources. It is also possible to configure an SS with every N-th frequency resource having a predetermined start offset.

SS Configuration Patterns and Signaling

Figure 28:
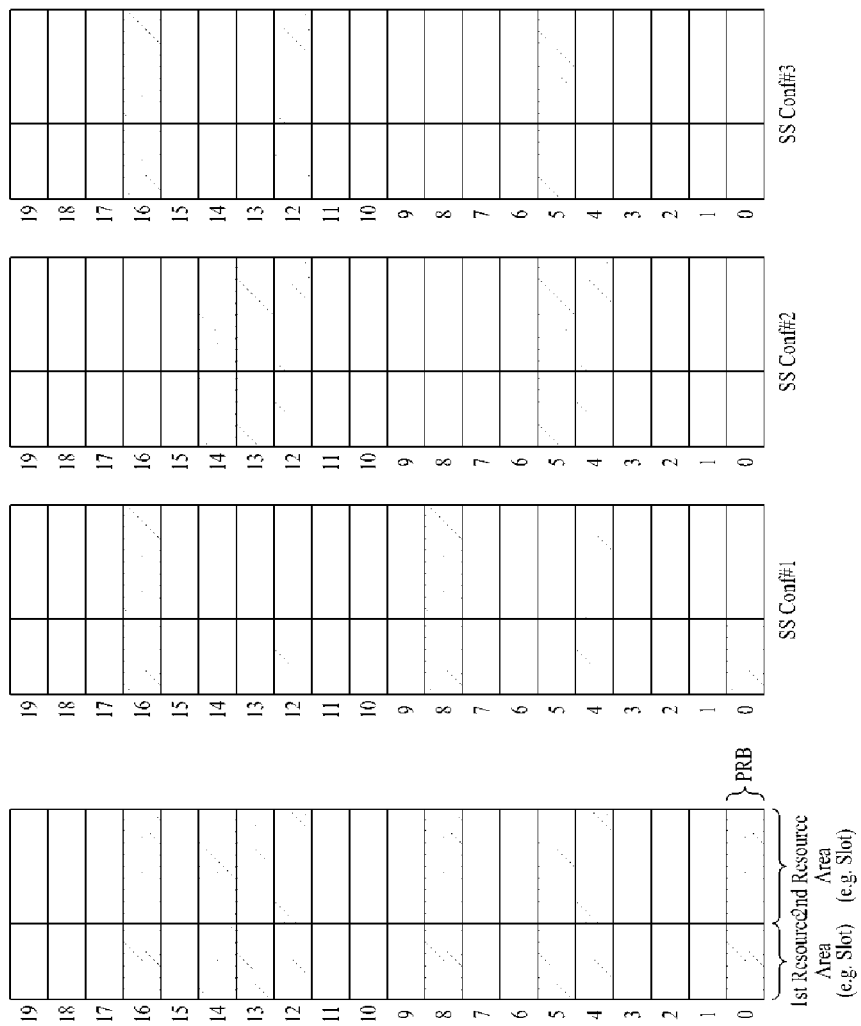
FIG. 28 illustrates an example of configuring different SS RBs or different SS RBGs over time.

FIG. 28 illustrates an example of configuring different SS RBs or different SS RBGs over time. Since the frequency positions of backhaul resources may change over time to obtain a frequency-selective scheduling gain, different SS RBs or different SS RBGs may be configured. An SS may always be configured in units of a PRB pair. In this case, the same mapping area may be set for an interleaved or non-interleaved R-PDCCH (e.g. a DL grant) in the first slot and an interleaved or non-interleaved R-PDCCH (e.g. a UL grant) in the second slot. That is, a DL grant SS and a UL grant SS may be identical. Preferably, the DL grant SS and the UL grant SS may be identical only in a non-interleaving mode. In addition, the UL grant mapping area of the second slot may be equal to or smaller than the DL grant mapping area of the first slot. In other words, the UL grant mapping area may be a subset of the DL grant mapping area.

Referring to FIG. 28, a reference SS configuration is shown at the leftmost side. The reference SS configuration is arbitrarily defined basic SS configuration for the purpose of description. Depending on implementation, the reference SS configuration may not be defined separately. In this example, an SS may change over time, cell-specifically, RN group-specifically, or RN-specifically. As shown, when an SS configuration set includes SSs Conf#1, Conf#2, and Conf#3, one of the SSs may be transmitted to change SS configuration. The SS configuration may be changed semi-statically by higher-layer signaling (e.g. RRC signaling) or dynamically by physical-layer signaling.

If an SS is limited to one PRB (pair) per RBG, the PRB (pair) for an SS may be at various positions in an RBG. However, considering RS-based demodulation, the middle RB of an RBG is preferable for the SS to achieve better performance. For example, if an RBG includes 3 RBs, the second RB may be used for the SS. Similarly, if an RBG includes 4 RBs, the second or third RB may be used for the SS. In this case, although the SS may be fixed to the second or third RB, an RB used as the SS is desirably signaled so as to be changed according to environment. An RB used for an SS may be changed semi-statically by higher-layer signaling (e.g. RRC signaling) or dynamically by physical layer signaling.

Other examples of signaling for SS configuration are as follows.

1. Signaling of DM RS-based demodulation or CRS-based demodulation.
2. Signaling of interleaving mode or non-interleaving mode.
3. Signaling of the position of an SS RB in an RBG: e.g. for case of 4 RBs→1, 2, 3, and 4 (four positions).
4. Signaling a relay backhaul resource area or a boundary: e.g. one of candidate boundaries is signaled.

While the above signals may be transmitted separately, they may be transmitted together in specific fields of the same RRC signal.

SS Configurations Based on RA Type

An R-PDCCH SS may be configured according to an RA type as follows. As described before with reference to FIGS. 7 to 9, RA Types 0, 1 and 2 are defined in legacy LTE. A description will first be given of RA Type 2.

FIGS. 29 and 30 illustrate examples of configuring an R-PDCCH SS using RA Type 2. In FIGS. 29 and 30, DVRBs are illustrated. Referring to FIGS. 29 and 30, the concept of an RBG subset may be introduced to RA Type 2, for SS configuration, like RA Type 1 of legacy LTE. An R-PDCCH SS may be configured within the same RBG subset from among resources allocated by RA Type 2. For example, if PRB indexes #0, #1, #2, #3, #16, #17, #18, and #19 constitute subset #0, an SS is configured preferably within the area of subset #0. Likewise, if PRB indexes #4, #5, #6, #7, #20, #21, #22, and #23 constitute subset #1, an SS is configured preferably within the area of subset #1.

Figure 31:
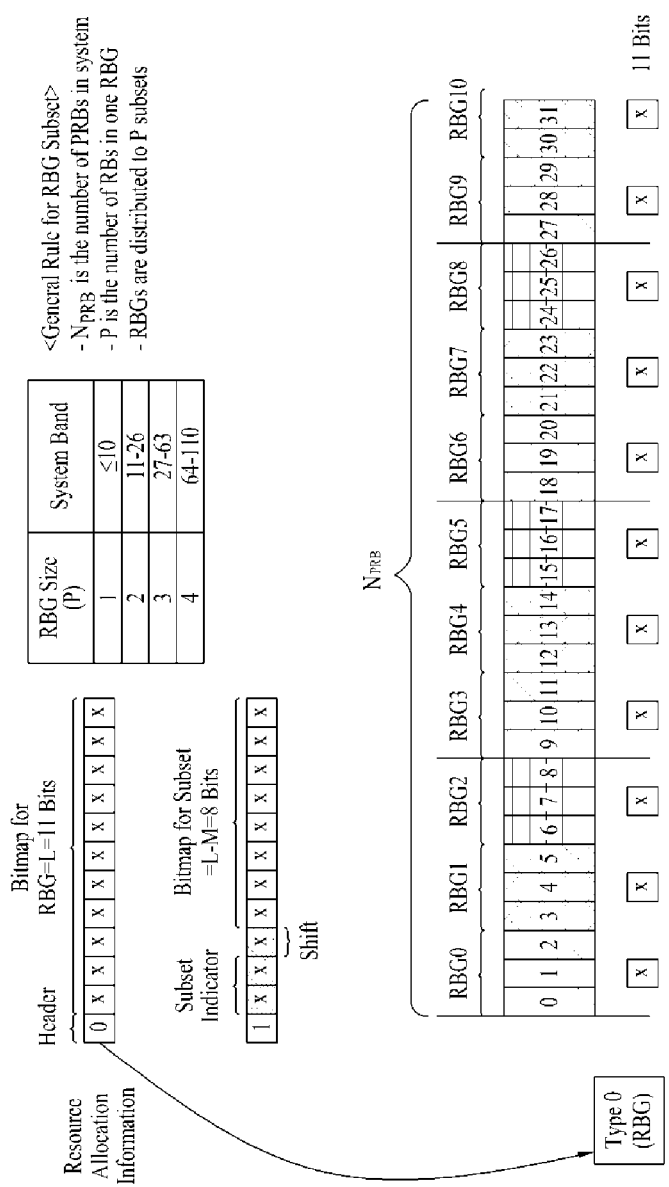

FIG. 31 illustrates an example of configuring an R-PDCCH SS according to RA Type 0. Referring to FIG. 31, only the concept of an RBG is used but the concept of an RBG subset is not explicitly defined, in RA Type 0. Nonetheless, for SS configuration, a BS/RN may regard RBGs #0, #3, #6, and #9 as subset #0, RBGs #1, #4, #7, and #10 as subset #1, and RBGs #2, #5, and #8 as subset #2. As described before, it is desirable to configure an R-PDCCH SS within the same subset. Therefore, the R-PDCCH SS may be defined in, for example, subset #0. If there are many R-PDCCHs, the R-PDCCH SS may be defined in subset #0 and subset #1. If more R-PDCCHs exist, the R-PDCCH SS may be defined in every subset. In most cases, one subset #k (k=0 to p) may be sufficient for the R-PDCCH SS.

Figure 32:
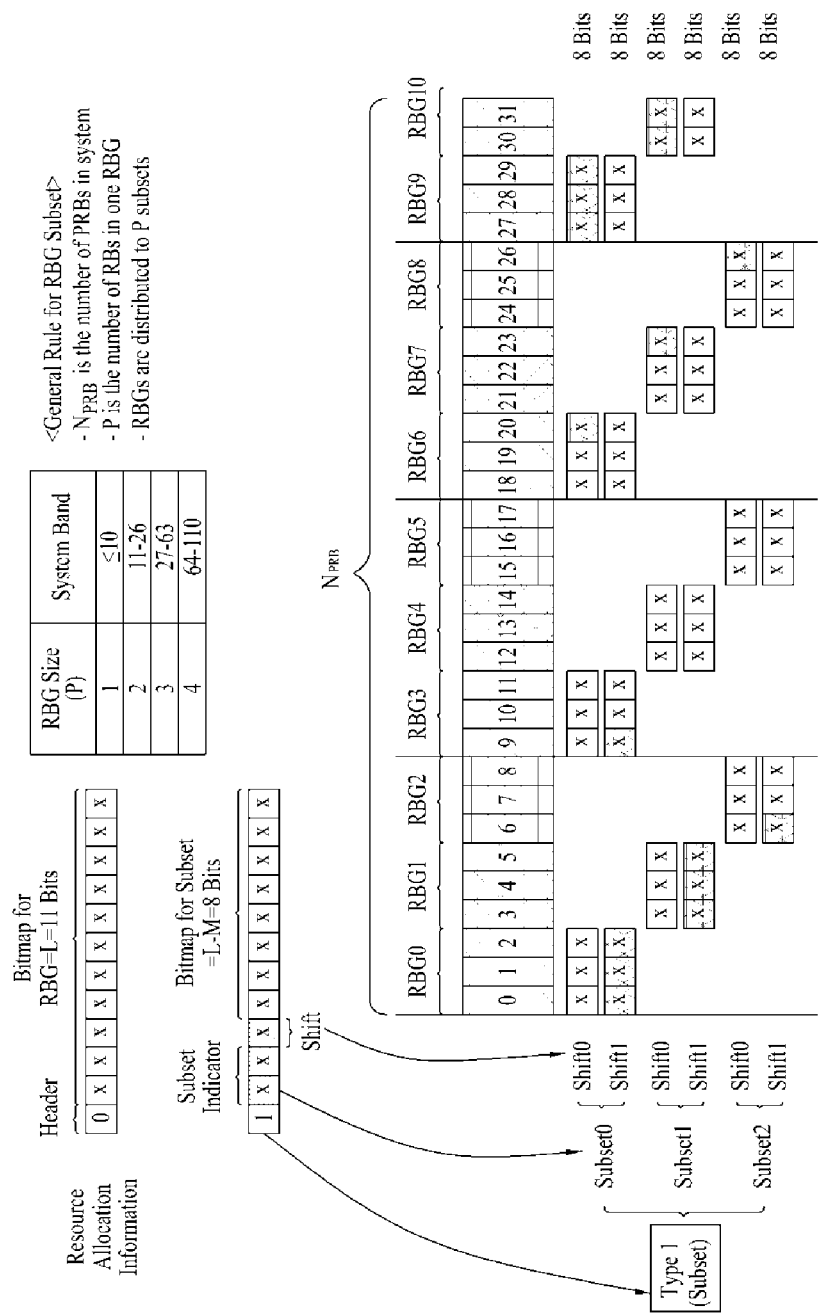

FIG. 32 illustrates an example of configuring an R-PDCCH SS according to RA Type 1. Referring to FIG. 32, RA Type 1 is a typical example to which the concept of an RBG subset (shortly, a subset) is introduced. As illustrated, in the case of a system band of 32 RBs, three subsets may be configured. The R-PDCCH SS is desirably configured using RBGs of the same subset index, first of all. In FIG. 32, subset #0 includes RBGs #0/#3/#6/#9. Hence, the R-PDCCH SS may be configured using RBGs #0/#3/#6/#9. Whether all or part of the RBGs of subset #0 are used is indicated by separate signaling or determined according to a preset pattern. It is also preferred to create a bitmap indicating a specific subset and specific RBGs within the specific subset. For example, the bitmap may be created to indicate subset=0 and RBGs=0 and 6. In the case of 32 RBs, a 6-bit signal, including a subset indicator of 2 bits and an RBG bitmap indicator of 4 bits, is sufficient. This indication information may be semi-statically transmitted by RRC signaling. If a single subset is used to configure the R-PDCCH SS, the subset is fixed as a specific subset (e.g. subset #0) and only an RGB bitmap indicator may be signaled. If one or more subsets are used to configure the R-PDCCH SS, these subsets may be indicated by a bitmap. When the size of the bitmap is large, the subset indication information may be reduced by compression, for example, by representing a start subset and a subset length.

If the R-PDCCH SS is designated within a single subset in above description, it is proposed that SS RBs be spaced apart from one another by the square of P wherein P is the number of RBs in an RBG. In the above example of 32 RBs, 11 RBGs may be defined. Since each RBG includes 3 RBs, P=3. Accordingly, the R-PDCCH SS RBs may be disposed with a spacing of 9 RBs (=$3^2$). If a plurality of subsets is used for the SS, $P^2$ is the interval between SS RBs in each subset. The interval between subsets may be determined according to selected subsets and the number of the selected subsets.

Meanwhile, in legacy LTE, the start position of an SS is different for each aggregation level. However, there is no need to differentiate the start position of an SS for an RN on a backhaul link according to an aggregation level. In this case, depending on a DCI payload size and a subblock interleaver size, the aggregation level of specific DCI may not be determined and as a result, a PUCCH resource assignment generated based on CCE-to-ACK/NACK linkage may not be detected correctly. However, setting of a different start position for an SS according to each aggregation level causes difficulty in actual PRB mapping. While a PDCCH SS is mapped to contiguous PRBs in a control region, an R-PDCCH SS is present in non-contiguous PRBs and is subject to the constraint that a DL grant and a UL grant exist in the same PRB pair. Therefore, it is desirable to keep the start position of blind decoding for aggregation level N (e.g. 1) and the start position of blind decoding for aggregation level M (e.g. 2) equal. Then the burden of calculating a hash function in order to determine the start position of blind decoding for each aggregation level is reduced.

A method for implicitly matching the blind decoding start positions of a DL grant and a UL grant (or it may be assumed that they are identical) is proposed. That is, if the total number of CCEs of an R-PDCCH SS for a DL grant is N, the total number of CCEs of an R-PDCCH SS for a UL grant may be maintained at N. In this case, the index of the start position of the DL grant (e.g. a start CCE index for DL grant blind decoding) obtained using the hash function may be reused as the index of the start position of the UL grant (e.g. a start CCE index for UL grant blind decoding) for the same RN. In this case, there is no need to calculate the hash function for the UL grant.

If an SS is configured using one RB in an RBG, the RB is preferably positioned in the middle of an RBG. To simplify implementation, it is also possible to set only one PRB located at one end of an RBG as an SS. However, if SS resources are allocated on an RBG basis, since all RBs of an allocated RBG configure an SS, any RB of the RBG may be used for the SS.

If an RBG includes fewer RBs than P, an SS may be configured only with a predetermined number of RBs (N: N<P) in an RBG. For example, the SS may be configured with N RBs counted from the first RB of each RBG or with N RBs counted from the last RB of each RBG.

Considering a shift in a subset in RA Type 1, it may occur that, even though a subset includes Q RBGs, all of the Q RBGs cannot be signaled to an RN in association with RA. Therefore, the scheduler preferably maps an R-PDCCH in consideration of this case. In FIG. 32, in the case of subset#0 and shift#0, an RA bitmap indicates only RBGs#0, #3, and #6 out of RBGs#0, #3, #6, and #9. Hence, all of the RBGs need not be blind-detected on the part of an RN. Thus, three RBGs may be determined to be a maximum blind decoding size in the above example. The maximum blind decoding size may vary with bandwidth. For instance, if 96 RBs are used, P=4 and a total of 25 RBGs is defined and RA is indicated only with respect to part of the 25 RBGs.

Figure 33:
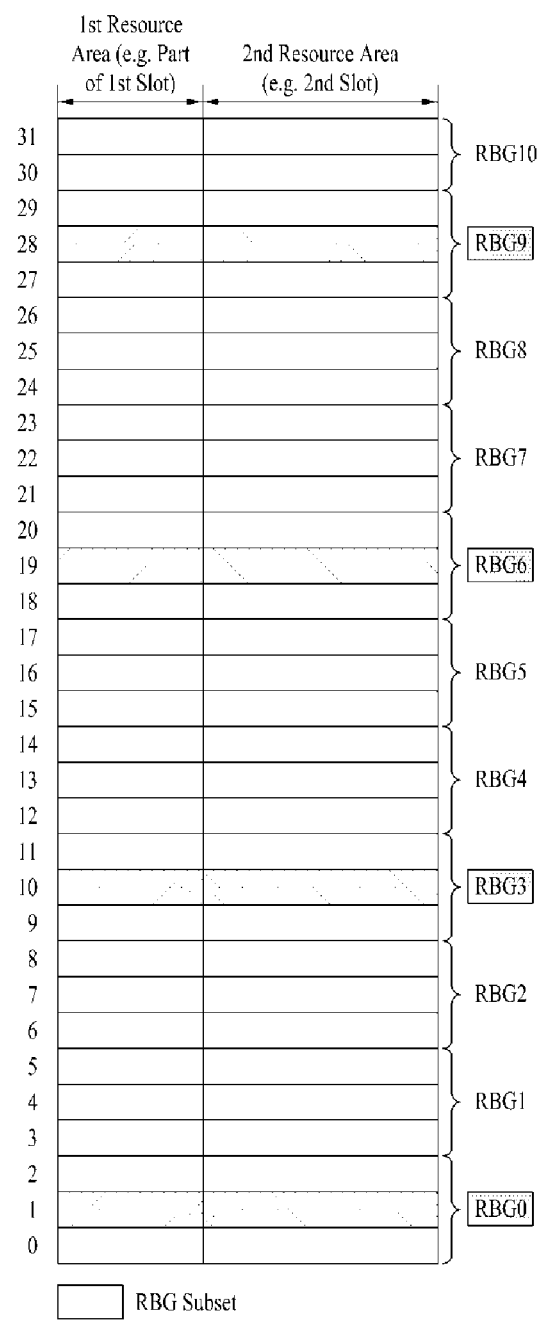
FIGS. 33 to 35 illustrate various examples of R-PDCCH SS configuration in RBGs.
Figure 34:
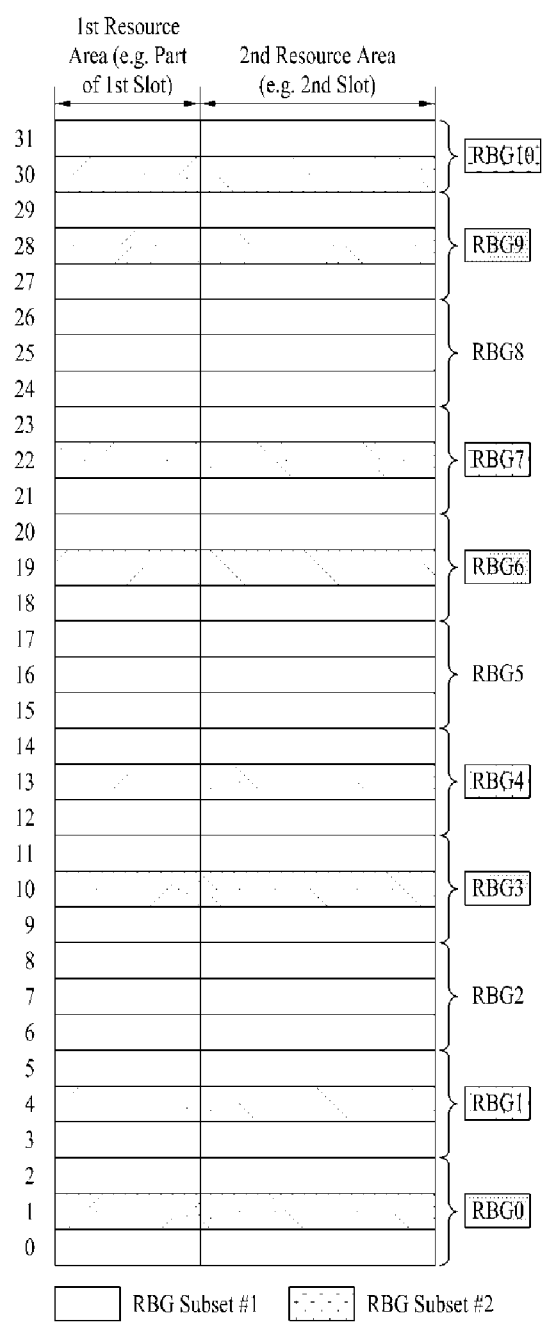
Figure 35:
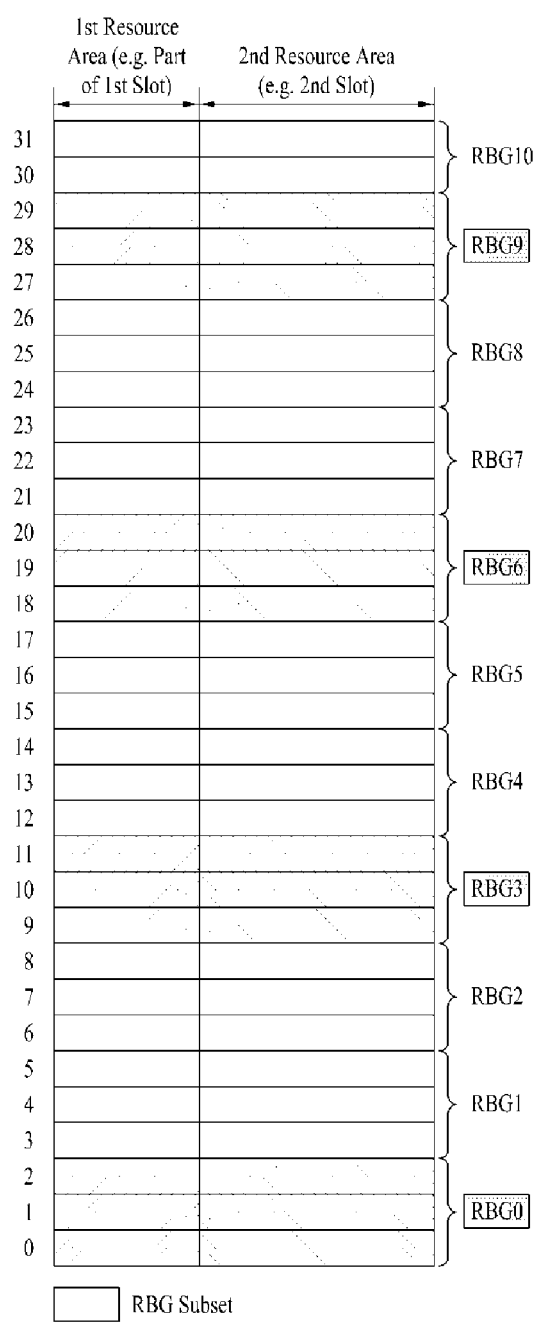

FIGS. 33 to 35 illustrate various examples of configuring an R-PDCCH SS in RBGs according to the above-described methods. In FIGS. 33 to 35, an R-PDCCH SS is configured using RBGs within the same RBG set. Specifically, FIG. 33 illustrates an example of configuring an SS using the middle RB pair of each RBG in an RBG subset when an RGB includes 3 RBs. In FIG. 34, two SSs are configured in different RBG subsets. In FIG. 34, when the last RBG includes fewer RBs than P, an SS may be configured only with a predetermined number of RBs (e.g. 2 RBs) in the RBG. FIG. 35 illustrates an example of configuring an SS using all RB pairs in each RBG.

Common Search Space

At least in a CRS-based R-PDCCH demodulation mode, a DL grant Common Search Space (CSS) and/or a UL grant CSS may be configured. Preferably, a CSS may be set only for UL grants. If both DL and UL grants are interleaved and a smaller number of UL grants is paired with DL grants, only the smaller number of UL grants may be filled in PRB pairs through interleaving, while the other areas of the PRB pairs may not be used. This problem may be solved via the following methods.

One of the methods is that, in the case of partial (or full) interleaving, the second slots of PRB pairs (in an interleaving group) are not used for R-PDSCH transmission even though only one UL grant is interleaved in the second slots of the PRB pairs. Unused REGs of the second slots may be used by indicating distributed positions of REGs of the (interleaved) UL grant through signaling. Alternatively, the second slots of the PRB pairs may always be left empty irrespective of transmission of the (interleaved) UL grant. In this method, an R-PDSCH is rate-matched in consideration of a distributively positioned UL grant fragment.

As another method, when a DL grant SS and a UL grant SS are independently configured and significant resource waste is expected due to a relatively small number of UL grants with respect to DL grants irrespective of the positions of the DL grants, the UL grants may be disposed in a CSS. According to this method, the second slots of PRB pairs carrying a plurality of DL grants can be used for another purpose (e.g. R-PDSCH transmission), thereby reducing resource waste. Meanwhile, some UL grants may be paired with DL grants and thus the paired UL and DL grants may be positioned in the same PRB pairs. Therefore, an RN first attempts to detect a DL grant in the first slot of an RB pair in order to receive an R-PDCCH. Upon detection of the DL grant in the first slot, the RN attempts to detect a UL grant in the second slot of the RB pair. If the RN fails to detect a UL grant in the RB pair, the RN attempts to detect a UL grant in a UL grant CSS configured in the second slot.

A third method is to differentiate a DL grant interleaving size from a UL grant interleaving size. For instance, DL grants may be partially interleaved in units of 4 RBs, whereas UL grants may be partially interleaved in units of 2 RBs. To facilitate DL and UL grant interleaving of different sizes, a DL grant resource area and a UL grant resource area should be independently managed. As stated before, when a UL grant CSS is used, interleaving of different sizes can be applied.

Figure 36:
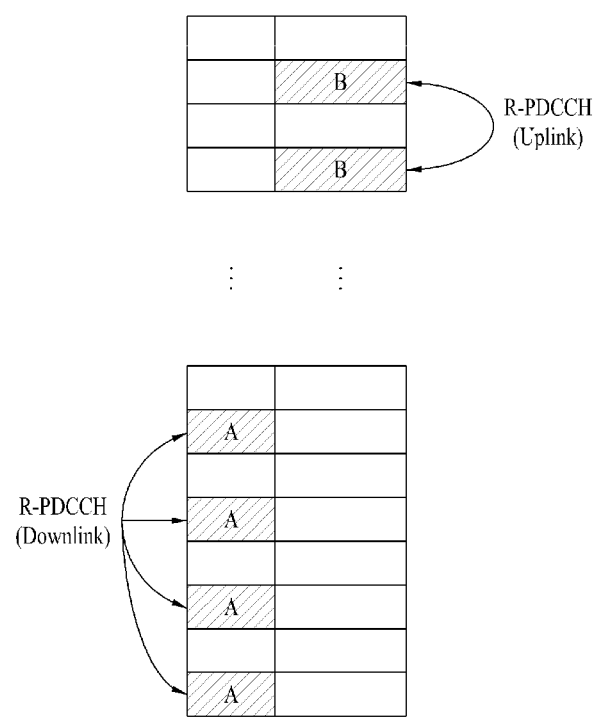
FIG. 36 illustrates exemplary R-PDCCH DSS/CSS configuration.

In FIG. 36, areas A and B denote a DL grant SS and a UL grant SS, respectively. The area A may be a Dedicated SS (DSS) and the area B may be a CSS. Each of the areas A and B may be configured to have both a DSS and a CSS. An SS may be a DSS or a CSS according to types of RSs for R-PDCCH demodulation. For example, if DM RSs are used, a DSS may be configured. If CRSs are used, a CSS may be configured. It may be indicated by signaling whether an SS is a DSS or a CSS.

CCE Aggregation Levels Based on RBG

Figure 37:
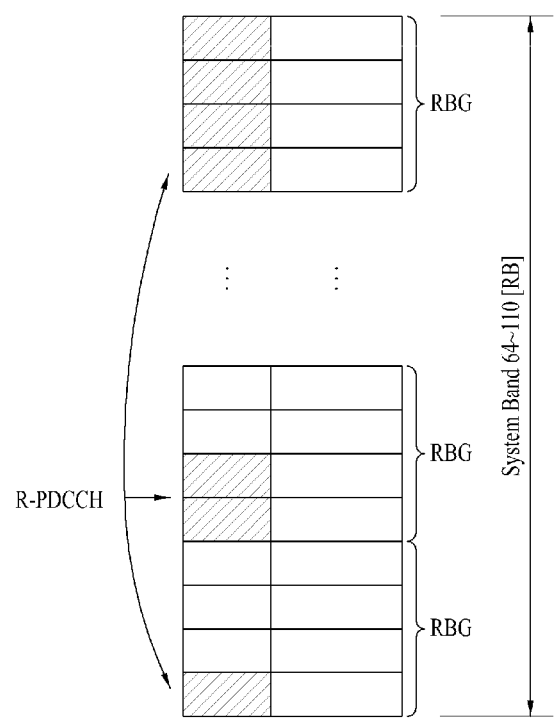
FIG. 37 illustrates exemplary R-PDCCH transmission according to system bandwidth.

RBG size depends on system Bandwidth (BW). In LTE, RBG sizes are defined as 1, 2, 3 and 4 RBs according to system BWs. If a system BW includes 64 to 110 RBs to ensure compatibility with legacy LTE, each RBG includes 4 RBs. Accordingly, the CCE aggregation levels of R-PDCCHs may be limited to one or more sets of (1, 2, 3, 4), (1, 2, 3), (1, 2, 4), and (1, 2) (e.g. 1 CCE=1 RB). An example of R-PDCCH transmission in a system BW of 64 to 100 RBs is illustrated in FIG. 37. If the BW includes 27 to 63 RBs, the RBG size is 3 RBs and thus the CCE aggregation levels of R-PDCCHs may be limited to one or more sets of (1, 2, 3), (1, 2), and (1, 3). If the BW includes 11 to 26 RBs, the RBG size is 2 RBs and thus the CCE aggregation levels of R-PDCCHs may be limited to one or more sets of (1, 2), (1), and (2). It is possible to set the CCE aggregation level to 1, 2, 3 and 4 and then to limit the highest CCE aggregation level to one of the values, to cover all cases. For example, different aggregation levels may be supported according to BWs.

Table 4 illustrates supportable aggregation levels for different BWs.

TABLE 4

| System BW RB] | Supportable aggregation level |
|---|---|
| 64~110 | 1, 2, 3, 4 |
| 27~63 | 1, 2, 3 |
| 11~26 | 1, 2 |
| <=10 | 1 or non-support |

Interleaving and Mapping for R-PDCCH

Figure 38:
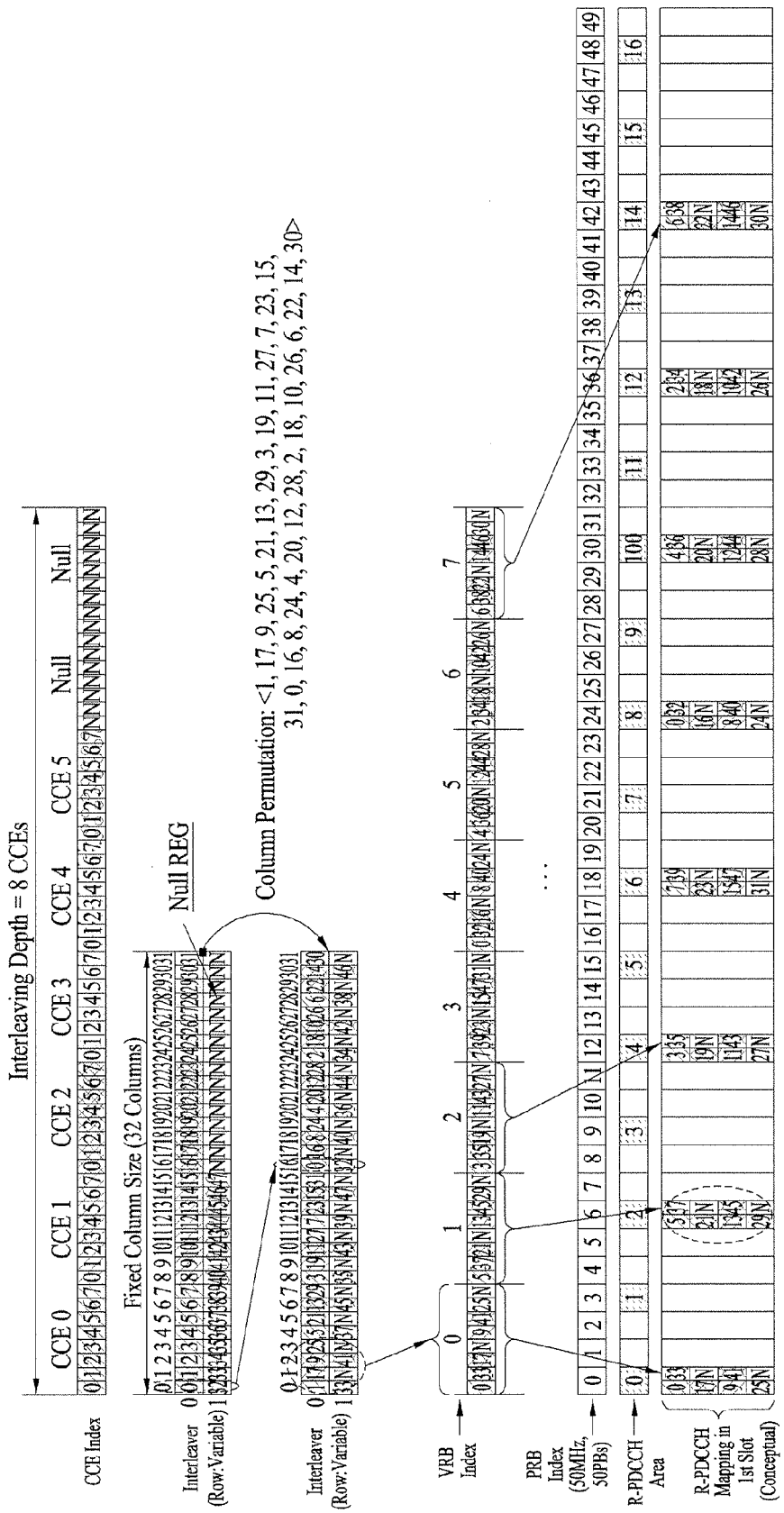
FIGS. 38 to 42 illustrate mapping operations for R-PDCCH transmission.

FIG. 38 illustrates a mapping operation for R-PDCCH transmission. This example is characterized in that an R-PDCCH is interleaved and mapped to a PDSCH area according to a VRB-to-PRB mapping rule in order to transmit the R-PDCCH in the PDSCH area, instead of an LTE PDCCH area. For R-PDCCH transmission, various interleaving schemes and various mapping schemes can be used. It is also possible to subject CCEs to interleaving (partial interleaving) on a group basis and then map the interleaved CCEs, based on the operation of FIG. 38. On the part of an RN, an operation for detecting an R-PDCCH in one or more partial-interleaved areas may be included.

FIG. 38 is based on the assumption that an area in which an R-PDCCH (R-PDCCHs) corresponding to 8 CCEs (e.g. 1 CCE=8 REGs) can be transmitted is semi-statically signaled and the R-PDCCH is actually transmitted in resources corresponding to 6 CCEs (all or each of 6 CCEs may be used by one RN). The size of a CCE may differ according to a normal CP or an extended CP or according to a CRS mode or a DM-RS mode. Herein, it is assumed that 8 REGs of a PRB in the first slot are available and defined as one CCE in case of a normal CP/DM-RS mode. In FIG. 38, a bandwidth includes 50 RBs and one PRB per RBG (1 RBG=3 RBs) is used for R-PDCCH transmission. The RBG size may be determined as defined in legacy LTE.

Interleaving & Permutation

In Method 1, 8 CCEs including nulls are interleaved (including column permutation according to a column permutation pattern). Bit reversal is used as an example of the column permutation pattern. For reference, an RN-specific SS (within a logical CCE index domain) is assumed. Method 2 will be described later. Method 3 is different from Method 1 in that one or more interleaving units are used. For example, 8 CCEs are divided into a plurality of parts (e.g. two parts each having 4 CCEs) and interleaved in Method 3. Meanwhile, if RB-level permutation is performed during VRB-to-PRB mapping (e.g. using bit reversal), REG-level column permutation or bit reversal may be omitted during interleaving, which does not affect performance much. For reference, an SS in a logical CCE domain is assumed to be a CSS (accessible to all RNs) in Method 3. The use of an RN-specific SS may slightly decrease operation efficiency or resource efficiency, but does not limit the application of the present invention.

After interleaving and permutation, an R-PDCCH is mapped to PRBs according to various rules. To describe the mapping, the concept of a VRB may be used. In the example of FIG. 38, 8 REGs, namely, 1, 33, 17, N, 9, 41, 25, N (where N is a null REG) among values (outputs) read column-wise after interleaving and permutation constitute one VRB. While a VRB and a CCE are equal in size in FIG. 38, it is determined that the same performance may be achieved even though the VRB size is larger than the CCE size. Even in case of a normal CP, the following various numbers of REGs are available. Therefore, the CCE size and the VRB size may be changed based on the number of available REGs per RB according to a transmission mode, as follows.

$1^{st}$ slot:
8 REGs in the $1^{st}$ slot (e.g. DM RS used)
11 REGs in the $1^{st}$ slot (e.g. CRS used)
$2^{nd}$ slot:
15 REGs in the $2^{nd}$ slot (e.g. DM RS used and 4TX CRS)
16 REGs in the $2^{nd}$ slot (e.g. DM RS used and 2TX CRS)
18 REGs in the $2^{nd}$ slot (e.g. CRS used and 4TX CRS)
19 REGs in the $2^{nd}$ slot (e.g. CRS used and 2TX CRS)

For example, when a DL grant is transmitted in the first slot, the DL grant is interleaved by defining one CCE as 8 REGs. A VRB size may be defined as 8 REGs in case of DM RSs and as 11 REGs in case of CRSs. According to this method, a detection operation may be facilitated by fixing the CCE size. In addition, the VRB size is defined as an optimum value (e.g. the number of available REGs) to efficiently use the number of available REGs which varies according to an RS mode. Therefore, resource waste can be minimized.

It is also desirable in the second slot to define one CCE as 8 REGs and one VRB as 15, 16, 17, or 19 REGs in actual VRB-to-PRB mapping. The size of one VRB is given as an example according to a change in RSs and TX antennas. The VRB size may be changed even if the same logic and rule are used.

VRB-to-PRB Mapping

The simplest mapping rule is to sequentially map VRB indexes to R-PDCCH PRB indexes (renumbered indexes only for R-PDCCH RBs or indexes labeled in an R-PDCCH area in FIG. 38) at 1:1. Despite its simplicity, this mapping rule causes localization of jointly interleaved CCEs in a part of an R-PDCCH PRB (R-PDCCH PRBs). The localization may not matter if the part includes 4 or more PRBs, while it may cause a problem with diversity gain if the part includes PRBs less than 4 PRBs.

In another method, permutation may be performed (e.g. using bit reversal) at an RB level. This method is advantageous in that a rule is simple and VRBs are uniformly mapped to PRBs. For example, if a total of four R-PDCCH PRBs is present, VRB #0(00), VRB #1(01), VRB #2(10), and VRB #3(11) may be mapped to R-PDCCH PRBs #0(00), #2(10), #1(01), and #3(11), respectively. If the number of R-PDCCH PRBs is not $2^N$, VRBs may be mapped to the R-PDCCH PRBs by a method such as pruning, while the bit reversal rule is maintained. When bit reversal is applied, it is preferable not to use column permutation (e.g. REG-level bit reversal) during interleaving. However, both REG-level bit reversal and RB-level bit reversal may be applied only if implementation complexity permits.

In a further method, a rule that enables uniform distribution may be used. For example, a VRB index i may be mapped to a PRB index f(i) as indicated by Equation 4. In Equation 4, N represents the size of a physical R-PDCCH area (e.g. a PRB unit) and K represents the size of an actual R-PDCCH to be transmitted (e.g. a PRB unit). Even when numbers of available REs in a VRB and a PRB differ, K is calculated in terms of PRBs. Herein, a, b and c are constants.

$$f(i) = c * \left\lfloor \frac{i*N + a}{K} \right\rfloor + b \quad \text{[Equation 4]}$$

Table 5 and Table 6 illustrate VRB-to-PRB mapping according to Equation 1. Table 5 illustrates VRB-to-PRB mapping when K=7, N=16, a=b=0, and c=1. That is, Table 5 illustrates mapping of VRB indexes 0 to 7 (8 RBs, K=7)

to R-PDCCH PRB indexes 0 to 16 (17 RBs, N=16). Table 6 illustrates VRB-to-PRB mapping when K=7 and N=24.

TABLE 5

| VRB index | 0 | 1 | 2 | 3 | 4 | 5 | 6 | 7 |
|---|---|---|---|---|---|---|---|---|
| PRB index (R-PDCCH) | 0 | 2 | 4 | 6 | 9 | 11 | 13 | 16 |

TABLE 6

| VRB index | 0 | 1 | 2 | 3 | 4 | 5 | 6 | 7 |
|---|---|---|---|---|---|---|---|---|
| PRB index (R-PDCCH) | 0 | 3 | 6 | 10 | 13 | 17 | 20 | 24 |

A mapping pattern may be shifted or a mapping interval is adjusted using the additional parameters a, b, and c in Equation 4.

While REG-to-PRB mapping is not described in detail in FIG. 38, it may be carried out in various manners. For example, REGs may be mapped to a PRB in a frequency-first mapping rule in the PRB, as illustrated in FIG. 38. However, the mapping pattern may vary according to an actual REG configuration and actual indexing.

Figure 39:
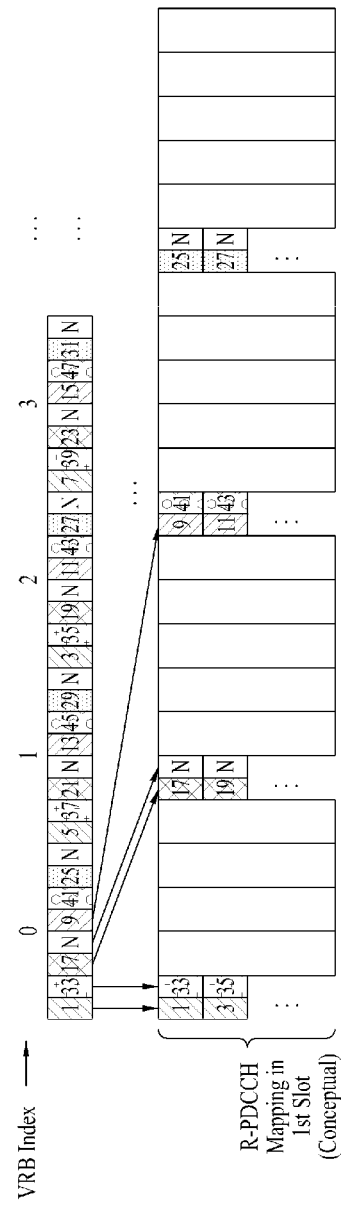

As one method, frequency-first mapping may be performed across total R-PDCCH PRBs. Then an interleaved result may be obtained as illustrated in FIG. 39. In FIG. 39, CCE0 and CCE4 exist in R-PDCCH PRBs #0 and #4 only. Each CCE is present only in an R-PDCCH PRB with an index corresponding to the CCE. Therefore, a diversity gain problem may occur. If the VRB size is different from the PRB size, mapping may be performed in a different manner.

Figure 40:
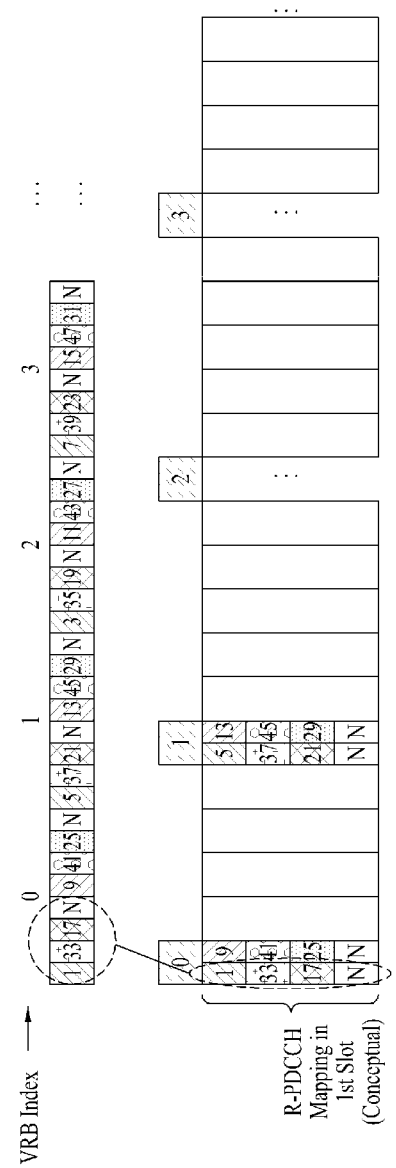

As another method, time-first mapping may be performed within each R-PDCCH PRB. FIG. 40 illustrates an example of time-first mapping.

Interleaving and mapping method 2 is almost identical to the method of FIG. 38 in terms of transmission. However, an RN should additionally perform blind decoding according to interleaving depths in order to detect an interleaving depth because the RN does not know how many RBs are used for interleaving. However, this method can dynamically optimize resources by setting an interleaving depth equal to the size of an R-PDCCH to be transmitted (e.g. a RB unit), when possible. If the interleaving depth is 1 RB, the size of an R-PDCCH for actual transmission may be equal to the actual interleaving depth. Notably, it is desirable to preset interleaving depths in units of a predetermined size, such as 4 RBs, 8 RBs, 12 RBs, etc. in order to reduce the number of operations of blind decoding for interleaving depths. This information may be set by RRC signaling. If an R-PDCCH area includes 16 RBs and an interleaving depth of only {8 RBs, 16 RBs} is permitted, one of various sets such as {4 RBs, 8 RBs, 16 RBs}, {4 RBs, 8 RBs, 12 RBs, 16 RBs}, and {4 RBs, 16 RBs} may be preset by signaling.

This signaling scheme may be used when an RN determines a monitoring set in Method 3. That is, one of set 1, set 2 and even full sets may be signaled to an RN, as an appropriate monitoring set. This scheme can be used to signal an RN monitoring set in almost all proposed methods.

Methods 1, 2 and 3 are based on the assumption of a fixed interleaver column size. However, the fixed interleaver column size is purely exemplary and the column size may be variable. For instance, interleaving may be performed in an interleaver with a column size of 16.

RN-Specific CCE Indexing

The foregoing methods have been described on the premise that CCE indexes are cell-specific. Unlike this, CCE indexes may be defined RN-specifically. In FIG. 38, CCE0 to CCE3 and CCE4 to CCE7 are RN-specifically interleaved separately and it is assumed that each interleaving group includes CCE0 to CCE3. As a result, CCE0 of group 1 is different from CCE0 of group 2. Only when information required to distinguish them is signaled to an RN, the RN may calculate BS-specific (or cell-specific) CCE indexes. Since BS-specific CCE indexes are used to determine RN PUCCH resources during UL ACK/NACK transmission, they should be defined cell-specifically to avoid overlapped RA or resource waste. Instead of additionally transmitting information such as a group index for RN PUCCH resources, the RN PUCCH resources (e.g. PUCCH RBs) may be allocated by group and the start RB of the allocated RN PUCCH resources may be signaled. For reference, RN PUCCH resources are assumed to be linked with an R-PDCCH CCE index (e.g. a minimum CCE index for an R-PDCCH).

Interleaving and Mapping Method 4

Figure 41:
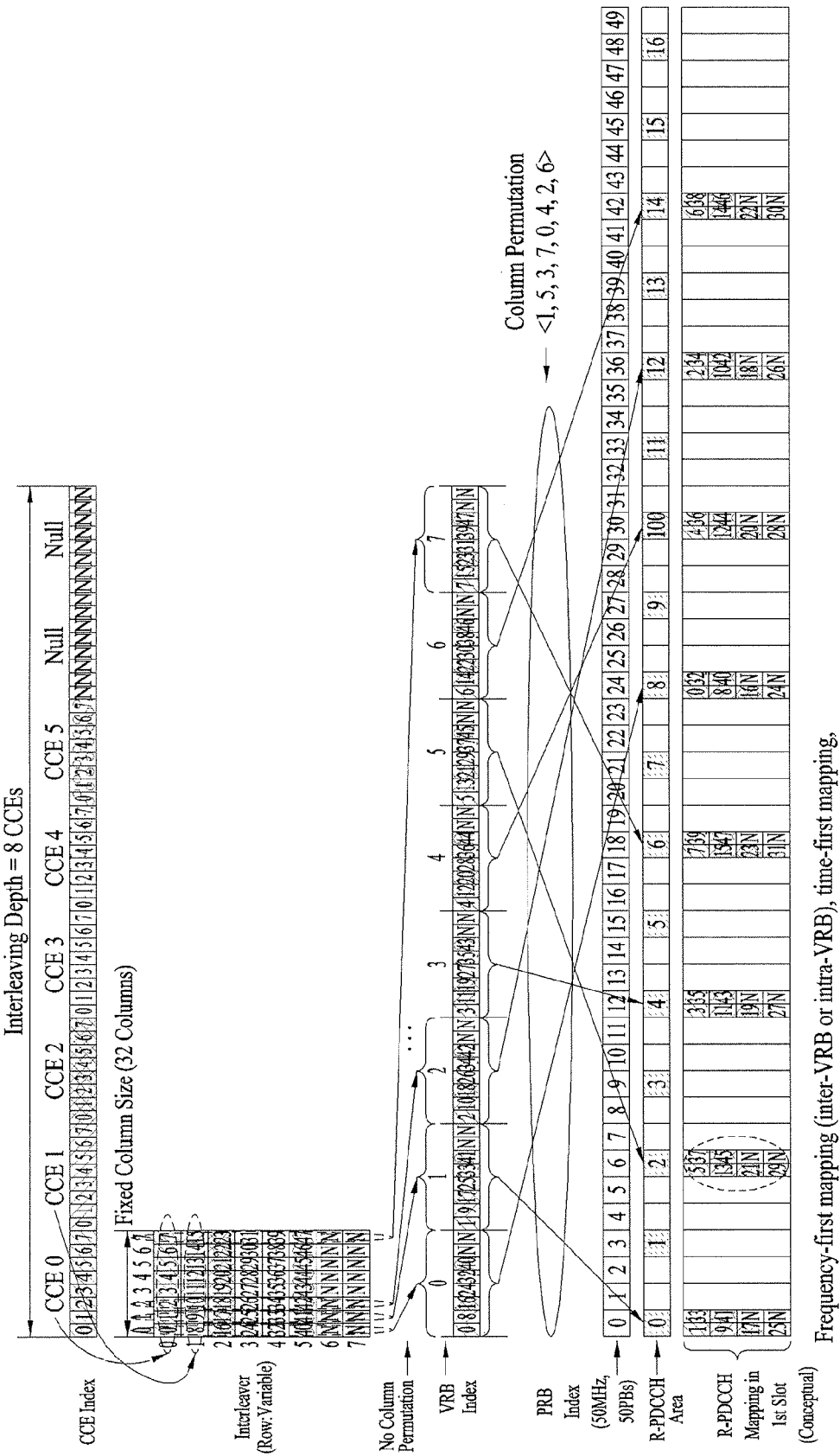

FIG. 41 illustrates an R-PDCCH mapping operation in Method 4. According to Method 4, permutation is uniformly performed (e.g. using bit reversal) during VRB-to-PRB mapping, without performing column-wise permutation during interleaving. In this method, an interleaver column size is defined as the number of REGs in a CCE and an interleaver row size is changed according to the number of CCEs to be interleaved. According to this method, REGs constituting one VRB are extracted from 8 different CCEs (herein, 1 VRB=8 REGs). If the number of R-PDCCH RRBs is not $2^N$ (N-1, 2, 3, ... ), mapping may be performed by bit reversal pruning. The interleaver column size characteristic of this method is also applicable to Methods 1, 2 and 3.

Interleaving and Mapping Method 5

Figure 42:
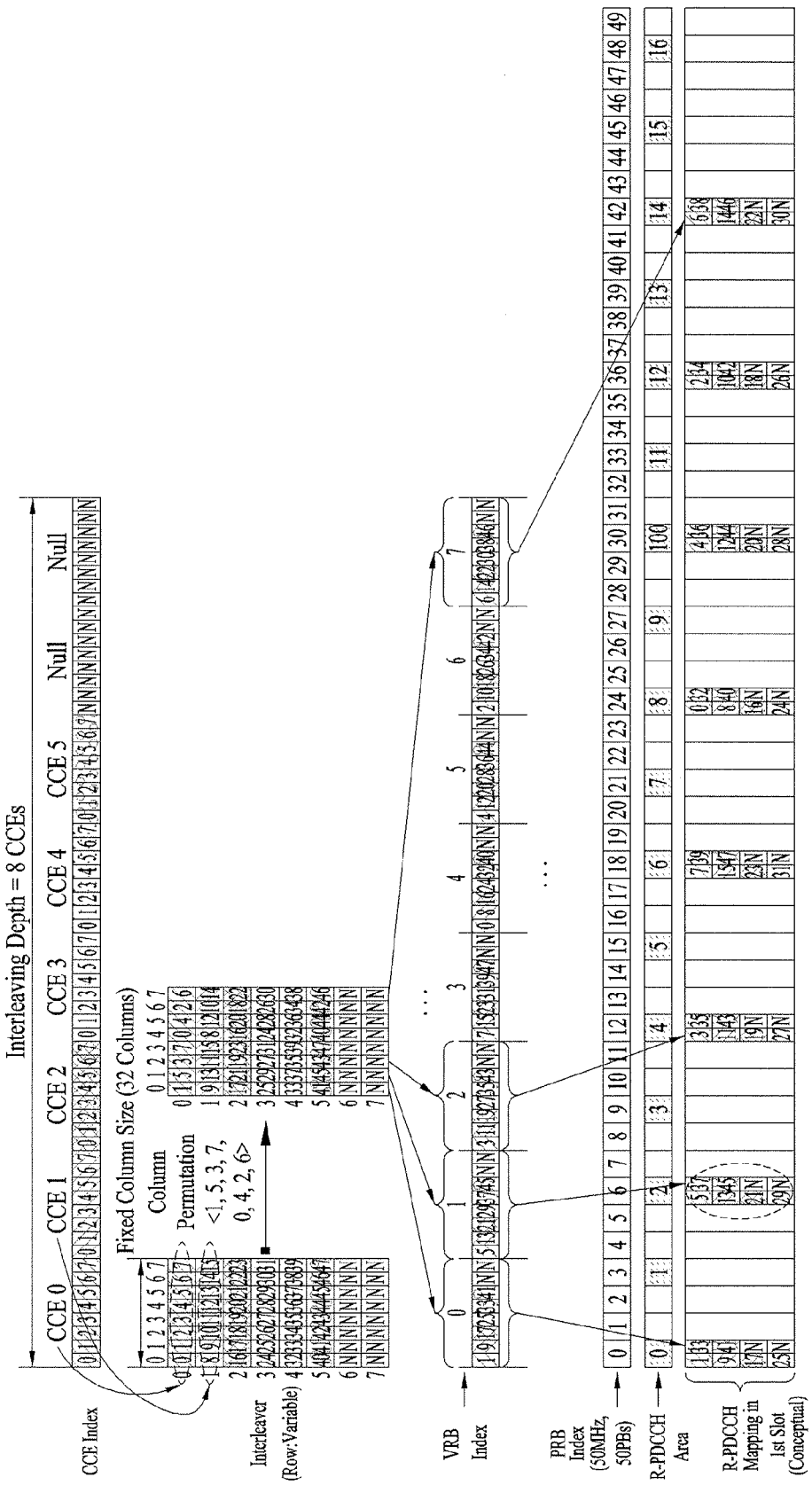

FIG. 42 illustrates an R-PDCCH mapping operation in Method 5. According to Method 5, column-wise permutation is performed during interleaving and a simple mapping rule is used for VRB-to-PRB mapping without permutation (e.g. bit reversal). Equation 4 is also applicable to Method 5. In this method, an interleaver column size is defined as the number of REGs in a CCE and an interleaver row size is changed according to the number of CCEs to be interleaved.

R-PDCCH PRB Mapping Rule

In an interleaving mode, interleaving outputs or VRBs may be mapped to R-PDCCH PRBs using a DVRB RA rule. For example, PRB indexes 0, 1, 9, 10, 18, 19, 27, and 28 (subset#0) may be used for R-PDCCH PRBs in FIG. 43. While R-PDCCHs may be transmitted in arbitrary positions through signaling (e.g. bitmap), a multiplexing rule compatible with a conventional RA method is desirably used in consideration of RA efficiency. For instance, a DVRB rule may be used to map R-PDCCH interleaver outputs or R-PDCCH VRBs to PRBs. Assuming that an interleaver size is, for example, 4 RBs, PRB indexes 0, 9, 18, and 27 are interleaved. If 8 RBs are interleaved, PRB indexes 0, 1, 9, 10, 18, 19, 27, and 28 are joint-interleaved. If a maximum interleaving size is 4 RBs, PRBs #0, 9, 18, and 27 belong to RN interleaving group#1 and PRBs #1, 10, 19, and 28 correspond to RN interleaving group#2.

If it is desired to keep an interval between interleaving groups uniform, PRBs in a contiguous subset or PRBs in a different subset such as PRB #3, 12, 21, and 30 may be designated for interleaving group#2. This method is similar to separate designation of PRBs used for an interleaving group on a subset basis.

Figure 45:
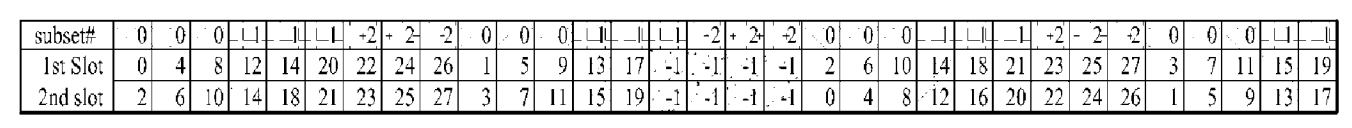

Meanwhile, specific consideration for RA is needed to match the first slot and the second slot in the interleaving mode (i.e. to allocate resources to a PRB pair on the same frequency). For example, while VRB indexes 0 to 3 or 0 to 7 are allocated to PRB pairs as intended, VRB indexes including nulls or contiguous 4 RBs which are not a multiple of 4 may not be configured with PRB pairs. Accordingly, R-PDCCHs should not reside in such positions. FIG. 44 illustrates an example of incorrectly configuring an R-PDCCH SS. FIG. 45 illustrates an example of correcting the configuration of the R-PDCCH SS of FIG. 44.

Obviously, since only a PRB index of the first slot is meaningful in a non-interleaving mode, the configuration of the R-PDCCH SS of FIG. 4 does not matter.

R-PDCCH SS PRB Configuration Considering RBG

In the case of R-PDCCH SS configuration on an RBG basis (for reference, units other than an RBG may be defined for an R-PDCCH SS). A configuration order of SS PRBs in an RBG according to increase of an aggregation level is proposed.

Figure 46:
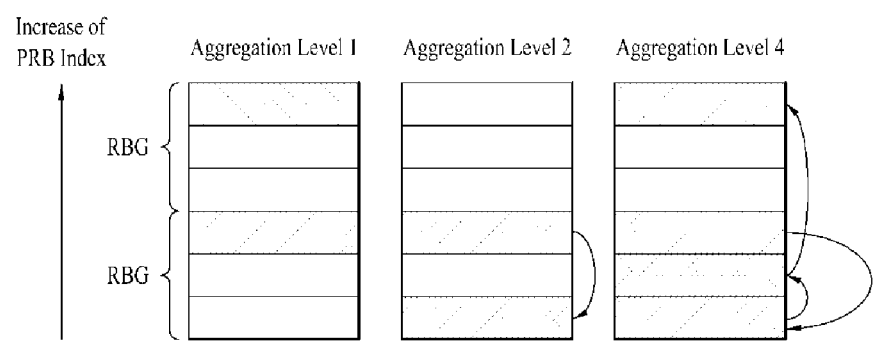
FIG. 46 illustrates R-PDCCH SS configuration according to aggregation level.

FIG. 46 illustrates an example of R-PDCCH SS configuration according to an aggregation level.

Referring to FIG. 46, an R-PDCCH SS may be configured with one PRB per RBG in aggregation level 1. The positions of SS PRBs in an RBG may be determined according to a preset rule (e.g. the largest RB index in an RBG) (a). In the case of aggregation level 2, 2 PRBs in an RBG are selected using PRB indexes in the RBG, starting sequentially from a specific PRB. If the number of SS PRBs exceeds the number of PRB indexes in an RBG, SS PRBs may be determined using the concept of cyclic indexes. For example, if PRBs in an RBG are sequentially allocated to SS PRBs, starting from the last PRB, in the case of aggregation level 2, a PRB having the largest index in the RBG is allocated first to SS PRBs and then a PRB having the smallest index in the RBG is allocated to the SS PRBs (b). A descending order as well as an ascending order may be used as the indexing order. The most significant feature herein is an SS PRB configuration method in the case of an aggregation level of 4 or more. If the number of SS PRBs according to an aggregation level exceeds the number of PRBs in an RBG, SS PRBs are sequentially configured in an RBG by the aforementioned scheme and then skipped to PRBs of another RBG so that SS PRBs of another PBG in aggregation level 1 may be included in SS PRBs in aggregation level 4. In FIG. 46, indication lines between PRBs in an RBG shows an SS PRB configuration order.

Figure 47:
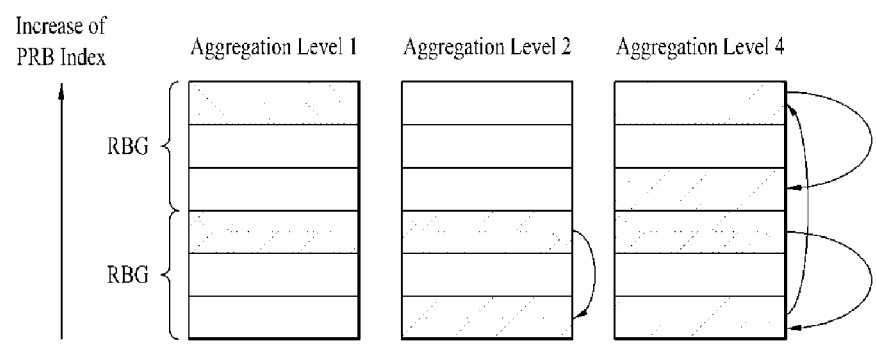
FIG. 47 illustrates R-PDCCH SS configuration when available PRBS are limited.

FIG. 47 illustrates a method of limiting the number of R-PDCCH PRBs which can be configured for an SS in an RBG. If a limited value is set to 2, a maximum of two PRBs per RBG is designated as SS PRBs and thus one R-PDCCH is configured in two RBGs.

Figure 48:
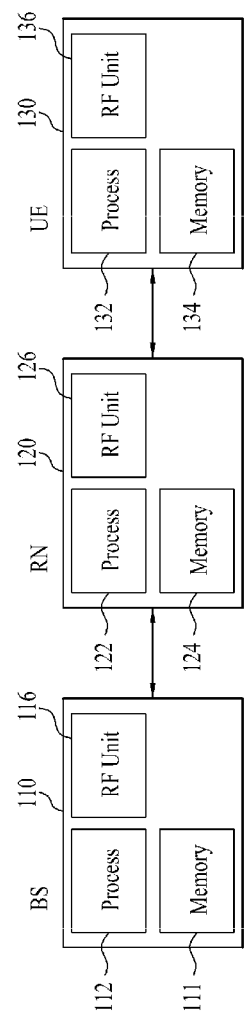
FIG. 48 illustrates a BS, an RN, and a UE which are applicable to the present invention.

FIG. 48 illustrates a BS, an RN, and a UE which are applicable to the present invention.

Referring to FIG. 48, a wireless communication system includes a BS 110, an RN 120, and a UE 130.

The BS 110 includes a processor 112, a memory 114, and an RF unit 116.

The processor 112 may be configured so as to implement the procedures and/or methods of the present invention. The memory 114 is connected to the processor 112 and stores various pieces of information related to operations of the processor 112. The RF unit 116 is connected to the processor 112 and transmits and/or receives RF signals. The RN 120 includes a processor 122, a memory 124, and an RF unit 126. The processor 122 may be configured so as to implement the procedures and/or methods of the present invention. The memory 124 is connected to the processor 122 and stores various pieces of information related to operations of the processor 122. The RF unit 126 is connected to the processor 122 and transmits and/or receives RF signals. The UE 130 includes a processor 132, a memory 134, and an RF unit 136. The processor 132 may be configured so as to implement the procedures and/or methods of the present invention. The memory 134 is connected to the processor 132 and stores various pieces of information related to operations of the processor 132. The RF unit 136 is connected to the processor 132 and transmits and/or receives RF signals. The BS 110, the RN 120, and/or the UE 130 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

In this document, the embodiments of the present invention have been described centering on a data transmission and reception relationship among a UE, a BS, and an RN. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term BS may be replaced with the terms fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention relates to a wireless communication system. Particularly, the present invention is applicable to a method and apparatus for allocating resources for a physical channel to an RN.

What is claimed is:

1. A method of transmitting a downlink control information (DCI) at a base station in a wireless communication system, the method comprising:

assigning, by the base station, a set of Virtual Resource Blocks (VRBs) for the DCI on a downlink subframe configured for a specific device, wherein the DCI is related with the specific device; and transmitting, by the base station to the specific device, the DCI via a specific downlink control channel configured for the specific device by using the downlink subframe configured for the specific device, wherein the set of VRBs is configured to be a same VRB set in a first slot and a second slot of the downlink subframe configured for the specific device, wherein the set of VRBs is mapped on Physical Resource Blocks (PRBs) with the same index in each of the first slot and the second slot of the downlink subframe configured for the specific device, wherein if the set of VRBs is assigned in the first slot of the downlink subframe configured for the specific device, the DCI is configured for a downlink transmission for the specific device, and wherein if the set of VRBs is assigned in the second slot of the downlink subframe configured for the specific device, the DCI is configured for an uplink transmission for the specific device.

2. The method of claim 1, further comprising transmitting an indication for the set of VRBs by using higher layer signaling.

3. The method of claim 2, wherein the higher layer signaling is a Radio Resource Control (RRC) signaling.

4. The method of claim 1, wherein the set of VRBs is represented by a bitmap.

5. The method of claim 1, wherein the specific downlink control channel is not interleaved.

6. The method of claim 5, wherein the set of VRBs is configured to be distributed VRBs (DVRBs).

7. The method of claim 6, wherein the set of VRBs is distributed to one or more of the PRBs in the first slot, wherein the set of VRBs is distributed to one or more of the PRBs in the second slot, and wherein the distribution to the one or more of the PRBs in the second slot is configured to have at least one identical PRB index with the one or more of the PRBs in the first slot.

* * * * *